United States Patent [19]

Yamamura et al.

[11] Patent Number: 5,277,973

[45] Date of Patent: Jan. 11, 1994

[54] CARBON FIBERS HAVING HIGH STRENGTH AND HIGH MODULUS OF ELASTICITY AND POLYMER COMPOSITION FOR THEIR PRODUCTION

[75] Inventors: Takemi Yamamura; Junichi Kugimoto; Toshihiro Ishikawa; Yasuhiro Sioji; Masaki Shibuya, all of Ube, Japan

[73] Assignee: Ube Industries, Ltd., Yamaguchi, Japan

[21] Appl. No.: 455,326

[22] PCT Filed: Aug. 11, 1989

[86] PCT No.: PCT/JP89/00817

§ 371 Date: Apr. 11, 1990

§ 102(e) Date: Apr. 11, 1990

[87] PCT Pub. No.: WO90/01523

PCT Pub. Date: Feb. 22, 1990

[30] Foreign Application Priority Data

| Aug. 12, 1988 | [JP] | Japan | 63-199976 |
| Sep. 7, 1988 | [JP] | Japan | 63-222237 |
| Oct. 18, 1988 | [JP] | Japan | 63-260680 |
| Nov. 4, 1988 | [JP] | Japan | 63-277311 |
| Nov. 22, 1988 | [JP] | Japan | 63-293680 |
| Jan. 13, 1989 | [JP] | Japan | 1-4776 |
| Feb. 10, 1989 | [JP] | Japan | 1-29665 |

[51] Int. Cl.⁵ .................... B32B 9/00; D02G 3/00

[52] U.S. Cl. .................... 428/367; 428/391; 428/397; 428/400; 428/364; 423/447.1; 423/447.2; 525/474; 501/75

[58] Field of Search ........... 428/400, 391, 367, 397; 525/474; 528/10; 501/90, 95

[56] References Cited

U.S. PATENT DOCUMENTS

| 4,014,725 | 3/1977 | Schulz | 428/367 X |
| 4,026,853 | 5/1977 | Dressnandt et al. | 524/705 |
| 4,376,747 | 3/1983 | Nazem | 264/29.2 |
| 4,504,454 | 3/1985 | Riggs | 264/29.2 X |
| 4,628,001 | 12/1986 | Sasaki et al. | 428/367 |
| 4,818,612 | 4/1989 | Hara et al. | 428/367 |
| 4,879,334 | 11/1989 | Hasegawa et al. | 524/66 X |

FOREIGN PATENT DOCUMENTS

| 0245035 | 11/1987 | European Pat. Off. | 428/367 |
| 83932 | 6/1984 | Japan . | |
| 83985 | 6/1984 | Japan . | |
| 177254 | 4/1987 | Japan . | |
| 42937 | 2/1988 | Japan . | |

*Primary Examiner*—Patrick J. Ryan
*Assistant Examiner*—J. N. Gray
*Attorney, Agent, or Firm*—Wenderoth, Lind & Ponack

[57] ABSTRACT

Silicon-containing carbide fibers having high strength and modulus of elasticity, and polymer compositions for production thereof. These fibers are inexpensive and very useful as reinforcing fibers for composite materials comprising plastics, carbon, metals, etc. as a matrix. These polymer compositions are also useful as a matrix of the above composite materials.

14 Claims, 1 Drawing Sheet

CARBON FIBERS HAVING HIGH STRENGTH AND HIGH MODULUS OF ELASTICITY AND POLYMER COMPOSITION FOR THEIR PRODUCTION

TECHNOLOGICAL FIELD

This invention relates to carbon fibers having high strength and high modulus of elasticity, and polymer compositions for their production. More specifically, it relates to carbon fibers containing silicon, or both silicon and a specific transition metal atom, and polymer compositions for their production.

BACKGROUND TECHNOLOGY

Carbon fibers have light weight, high strength and high modulus of elasticity, and therefore, their utility is not only in sporting and leasure goods, but has been expanded to a wide range of fields including aircraft, automobiles and building materials.

PAN-type carbon fibers derived from polyacrylonitrile as a raw material and pitch-type carbon fibers obtained from petroleum and coal pitches as raw materials are known as the carbon fibers.

Japanese Laid-Open Patent Publication No. 223316/1984 discloses a process for producing fibers having high strength and high modulus of elasticity, which comprises (a) hydrogenating a pitch, separating the solid from the hydrogenation product, and removing low-boiling components by distillation to obtain a hydrogenated pitch, (b) heat-treating the hydrogenated pitch under reduced pressure to give a mesophase pitch (containing not more than 90% by weight of mesophase carbon and at least 30% of optically anisotropic fibers), and thereafter (c) melt-spinning the mesophase pitch, and rendering the fibers infusible and carbonize them.

International Patent Laid-Open WO87/05612 and Japanese Laid-Open Patent Publication No. 209139/1987, the corresponding Japanese priority application, discloses an organopolyarylsilane being soluble in organic solvents and comprising organosilane segments in which the skeletal portion is composed mainly of carbosilane and polysilane, said segments being connected at random via silicon-carbon linking groups.

Laid-Open International Patent WO 87/05612 and Japanese Laid-Open Patent Publication No. 215016/1987, the corresponding Japanese priority application, disclose continuous SiC-C type inorganic fibers composed of molecules having carbon and SiC as main constituents and containing 5 to 55% by weight of Si, 40 to 95% by weight of C and 0.01 to 15% by weight of O, said inorganic fibers showing excellent thermally resistant strength and oxidation resistance with a volume resistivity of 10 to $10^{-3}$ ohms-cm.

The above laid-open specifications describe a process for producing inorganic fibers having properties intermediate between the silicon carbide fibers and carbon fibers, which comprise mixing an organic solvent-soluble component of a coal or petroleum pitch with a polysilane, and reacting the mixture under heat to synthesize an organopolyarylsilane, and spinning it and rendering the fibers infusible and curing the fibers.

However, in the above process, a pitch quite free from an organic solvent-insoluble portion is selected as one of the starting materials, and in the production of the organopolyarylsilane, the reaction is carried out under such conditions that no organic solvent-insoluble portion is formed.

Accordingly, the resulting product as a spinning material does not at all contain the above insoluble portion in the mesophase, which is said to be the most important component for development of strength by carbon fibers.

Inorganic fibers obtained by spinning, rendering the fibers infusible and curing them gives a diffraction line (002) corresponding to the graphite crystals of carbon under certain conditions, but no orientation inherent to pitch fibers is noted. Furthermore, in the process described in the above patent documents, the heat resistance of the fibers in an inert gas is enhanced as the proportion of the pitch content increases. But, on the contrary, the oxidation resistance of the fibers is decreased, and moreover, their mechanical characteristics tend to be reduced markedly.

Japanese Laid-Open Patent Publication No. 7737/1987 discloses a composite material comprising a matrix of a plastic and as a reinforcing material hybrid fibers consisting of inorganic fibers containing silicon, titanium (or zirconium), carbon and oxygen and at least one kind of fibers selected from the group consisting of carbon fibers, glass fibers, boron fibers, aramid fibers and silicon carbide fibers having carbon as a core.

Japanese Laid-Open Patent Publication No. 266666/1986 discloses a coontinuous fiber bundle for use in a composite material, said fiber bundle comprising continuous fibers of ceramics (silicon carbide, silicon nitride, alumina, etc.) or a heat-resistant material (carbon, metals, etc.) and short fibers, whiskers or powders of the same material as above adhering to the surface of the continuous fibers.

Japanese Laid-Open Patent Publication No. 195076/1985 discloses a method of improving the surface hardness and oxidation resistance of carbon fibers, which comprises adhering or contacting a silicon-containing material to or with the surface of a carbonaceous material, melting the silicon-containing material to form a modified layer composed of silicon carbide and carbon on the surface.

Japanese Laid-Open Patent Publication No. 251175/1985 discloses a process for producing a molded article composed of silicon carbide and carbon, which comprises slowly oxidizing a molded carbon article at 400° to 600° C. to render it light in weight and porous, and then allowing a silicon-containing material to penetrate into the pores and react at a temperature above the meling point of the silicon-containing material.

It is an object of this invention to provide novel fibers having high strength and high modulus of elasticity.

Another object of this invention is to provide fibers having high strength and high modulus of elasticity containing crystalline carbon oriented in the direction of the fiber axis and consisting essentially of silicon, carbon and oxygen.

Still another object of this invention is to provide fibers having high strength and high modulus of elasticity which when used as a reinforcing material for a composite material, shows excellent wettability with a matrix material.

Yet another object of this invention is to produce high strength and high modulus fibers which has much higher modulus of elasticity than silicon carbide fibers and excellent oxidation resistance with their oxidation resistant temperature being higher by about 200° to 300° C. than conventional pitch-type carbon fibers or the PAN-type carbon fibers.

A further object of this invention is to provide a polymer composition suitable for production of the fibers of this invention.

Other objects of this invention along with its advantages will become apparent from the following description.

According to this invention, the above objects and advantages of this invention are firstly achieved by fibers having high strength and high modulus of elasticity comprising (i) crystalline carbon oriented substantially in the direction of the fiber axis, (ii) amorphous carbon and/or crystalline carbon oriented in a direction different from the fiber axis direction, and (iii) a silicon-containing component consisting essentially of 30 to 70% by weight of Si, 20 to 60% by weight of C and 0.5 to 10% by weight of 0, the proportions being based on the total weight of silicon, carbon and oxygen.

The above fibers of the invention (to be sometimes referred to as the first fibers of the invention) can be produced by a process which comprises preparing a spinning dope of a polymer composition comprising (A) an organic silicon polymer resulting from random bonding of a plurality of at least one type of bond selected from the group consisting of units represented by the following formula (a)

(a)

wherein $R^1$ and $R^2$, independently from each other, represent a hydrogen atom, a lower alkyl group, a phenyl group or a silyl group ($—SiH_3$), either via methylene groups ($—CH_2—$) or both via methylene groups and directly, (B) a polycyclic aromatic compound in the state of a mesophase, a premesophase or a latently anisotropic phase, and (C) a polycyclic aromatic compound which is optically isotropic but is not in the state of a premesophase or a latently anisotropic phase, at least a part of component (A) being chemically bound to component (B) and/or component (C); spinning the spinning dope; rendering the spun fibers infusible under tension or no tension; and pyrolyzing the infusible fibers at a temperature of 800° to 3,000° C. in vacuum or in an inert gaseous atmosphere.

The polymer composition used in the spinning step has been provided for the first time by the present inventors, and constitutes part of the invention.

The novel polymer composition can be produced by heating the organic silicon polymer (A) and a pitch which has no excessive heat history in an inert gas, preferably at a temperature of 250° to 500° C., and melting the resulting reaction product at 200° to 500° C. together with a pitch mainly having a mesophase, a premesophase or a latently anisotropic phase.

The novel polymer composition and a process for its production will first described, and then, the above fibers of the invention and a process for production thereof.

The organic silicon polymer (A) is obtained by the random bonding of the plurality of the bond units of formula (a) via methylene groups ($—CH_2—$) or via methylene groups and directly.

In formula (a), $R^1$ and $R^2$, independently from each other, represent a hydrogen atom, a lower alkyl group, a phenyl group or a silyl group ($—SiH_3$). Examples of the lower alkyl group are linear or branched alkyl groups having 1 to 4 carbon atoms such as methyl, ethyl, propyl and butyl groups.

The organic silicon polymer (A) can be produced, for example, by reacting dimethyldichlorosilane and metallic sodium to produce polymethylsilane, and heating the polymethylsilane at a temperature of at least 400° C. in an inert gas. In this example, an organic silicon polymer in which a plurality of units of formula (a) wherein $R^1$ and $R^2$, independently from each other, are hydrogen and methyl are bonded randomly via methylene groups, or both via methylene groups and directly. It will be understood that when part of dimethyldichlorosilane is replaced by diphenyldichlorosilane, an organic silicon polymer is obtained which has units of formula (a) wherein $R^1$ and $R^2$ in formula (a), independently from each other, represent hydrogen, methyl and phenyl.

The organic silicon polymer (A) has a weight average molecular weight (Mw) of preferably 300 to 1,000, especially preferably 400 to 800.

The pitch which has no excessive heat history may be originated from petroleum or coal. In particular, distilled oils or residual oils obtained by distilling heavy oils produced by fluidized catalytic cracking of petroleums, or heat-treated products of the distilled oils or the residual oils are preferably used. These pitches are usually optically isotropic (these pitches will be called optically isotropic pitches hereafter).

Preferably, the optically isotropic pitches contain 5 to 98% by weight of components insoluble in organic solvents such as benzene, toluene, xylene and tetrahydrofuran.

These pitches are polycyclic aromatic compounds if their chemical structure is considered, and are preferably relatively high-molecular-weight compounds having a weight average molecular weight of about 100 to 3,000. The weight average molecular weight may be measured directly by gel permeation chromatography (GPC) if the pitch does not contain components insoluble in organic solvents. On the other hand, when the pitch has components insoluble inorganic solvents, the pitch is hydrogenated under mild conditions to change the organic solvent-insoluble components into organic solvent-soluble components, and the molecular weight of the treated pitch is then measured by GPC.

The organic silicon polymer (A) and the optically isotropic pitches are heated and reacted in an inert gas such as nitrogen gas or argon gas, preferably at a temperature of 250° to 500° C. If the reaction temperature is excessively low, the reaction (for example, the bonding of the aromatic carbons of the pitch to the organic silicon polymer) is difficult. If, on the other hand, the reaction temperature is excessively high, the decomposition of the reaction product and its conversion to a higher-molecular-weight product occur vigorously.

The proportion of the pitch used in this reaction is preferably 83 to 4,900 parts by weight per 100 parts by weight of the organic silicon compound. If the proportion of the pitch used is too small, the amount of silicon carbide component in the finally obtained fibers is large, and fibers having a high modulus of elasticity are difficult to obtain. If this proportion is excessively large, the amount of the silicon carbide component formed becomes small, and fibers having excellent wetting property with respect to the matrix and excellent oxidation resistance are difficult to obtain.

The reaction product obtained by the above reaction is then heat-melted with a pitch in the mesophase, the premesophase or in a latently anisotropic state.

The mesophase pitch can be prepared by heating a petroleum or coal pitch at 300° to 500° C. in an inert gas, and polycondensed while the resulting light fractions are removed.

A suitable petroleum or coal pitch contains 5 to 98% by weight of components insoluble in an organic solvent such as benzene, toluene, xylene or tetrahydrofuran like the pitch used to react with the organic silicon polymer.

By heat-treating the above starting pitch either directly or after as required, components soluble in organic solvent are removed, the mesophase pitch can be obtained. The advantage of removing the organic solvent-soluble components is to facilitate the formation of a mesophase by removing the soluble components which are difficult of forming a mesophase and to obtain a pitch having high optical anisotropy and a low melting point.

The mesophase pitch is a polycyclic aromatic compound in view of its chemical structure. Preferably, it has a melting point of 200° to 400° C., a weight average molecular weight of 200 to 10,000 and a degree of optical anisotropy of 20 to 100%, and contains 30 to 100% of components insoluble in benzene, toluene, xylene or tetrahydrofuran. When the starting pitch is subjected to an operation of removing the organic solvent-soluble components, the mesophase pitch has a melting point of 200° to 350° C. and a weight average molecular weight of 200 to 8,000. The melting point can be determined by an ordinary capillary method in a nitrogen box (the same hereinafter).

The premesophase pitch can be produced by, for example, hydrogenating a petroleum or coal pitch with a hydrogen donor such as tetrahydroquinoline or hydrogenating the pitch under hydrogen pressure in the optional presence of a catalyst, and then heating the resulting hydrogenated pitch for a short period of time at high temperatures under reduced pressure.

When the hydrogenation is carried out by using tetrahydroquinoline, at least 30 parts of the quinoline is added to 100 parts by weight of the pitch, and the mixture is heated at 300° to 500° C.

When hydrogenation is carried out by using hydrogen, a catalyst such as a cobalt-molybdenum system or an iron oxide system and a solvent such as quinoline are optionally added to the starting pitch, and the pitch is hydrogenated at 400° to 500° C. under a partial hydrogen pressure of at least 10 kg/cm$^2$. The resulting product is heat-treated at a temperature of at least 440° C. under a pressure of not more than 50 mmHg for a period of not more than 60 minutes after optionally it is filtered and subjected to a treatment of removing the solvent and the light components. The treating time is determined by the treating temperature. Preferably, the treatment is performed at the highest possible temperature for the shortest possible time. Particularly, treatment for a time of not more than 15 minutes is advantageous.

The premesophase pitch is a polycyclic aromatic compound in view of its chemical structure, and preferably has a melting point of 200° to 350° C. and a weight average molecular weight of 600 to 6,000, and contains at least 5% of components insoluble in quinoline.

The premesophase state, as referred to herein, denotes the state which is optically isotropic at room temperature but on heating to a high temperature of at least 600° C., can change to a mesophase state. The premesophase pitch alone is spun, rendered infusible, and pyrolyzed, orientation occurs in the pyrolyzing step, and high modulus fibers can be obtained in the same way as in the case of using a mesophase pitch. The advantage of using the premesophase pitch is that it can be spun at lower temperatures than when the mesophase pitch is used.

The pitch in the latently anisotropic state can be obtained by removing light fractions from a heavy oil (to be referred to sometimes as the FCC slurry oil) obtained by fluidized catalytic cracking of petroleums, heat-treating the resulting pitch at 300° to 500° C., and subjecting the resulting optically anisotropic mesophase pitch to a hydrogenation treatment until the mesophase contained therein changes into substantially quinoline-soluble components and the pitch as a whole forms an optically isotropic homogeneous phase.

Various known methods used for hydrogenation of the aromatic ring may be used in the hydrogenation. For example, there can be used a method involving reduction with an alkali metal, an alkaline earth metal and a compound of any of these, an electrolytic reduction method, a hydrogenation method in a homogeneous system with a complex compound catalyst, a hydrogenation method in a heterogeneous system using a solid catalyst, a hydrogenation method under a hydrogen pressure in the absence of catalyst, and a hydrogenation method using a hydrogen donor such as tetralin.

The hydrogenation may be carried out at a temperature of not more than 400° C. under a pressure of not more than 200 atmospheres, although these conditions may vary depending upon the method used. The resulting hydrogenated pitch may be maintained in the heat-melted state to enhance its thermal stability.

The heating temperature at this time is preferably above the melting temperature but does not exceed 450° C. Heating at high temperatures may result in the formation of a new mesophase. The formation of too large an amount of the mesophase is undesirable because it increases the softening point of the pitch.

The pitch in the latently anisotropic state is a polycyclic aromatic compound in view of its chemical structure. Preferably, it has a melting point of 200° to 350° C. and a weight average molecular weight of 200 to 6,000, and is soluble in quinoline.

The latent anisotropy, as used herein, denotes anisotropy which is attributed to the orientation of molecules in the direction of an external force such as a shearing force or a stretching force, which occurs upon application of the external force. For example, when this pitch is spun, rendered infusible (cured) and pyrolyzed in accordance with an ordinary method of producing pitch-type carbon fibers, fibers oriented in the direction of the fiber axis are obtained.

The pitches in the mesophase, premesophase or the latently anisotropic state may be used singly or in combination.

These pitches and the reaction product between the organic silicon polymer and the optically isotropic pitch, are melted at a temperature in the range of 200° to 500° C. The pitch in the mesophase, premesophase or the latently anisotropic state is used in a proportion of 5 to 50,000 parts by weight, preferably 5 to 10,000 parts by weight, per 100 parts by weight of the reaction product.

If the proportion of the pitch is less than 5 parts by weight, highly elastic pyrolyzed fibers are difficult to produce as a final product. If it exceeds 50,000 parts by weight, it is difficult to obtain final fibers having excellent wettability with respect to the matrix and excellent oxidation resistance.

Thus, according to this invention, there is provided a polymer composition, comprising (A) an organic silicon polymer, (B) a polycyclic aromatic compound in the mesophase, and (C) an optically isotropic polycyclic aromatic compound, at least a part of component (A) being chemically bound to component (B) and/or component (C) by reaction. The formation of a chemical bond can be determined by the increase of the amount of that portion of the polymer composition which is insoluble in, for example, toluene over the total amount of toluene-insoluble portions of the individual components. For example, if the polymer composition comprises 1 part by weight of the reaction product obtained between 30 parts by weight of the organic silicon polymer (A) and 70 parts by weight of component (C), and 14 parts of component (B), the amount of the insoluble portion of the polymer composition increases to about 1.03 to 1.08 times based on the total amount of the insoluble portions of the individual components. Generally, this figure tends to be larger as the total amount of components (A) and (C) bcomes larger than the amount of component (B) and the proportion of component (A) becomes larger in the total amount of components (A) and (C).

The polymer composition of this invention is composed of the constituents (A), (B) and (C), and at least a part of the silicon atoms of component (A) is bonded to the carbon atoms on the aromatic rings of component (B) and/or component (C). Preferably, the weight ratio of of component (A) to the total amount of components (B) and (C) is from 1:0.5–5,000, and the weight ratio of component (B) to component (C) is 1:0.02–4.

If the weight ratio of of component (A) to the total amount of components (B) and (C) is below 0.5, the amount of the mesophase component in the polymer composition is insufficient, and fibers obtained from the polymer composition have low strength and modulus of elasticity. If this ratio exceeds 5,000, the amount of the organic silicon in the polymer composition is insufficient, and fibers obtained from this composition have lowered oxidation resistance and tend to have reduced wettability with an FRP matrix.

If the weight raito of (C) to (B) is less than 0.02, the polymer composition has reduced spinnability in melt spinning, and its spinning becomes extremely difficult with the occurrence of fiber breakage owing to the non-uniform viscosity of the spinning dope. If the above weight ratio exceeds 4, the amount of the mesophase component in the polymer composition becomes insufficient, and fibers obtained from the composition have lowered strength and modulus.

The polymer composition of this invention contains 0.01 to 30% by weight of silicon atoms, and has a weight average molecular weight of 200 to 11,000 and a melting point of 200° to 400° C.

If the silicon atom content of the polymer composition is less than 0.01%, the amount of the amorphous phase composed of Si, C and O or the ultrafine beta-SiC particles in the fibers formed from the composition is too small, and therefore, no marked improvement in the wettability of the resulting fibers with respect to the FRP matrix and the oxidation resistance of the fibers is achieved. On the other hand, if the silicon atom content exceeds 30%, the high elasticity of the fibers owing to the orientation of ultrafine graphite crystals in the fibers and the improved heat resistance of the fibers in a non-oxidizing atmopshere cannot be achieved, and the resulting fibers do not at all differ from SiC fibers.

If the weight average molecular weight of the polymer composition is lower than 200, the composition does not substantially contain a mesophase. From such a composition, therefore, highly elastic fibers cannot be obtained. If its weight average molecular weight is larger than 11,000, the composition has a high melting point and becomes difficult to spin.

A polymer composition having a melting point lower than 200° C. does not substantially contain a mesophase, and as-spun fibers from this composition tend to melt adhere at the time of curing, pyrolyzed fibers having high strength and modulus of elasticity cannot be obtained. If it is higher than 400° C., the composition is decomposed during spinning, and becomes difficult to spin.

Preferably, the polymer composition contains 10 to 98% of components insoluble in an organic solvent such as benzene, toluene, xylene and tetrahydrofuran and has a degree of optical anisotropy at room temperature of 5 to 97%.

If the proportion of the organic solvent-insoluble portion of the polymer composition is less than 10%, or the degree of optical anisotropy of the composition is less than 5%, the mesophase is hardly oriented in the direction of the fiber axis at the time of melt-spinning the composition. Hence, even when the resulting as-spun fibers are cured and pyrolyzed, there can only be obtained fibers having low strength and low modulus of elasticity. When the composition contains more than 98% of the organic solvent-insoluble portion or has a degree of optical anisotropy of more than 97%, the amount of the mesophase in the composition becomes too large, and the composition becomes difficult to spin.

To produce the first fibers of this invention from the polymer composition of this invention, a spinning dope of the polymer composition is prepared, and spun, and the resulting as-spun fibers are cured under tension or under no tension. The resulting infusible fibers are pyrolyzed in an inert gaseous atmosphere at a temperature of 800° to 3,000° C.

The spinning dope is prepared usually by heat-melting the polymer composition and as required, filtering the melt to remove substances detrimental to spinning, such as microgels or impurities. Its spinning is carried out by an ordinarily used synthetic resin spinning apparatus.

The temperature of the spinning dope to be spun is advantageously 220° to 420° C. although it varies depending upon the softening temperature of the starting composition.

As required, a spinning cylinder is mounted on the spinning appratus, and the atmosphere of the inside of the spinning cylinder is formed into an atmosphere of at least one gas selected from air, an inert gas, hot air, a hot inert gas, steam and ammonia gas, and by increasing the wind up speed, fibers having a small diameter can be obtained. The spinning speed in melt spinning can be varied within the range of 50 to 5,000 m/min. depending upon the properties of the starting composition.

The resulting as-spun fibers are then rendered infusible (cured) under tension or under no tension.

A typical method of curing is to heat the as-spun fibers in an oxidizing atmosphere. The temperature at this time is preferably 50° to 400° C. If the temperature is excessively low, no bridging takes place in the polymer constituting the as-spun fibers. If this temperature is excessively high, the polymer burns.

The purpose of curing is to bridge the polymer constituting the as-spun fibers to provide an insoluble and infusible three-dimensional structure and to prevent it from being melted with the adjacent fibers melt-adhering to each other in the subsequent pyrolyzing step. The gas constituting the oxidizing atmosphere at the time of curing is preferably, for example, air, ozone, oxygen, chlorine gas, bromine gas, ammonia gas or a gaseous mixture of these.

Another method of curing comprises applying gamma-ray irradiation or electron beam irradiation to the as-spun fibers in an oxidizing or non-oxidizing atmosphere optionally with heating at low temperatures.

The purpose of applying gamma-rays or electron beam irradiation is to polymerize the polymer forming the as-spun fibers to a greater degree, and thereby prevent the as-spun fibers from melting and thus losing the fiber shape.

The suitable irradiation dose of gamma-rays or electron beams is $10^6$ to $10^{10}$ rads.

The irradiation may be carried out under vacuum or in an atmosphere of an inert gas or an oxidizing gas such as air, ozone, oxygen, chlorine gas, bromine gas, ammonia gas or a gaseous mixture thereof.

Curing by irradiation may be carried out at a room temperature, but as required, curing may be achieved in a shorter period of time by performing the irradiation while heating at a temperature of 50° to 200°.

The operation of curing may be carried out under tension or under no tension. The tension to be applied is preferably 1 to 500 g/mm². Application of a tension of not more than 1 g/mm² cannot keep the fibers taut. On the other hand, when this operation is carried out under no tension, the as-spun fibers assume a wavy form because of their shrinkage, but since this can frequently be corrected in the subsequent curing step, tension is not always essential.

The resulting infusible fibers are pyrolyzed in vacuum or in an atmosphere of an inert gas at a temperature of 800° to 3,000° C. The pyrolyzing can be carried out under tension or under no tension. Preferably, it is carried out under tension because if the fibers are pyrolyzed at high temperatures under a tension of, for example, 0.001 to 100 kg/mm², inorganic fibers having high strength and little flex can be obtained.

It is presumed that in the temperature elevating process, carbonization begins to become vigorous at about 700° C., and is almost completed at about 800° C. To obtain higher temperatures than 3,000° C., an expensive apparatus is required, and there is no industrial advantage. Hence, pyrolyzing is carried out at a temperature of 800° to 3,000° C.

Thus, according to this invention, there are provided high strength and high modulus fibers containing components (i), (ii) and (iii) as stated at the outset of the section "Disclosure of the Invention" are obtained.

Component (i) is crystalline carbon oriented substantially in the direction of the fiber axis. It is believed in relation to the production process described above that this carbon is derived from a polycyclic aromatic compound which is in the mesophase, or in other words, optically anisotropic.

Owing to the presence of component (i), a structure known in the art, that is, a radial structure, an onion structure, a random structure, a core-radial structure, a skin onion structure or a mosaic structure is observed in the cross section of the fibers of this invention.

Component (ii) is amorphous carbon and/or crystalline carbon oriented in a direction different from the fiber axis direction. Likewise, in relation to the production process described above, this component is believed to be derived from an optically isotropic polycyclic aromatic compound.

Crystalline carbon has a crystallite size of not more than 500 angstrom, and is an ultrafine graphite crystal oriented in the direction of the fiber axis in which by a high-resolution electron microscope having a resolution ability of 1.5 angstrom, a fine lattice image corresponding to (002) plane with an interplanar spacing of 3.2 angstrom is observed.

In the fibers of this invention, microcrystals which are three-dimensionally arranged with a small interlayer distance are effectively formed.

The silicon-containing component (iii) consisting essentially of silicon, carbon and oxygen may be an amorphous phase or an aggregation of a crystalline particulate phase consisting essentially of crystalline SiC and an amorphous $SiO_x$ ($0 < x \leq 2$) phase.

The crystalline particulate phase consisting essentially of crystalline SiC may have a particle diameter of not more than 500 angstrom.

The distributed state of silicon in the fibers can be controlled in relation to the atmosphere in which fibers are pyrolyzed for production of fibers, the size and concentration of the mesophase in the starting material. For example, if the mesophase is grown to a large size, the silicon-containing polymer is liable to be pushed out onto the fiber surface layer, and after pyrolyzing, forms a silicon-rich layer on the fiber surface.

The fibers of this invention preferably contain 0.015 to 200 parts by weight of component (iii) per 100 parts by weight of components (i) and (ii) combined, and the weight ratio of component (i) to component (ii) is 1:0.02–4.

If the proportion of component (iii) is less than 0.015 part by weight per 100 parts by weight of components (i) and (ii) combined, the resulting fibers are much the same as pitch fibers, and an improvement in oxidation resistance and wettability cannot be expected. If the proportion exceeds 200 parts by weight, fine crystals of graphite are not effectively formed, and fibers of a high modulus of elasticity are difficult to obtain.

The fibers of this invention comprises preferably 0.01 to 29% by weight of silicon, 70 to 99.9% by weight of carbon and 0.001 to 10% by weight of oxygen, especially preferably 0.1 to 25% by weight of silicon, 74 to 99.8% by weight of carbon and 0.01 to 8% by weight of oxygen, based on the total weight of silicon, carbon and oxygen.

As second fibers of this invention, the present invention provides fibers having high strength and high modulus comprising (i) crystalline carbon oriented substantially in the direction of the fiber axis, (ii) amorphous carbon and/or crystalline carbon oriented in a direction different from the direction of the fiber axis, and (iii') a silicon-containing component substantially composed of 0.5 to 45% by weight of a metal selected from titanium, zirconium and hafnium, 5 to 70% by weight of Si, 20 to 40% by weight of C and 0.01 to 30% by weight of O, the proportions being based on the total weight of said metal, silicon, carbon and oxygen.

According to this invention, the second fibers of this invention can be produced by a process which comprises preparing a spinning dope of a polymer composition comprising (A') an organic silicon polymer resulting from random bonding of a plurality of units of at least one kind selected from the group consisting of units of the following formula (a)

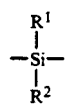  (a)

wherein $R^1$ and $R^2$, independently from each other, represent a hydrogen atom, a lower alkyl group, a phenyl group or a silyl group ($-SiH_3$), and at least one unit of formula (b)

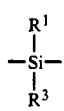  (b)

wherein $R^1$ is as defined above, and $R^3$ represents -M or -OM, and M represents one equivalent of a metal selected from the group consisting of titaniuum, zirconium and hafnium, via methylene groups ($-CH_2-$) or both via methylene groups or directly, (B) a polycyclic aromatic compound in the mesophase, premesophase or the latently anisotropic phase, and (C) an optically isotropic polycyclic aromatic compound which is not in the premesophase or the latently anisotropic phase, part of component (A) being chemically bonded to component (B) and/or component (C);

spinning the spinning dope;

rendering the fibers infusible under tension or under no tension; and pyrolyzing the resulting infusible fibers in vacuum or in an atmosphere of an inert gas at a temperature of 800° to 3,000° C.

The polymer composition used in the spinning step has been provided for the first time by the present inventors and constitute part of the present invention.

The novel polymer composition can be produced by heating the organic silicon polymer (A) described above in the production of the first fibers of the invention (to be sometimes referred to as the first organic silicon polymer) and an optically isotropic pitch in an inert gas at a temperature of preferably 250° to 500° C., then reacting the reaction product with a transition metal compound of formula $M^1X_4$ wherein $M^1$ represents titanium, zironium or hafnium, and X may be any moiety, for example a halogen atom, an alkoxy group, or a chain-forming group such as a beta-diketone, which permits M to be bonded to the silicons of the precursor reaction product directly or through an oxygen atom by condensation, at a temperature of 100° to 500° C.; and heat-melting the reaction product with a pitch in the mesophase, the premesophase or the latently anisotropic state at a temperature of 300° to 500° C.

The first organic silicon polymer, the optically isotropoic pitch and the heating conditions therefor are as described hereinabove.

The precursor reaction product obtained by heating is then reacted with the transition metal compound $M^1X_4$. By this reaction, the silicon atoms of the precursor reaction product may be at least partly bonded to the metal M directly or through an oxygen atom.

If the reaction temperature is low, the condensation reaction between the precursor reaction product and the compound of formula $M^1X_4$ does not proceed. If the reaction temperature is excessively high, the cross-linking reaction through M proceeds excessively to cause gellation or the precursor reaction product itself condenses and becomes high in molecular weight. In some cases, $MX_4$ volatilizes, and a composition for obtaining excellent fibers cannot be obtained.

The reaction product can also be prepared by reacting the reaction product obtained after the reaction of the organic silicon polymer (A) with the transition metal compound, with a pitch.

The above reaction product contains the organic silicon polymer (A') which results from random bonding of a plurality of the units represented by formula (a) to at least one unit of formula (b) through methylene groups or both through methylene groups and directly without the intermediary of methylene groups.

The units of formula (b) may be, for example, as follows when $Ti(OC_4H_9)_4$ is used as the transition metal compound.

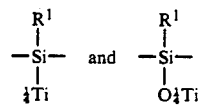

The reaction temperature at this time is especially desirably 200° to 400° C.

The reaction product obtained by the above reaction is then heat-melted with a pitch in the mesophase, premesophase or the latent anisotropy.

It should be understood that as regards these pitches and the heat-melting conditions, the same description as that for the polymer composition used in the production of the first fibers (to be sometimes referred to as the first polymer composition) will apply.

The above polymer composition (to be sometimes referred to as the transition metal-containing reaction product or the second polymer composition) may also be produced by a process which comprises reacting the first organic silicon polymer (A) with an optically isotropic pitch, and reacting the resulting product with a polycyclic aromatic compound such as one in the mesophase and a transition metal compound successively or together.

Thus, according to this invention, there is provided a polymer composition comprising (A') an organic silicon compound, (B) a polycyclic aromatic compound such as one in the mesophase, and (C) an optically isotropic polycyclic aromatic compound, at least part of the component (A') being chemically bonded to component (B) and/or component (C).

The second polymer composition of this invention comprises the components (A'), (B) and (C), and the silicon atoms of the component (A') are at least partly bonded to the carbon atoms of the aromatic rings of component (B) and/or component (C). The weight ratio of component (A') to the total sum of components (B) and (C) is preferably 1:0.5-5,000, and the weight ratio of component (C) to component (B) is preferably 1:0.02-4.

If the weight ratio of component (A') to the total sum of components (B) and (C) is less than 0.5, the amount of the mesophase component in the second polymer composition is insufficient, and fibers obtained from this polymer have low strength and modulus of elasticity. If this ratio exceeds 5,000, the amount of the organic silicon compound in the second polymer composition becomes insufficient, and fibers obtained from this polymer have low oxidation resistance. Furthermore, the wettability of the fibers with respect to an FRP matrix tends to be low.

If the weight ratio of (C) to (B) is less than 0.02, the spinnability of the second polymer composition in its melt-spinning is degraded, and fiber breakage occurs owing to the non-uniform viscosity of the dope. Hence, the polymer composition becomes extremely difficult to spin. If the above weight ratio exceeds 4, the amount of the mesophase component in the second polymer composition is insufficient, and fibers obtained from the polymer tends to have low strength and modulus of elasticity.

Preferably, in component (A'), the ratio of the total number of units Si—$CH_2$ to that of units Si—Si is within 1:0-20, and 0.2 to 35% of units M of the transition metal compound is contained based on the total weight of the units Si—$CH_2$ and units Si—Si.

The second polymer composition preferably contains 0.01 to 30%, especially 0.05 to 30%, of silicon atoms, and 0.005 to 10% of M, and has a weight average molecular weight of 200 to 11,000 and a melting point of 200° to 400° C.

If the content of silicon atoms in the second polymer composition is less than 0.01%, the wettability of the resulting fibers with respect to an FRP matrix and the oxidation resistance of the fibers do not markedly show an improvement. On the other hand, if it exceeds 30%, the orientation of the ultrafine graphite crystals in the fibers makes it impossible to achieve high elasticity in the fibers, and an improvement in the heat resistance of the fibers in a non-oxidizing atmosphere, and the fibers do not differ at all from SiC fibers.

Since the second polymer composition contains M in addition to silicon, the composition shows a further improvement in mechanical properties, wettability with plastics. If the content of M is less than 0.005%, the above properties are scarcely exhibited. If it exceeds 10%, both a high-melting product which is extremely crosslinked and the unreacted $MX_4$ exist in the composition, and it becomes very difficult to melt-spin a dope of the composition.

If the second polymer composition has a weight average molecular weight lower than 200, it hardly contains a mesophase, and therefore, high elasticity fibers cannot obtained from the composition. If its weight average molecular weight is larger than 11,000, the composition has a high melting point and is difficult to spin.

If the second polymer composition has a melting point lower than 200° C., it does not substantially contain a mesophase, and as-spun fibers obtained by spinning this composition are liable to melt-adhere when subjected to curing. Thus, fibers having high strength and modulus of elasticity cannot be obtained. If its melting point is higher than 400° C., the composition undergoes decompositon during spinning, and is difficult to spin.

Preferably, the second polymer composition contains 10 to 98% of a portion insoluble in an organic solvent such as benzene, toluene, xylene or tetrahydrofuran, and has a degree of optical anisotropy at room temperature of 5 to 97%.

If the proportion of the organic solvent-insoluble portion of the second composition is less than 10% or its degree of optical anisotropy is less than 5%, the mesophase is hardly oriented in the direction of the fiber axis when the composition is melt-spun. Accordingly, when the as-spun fibers are cured and pyrolyzed, there can only be obtained fibers having low strength and modulus of elasticity. On the other hand, when the second polymer composition contains more than 98% of the organic solvent-soluble portion, or has a degree of optical anisotropy of more than 97%, the amount of the mesophase in the composition becomes excessive, and the composition is difficult to spin.

The second fibers may be produced from the second polymer composition of this invention by quite the same process as that for producing the first fibers of this invention.

Thus, the present invention also provides fibers of high strength and elasticity comprising components (i), (ii) and (iii') described above.

The component (i) is crystalline carbon oriented substantially in the direction of the fiber axis. In relation to the above production process, this component is believed to be derived from a polycyclic aromatic compound in the mesophase, or in other words, an optically anisotropic polycyclic aromatic compound. In the fibers of this invention, a structure well known in the art is observed in a fiber cross-section owing to the presence of component (i), namely a radical structure, an onion structure, a random structure, a core-radial structure, a skin onion structure, or a mosaic structure.

The constituent component (ii) is amorphous carbon and/or crystalline carbon oriented in a direction different from the direction of the fiber axis. Likewise, in relation to the above production process, it is believed that component (ii) is derived from an optically isotropic polycyclic aromatic compound.

The crystalline carbon has a crystallite size of not more than 500 angstrom. It is in the form of ultrafine graphite crystal particles in which under a high-resolution electron microscope, a fine lattice image corresponding to (002) plane having a planar spacing of 32 angstrom and oriented in the direction of the fiber axis is observed.

In the fibers of this invention, microcrystals having a small interlayer distance and arranged three dimensionally are effectively formed.

The silicon-containing component (iii') consisting essentially of the transition metal, silicon, carbon and oxygen may be an amorphous phase, or an aggregate consisting substantially of a crystalline fine particulate phase consisting of silicon, carbon and a transition metal selected from the group consisting of titanium, zirconium and hafnium and an amorphous $SiO_y$ ($0<y\leq 2$) and $MO_z$ (M is Ti, Zr or Hf, and $0<z\leq 2$).

The amorphous phase of the silicon-containing component tends to form when the pyrolyzing temperature in the production of the fibers is lower than 1000° C. The aggregate of the crystalline fine particulate phase and the amorphous phase tends to form when the pyrolyzing temperature is 1700° C. or higher.

The crystalline fine particulate phase consists of crystalline SiC, MC (M is as defined above), a crystalline solid solution of SiC and MC, and $MC_{1-x}$ ($0<x<1$), and may have a particle diameter of not more than 500 angstrom.

At pyrolyzing temperatures intermediate between the above temperatures, a mixture of the aggregates forms. The amount of oxygen in the fibers can be controlled by the proportion of $MX_4$ added or the curing conditions.

The state of distribution of the component (iii') may also be controlled by the atmosphere of pyrolyzing, or the size and concentration of the mesophase in the starting material. For example, when the mesophase is grown to a large size, the component (iii') is liable to be pushed out onto the surface of the fibers.

Preferably, the fibers of this invention contain 0.015 to 200 parts by weight of component (iii) per 100 parts by weight of the components (i) and (ii) combined, and the ratio of components (i) to (ii) is 1:0.02–4.

If the amount of component (iii) is less than 0.015 part by weight per 100 parts by weight of components (i) and (ii) combined, the resulting fibers do no differ from pitch fibers, and an improvement in oxidation resistance and wettability can hardly be expected. If the above proportion exceeds 200 parts by weight, fine crystals of graphite are not effectively formed, and fibers having a high modulus of elasticity are difficult to obtain.

The fibers of this invention preferably consist of 0.01 to 30% by weight of silicon, 0.01 to 10% by weight of the transition metal (Ti, Zr or Hf), 65 to 99.9% by weight of carbon, and 0.001 to 10% by weight of oxygen, particularly preferably 0.1 to 25% by weight of silicon, 0.01 to 8% by weight of the transition metal, 74 to 99.8% by weight of carbon, and 0.01 to 8% by weight of oxygen.

The first and second fibers may be advantageously used as a reinforcing material for composite materials. Examples of such composite materials are as follows:

(1) A fiber-reinforced composite material comprising a plastic as a matrix.

(2) A fiber-reinforced composite material ceramics as a matrix.

(3) A fiber-reinforced composite material comprising carbon as a matrix.

(4) A fiber-reinforced composite material comprising a pyrolyzed product of the polymer composition of this invention as a matrix.

(5) A composite material comprising a metal as a matrix.

These examples will be described successively.

For the composite material comprising a plastic as a matrix, both the first and the second fibers of the invention can be used.

Incorporation of the fibers may be effected by, for example, a method comprising incorporating these fibers in the matrix, monoaxially or multiaxially, a method comprising using the fibers in the form of a woven fabric such as a plain-weave fabric, a satin weave fabric, a twill fabric, an imitation gauze fabric, a helical weave fabric and a three-dimensionally woven fabric, or a method comprising using the fibers as chopped fibers.

Examples of the plastic include epoxy resins, unsaturated polyester resins, phenolic resins, polyimide resins, polyurethane resins, polyamide resins, polycarbonate resins, silicone resins, fluorine-containing resins, nylon resins, polyphenylene sulfide resins, polybutylene terephthalate, ultrahigh-molecular-weight polyethylene, polypropylene, modified polyphenylene oxide resins, polystyrene, ABS resins, vinyl chloride resins, polyether-ether ketone resins and bismaleimide resins.

These plastic composite materials can be produced by methods known per se, for example, (1) a hand layup method, (2) a matched metal die method, (3) a break away method, (4) a filament winding method, (5) a hot press method, (6) an autoclave method, and (7) a continuous pulling method.

According to the hand layup method (1), the fibers are cut and spread densely on a mold. Then, the plastic containing a catalyst is coated on the spread fibers by means of a brush or a roller and allowed to cure naturally. The mold is then removed to produce a composite material.

According to the matched metal die method (2), the fibers are impregnated with the plastic, a curing agent, a filler and a thickening agent, and then molded under heat and pressure to form a composite material. Depending upon the form of the material during the molding, either the SMC (sheet molding compound) method or the BMC (bulk molding compound) method may be selected.

According to the break away method (3), sheets of the fibers are impregnated with the plastic and precured to form prepregs. The prepregs are wound up around a tapered mandrel, and after curing, the cured composite material is pulled out. A hollow article of a complex shape can be produced by this method.

According to the filament winding methed (4), inorganic fibers impregnated with a thermosetting resin such as an epoxy resin or an unsaturated polyester resin, wound around a mandrel, and treated to cure the resin. The cured product was removed from the mandrel to form a composite material. This method is carried out by a wet procedure or a dry procedure (using a prepreg tape).

According to the hot press method (5), prepreg sheets of the fibers are stacked in one direction or at any desired angle, and the stack is heated under pressure by a hot press to form a composite material in the form of a plate.

According to the autoclave method (6), prepregs are stacked on a mold, and wrapped with a special rubber. In a vacuum condition, the stack is put in a high-pressure kettle and heated under pressure to obtain a cured composite material. This method is suitable for production of complex shapes.

According to the continuous pulling method (7), the fibers and the plastic are separately fed into a molding machine, and mixed just before a mold. On the way, the mixture is passed through a heating oven, and continuously taken up as a continuous long composite material.

The tensile strength ($\sigma_c$) of the composite material produced from the fibers and the plastic matrix is expressed by the following equation.

$$\sigma_c = \sigma_f N_f + \sigma_M V_M$$

In which $\sigma_C$: the tensile strength of the composite material
$\sigma_f$: the tensile strength of the fibers
$\sigma_M$: the tensile strength of the matrix
$V_f$: the volume percent of the fibers
$V_M$: the volume percent of the matrix As shown by the above equation, the strength of the composite material becomes larger as the volume percentage of the fibers in the composite material becomes larger. Accordingly to produce a composite material having high strength, the proportion of the volume of the inorganic fibers to be combined must be increased. However, if the volume proportion of the inorganic fibers exceeds 80%, the amount of the plastic matrix correspondingly decreases, and it is impossible to fill the interstices of the hybrid fibers sufficiently with the plastic matrix. As a result, the composite material produced does not exhibit the strength shown by the above equation. If the volume proportion of the fibers is decreased, the strength of the composite material correspondingly decreases as shown by the above equation. To produce a practical composite material, it is necessary to combine at least 10% of the fibers. In the production of fiber-reinforced plastic composite materials, the volume proportion of the fibers to be combined is preferably 10 to 80%, especially preferably 30 to 60%.

The various mechanical properties in the present specification are determined by the following measuring methods.

(a) Interlayer shear strength

In the testing method for determining interlayer shear stress, a composite material containing fibers (10×12×2 mm) oriented monoaxially is placed on two pins (length 20 mm) having a radius of curvature of 6 mm. By using a presser with its tip having a radius of curvature of 3.5 mm, the composite material was compressed and the so-called 3-point bending test was carried out, and its interlayer shear stress is measured, and expressed as shear stress (kg/mm$^2$).

(b) Tensile strength and tensile modulus in a direction perpendicular to the fibers A composite material, 2 mm thick, reinforced monoaxially with fibers was produced, and a test piece, 19×127 mm, was taken from it so that the axial direction of the test piece became perpendicular to the direction of the fiber arrangement. The test piece had a thickness of 2 mm. A curvature of 125 mmR was provided in the thickness direction at the centeral portion of the test piece was finished in a thickness of about 1 mm. The pulling speed was 1 mm/min., and the tensile strength (kg/mm$^2$) and tensile modulus (t/mm$^2$) were determined.

(c) Flexural strength and flexural modulus in a direction perpendicular to the fibers A composite material, 2 mm thick, reinforced monoaxially with fibers was produced, and a test piece, 12.7×85 mm, was taken from it so that the axial direction of the test piece became perpendicular to the direction of the fiber arrangement. The test piece had a thickness of 2 mm. A curvature of 125 mmR was provided in the thickness direction at the centeral portion of the test piece was finished in a thickness of about 1 mm. The test piece is subjected to a 3-point bending test, and the flexural strength (kg/mm$^2$) and the flexural modulus (t/mm$^2$) are determined.

The interlayer shear strength, the tensile strength in the direction perpendicular to the fibers and the flexural strength in the direction perpendicular to the fibers are indices showing the strength of bonding between the matrix and the fibers.

(d) Tensile strength and tensile modulus

A composite material, 2 mm thick, reinforced monoaxially with fibers was produced, and a test piece, 12.7×85 mm, was taken from it so that the axial direction of the test piece became perpendicular to the direction of the fiber arrangement. The test piece had a thickness of 2 mm. A curvature of 125 mmR was provided in the thickness direction at the centeral portion of the test piece was finished in a thickness of about 1 mm. The pulling speed was 1 mm/min., and the tensile strength (kg/mm$^2$) and tensile modulus (t/mm$^2$) were determined.

(e) Flexural strength and flexural modulus

A composite material, 2 mm thick, reinforced monoaxially with fibers was produced, and a test piece, 12.7×85 mm, was taken from it so that the axial direction of the test piece became perpendicular to the direction of the fiber arrangement. The test piece had a thickness of 2 mm. A curvature of 125 mmR was provided in the thickness direction at the centeral portion of the test piece was finished in a thickness of about 1 mm. The test piece was subjected to a 3-point bending test, and the flexural strength (kg/mm$^2$) and the flexural modulus (t/mm$^2$) were determined.

(f) Flexural impact value

Flexural impact value was measured by the Charpy testing method (JIS K7111) by three-point bending. The result was expressed by flexural impact value (kg·cm/cm$^2$).

The flexural impact value is an index representing the strength of bonding between the plastic and the fibers, particularly an index representing the strength of resistance to instantaneous impact. If the flexural impact value is low, the resin is liable to separate from the fibers, and destruction is liable to occur owing to instantaneous impact.

The above plastic composite material has a) an interlayer shear strength of at least 8.5 kg/mm$^2$, b) a tensile strength in a direction perpendicular to the fibers of at least 6 kg/mm$^2$, c) a flexural modulus in a direction perpendicular to the fibers of at least 8 kg/mmhu 2, and d) a flexural impact value of at least 200 kg·cm/cm$^2$.

Since the fibers of this invention have excellent wetting property with respect to the plastics, the fiber-reinforced plastic composite material of this invention does not particularly require surface-treatment of the fibers and has excellent strength of bonding between the fibers and the plastic. Accordingly, the present invention provides a composite material having excellent interlayer shear strength, tensile strength in a direction perendicular to the fibers, a flexural strength in a direction perpendicular to the fibers, and flexural impact value.

Since the fibers of this invention contain carbon in which the crystals are oriented, they have higher elasticity than amorphous inorganic fibers. Accordingly, plastic composite materials reinforced with the fibers of this invention have excellent tensile modulus and flexural modulus.

The fibers of this invention are produced at lower costs than conventional silicon carbide fibers because the use of an expensive organic silicon compound is decreased.

The fibers of this invention have an excellent reinforcing effect in plastic composite materials. The resulting reinforced plastic composite materials have excellent mechanical properties and can withstand in a severe environment over long periods of time. Hence, they can be used in applications in which conventional inorganic fiber-reinforced plastic composite materials cannot be used satisfactorily. For example, such reinforced materials can be used as building materials, materials for aircraft and space exploiting devices, materials for ships and boats, materials for land transportation machines and devices, and materials for acoustic machines and devices.

The first or second fibers of the invention may be hybridized with fibers selected from the group consisting of the fibers of the invention, carbon fibers, glass fibers, boron fibers, alumina fibers, silicon nitride fibers, aramid fibers, silicon carbide fibers, silicon carbide fibers having carbon as a core and Si—M—C—O fibers (M=Ti or Zr) having carbon as a core, and the resulting hybrid fibers may be used to reinforce plastic composite materials. The proportion of the fibers of this invention in the hybrid fibers is at least 10%, preferably at least 20%. If the proportion is lower than 10%, the hybrid fibers have a reduced improving effect in respect of the strength of bonding between the fibers and the plastic, the reinforcing efficiency or the mechanical properties such as fatigue strength. In other words, the hybrid fibers have a reduced improving effect on interlayer shear strength, flexural impact value and fatigue strength.

The states of hybridization of the hybrid fibers are (1) interhybridization achieved by lamination of a layer of a certain kind of fibers and a layer of another kind of fibers, and (2) interlayer hybridization achieved by hybridization within one layer, which are basic, and there are (3) combinations of these. The main combinations are of the following 6 types.

(a) Lamination of single layer tapes (alternate lamination of layers of dissimilar fibers)

(b) Sandwich-type (lamination of dissimilar layers in a sandwich form)

(c) Rib reinforcement (d) Lamination of mix-woven tows (hybridization of dissimilar monofilaments)

(e) Lamination of mix-woven tapes (hybridization of dissimilar yarns within a layer)

(f) Mix-woven surface layer

Plastic composite materials reinforced with these hybrid fibers have the same excellent advantages as the above-described composite materials.

Fiber-reinforced composite materials including ceramics as a matrix:

Both the first and second fibers of this invention described above may be used as the reinforcing fibers.

These fibers may be directly oriented in the monoaxial or multiaxial directions in the matrix. Alternatively, they may be used as woven fabrics such as a plain weave fabric, a satin weave fabric, an imitation gauze fabric, a twill fabric, a helical weave fabric, or a three-dimensionally woven fabric, or in the form of chopped fibers.

Carbides, nitrides, oxides, or glass ceramics, for example, may be conveniently used as the ceramics. Examples of the carbide ceramics that can be used include silicon carbide, titanium carbide, zirconium carbide, vanadium carbide, niobium carbide, tantalum carbide, boron carbide, chromium carbide, tungsten carbide and molybdenum carbide. Examples of the nitride ceramics are silicon nitride, titanium nitride, zirconium nitride, vanadium nitride, niobium nitride, tantalum nitride, boron nitride, aluminum nitride and hafnium nitride. Examples of the oxide ceramics include alumina, silica, magnesia, mulite and corierite. Examples of the glass ceramics are borosilicate glass, high silica glass and aluminosilicate glass. In the case of using these ceramic matrices in the form of a powder, the powder is advantageously as fine as possible and at most 300 micrometers in maximum particle diameter in order to better the adhesion of the ceramics to the fibers.

The proportion of the fibers of this invention mixed in the matrix is preferably 10 to 70% by volume. If the above mixing ratio is less than 10% by volume, the reinforcing effects of the fibers does not appear sufficiently. If it exceeds 70%, the amount of the ceramics is small so that the interstices of the fibers cannot be filled sufficiently with the ceramics.

In the production of the ceramic composite materials, it is possible to use a binder (sintering aid) for sintering the powdery ceramic matrix to a high density and/or a binder for increasing the adhesion of the powdery ceramic matrix to the fibers.

The former binder may be ordinary binders used at the time of sintering the carbide, nitride, oxide and glass ceramics. For example, boron, carbon and boron carbide may be cited as a binder for silicon carbide. Examples of binders for silicon nitride are aluminum oxide, magnesium oxide, yttrium oxide and aluminum oxide.

Preferred examples of the latter binder include organic silicon polymers such as diphenylsiloxane, dimethylsiloxane, polyborodiphenylsiloxane, polyborodimethylsiloxane, polycarbosilane, polydimethylsilazane, polytitanocarbosilane and polyzirconocarbosilane, and organic silicon compounds such as diphenylsilanediol and hexamethyldisilazane.

The binder for increasing the adhesion of the powdery ceramic matrix to the inorganic fibers, when heated, is converted mainly into SiC or $Si_3N_4$ which reacts on the surface of the powdery ceramic matrix to form a new carbide, nitride or oxide. Consequently, the adhesion of the powdery ceramic matrix to the inorganic fibers becomes very superior. These organic silicon compounds or polymers, like the ordinary binders, act to increase the sinterability of the powdery ceramic matrix. Accordingly, the addition of these binders is very advantageous to the production of composite materials having high strength. Where a strong adhesion between the powdery ceramic matrix and the fibers can be obtained, it is not necessary to add binders.

The amount of the binders may be one sufficient for producing an effect of the addition.

Usually, it is preferably 0.5 to 20% by weight based on the powdery ceramic matrix.

The ceramic composite materials reinforced with the fibers of this invention can be produced, for exmple, by the following methods.

There are various methods of obtaining aggregates of the powdery ceramic matrix and the fibers. The aggregate can be obtained relatively easily, particularly by embedding the fibers in a mixture of the powdery ceramic matrix or ceramics and a binder, a method of alternatingly arranging the fibers and the powdery ceramic matrix or the above mixture, or a method comprising arranging the fibers, and filling the interstices of the fibers with the powdery ceramic matrix or the above mixture.

Sintering of the aggregates may be effected, for example, by a method comprising compression molding the aggregate by using a rubber press, a mold press, etc. under a pressure of 50 to 5,000 kg/cm$^2$, and sintering the resulting molded product in a heating furnace at 800° to 2400° C., or by a method which comprises sintering the aggregate at a temperature of 800° to 2400° C. by hot pressing while it was compressed under a pressure of 50 to 5,000 kg/cm$^2$.

The above sintering methods may be carried out in an atmosphere, for example an inert gas as nitrogen, argon, carbon monoxide or hydrogen or in vacuum.

As shown in Example 102, in the production of the above fiber-reinforced ceramic composite material, a precursor of the fibers (precursor fibers before curing may be used instead of the fibers.

By subjecting the resulting sintered composite material to a series of treatments to be described below at least once, a sintered body having a higher density can be obtained. Specifically, a sintered body having a higher density can be obtained by a series of treatments of immersing the sintered body under reduced pressure in a melt of the organic silicon compound or polymer, or if desired, in a solution of the above compound or polymer to impregnate the melt or solution in the grain boundaries and pores of the sintered body, and heating the sintered body after impregnation. The impregnated organic silicon compound of polymer changes mainly into SiC or Si$_3$N$_4$. They exist in the brain boundaries and the pores of the composite sintered body. They reduce the cores and at the same time, form a firm bond in the ceramic matrix, and thus increases the mechanical strength of the product.

The mechanical strengh of the resulting sintered body may also be increased by coating the organic silicon compound or polymer either as such or a solution of it in an organic solvent to clog the pores, or by coating it on the surface of the sintered product and then heat-treating the coated sintered body by the same method as above.

The organic solvent which may be used as required may be, for example, benzene, xylene, hexane, ether, tetrahydrofuran, dioxane, dchloroform, methylene chloride, ligroin, petroleum ether, petroleum benzine, dimethyl sulfoxide and dimethylformamide. The organic silicon compound or polymer is dissolved in the organic solvent and can be used as a solution having a lower viscocity.

The heat-treatment is carried out at 800° to 2400° C. in an atmosphere of at least one inert gas selected from nitrogn, argon and hydrogen or in vaccum.

The series of impregnation or coating operations may be repeated any number of times so long as these operations are possible.

In the production of the fiber-reinforced ceramic composite material, the form of the starting ceramic and the method of producing the composite are not to be limited to those described above, and ordinary forms and methods used may be employed without any inconvenience.

For example, a fine powder obtained by the sol-gel method and a precursor polymer convertible to the ceramics by pyrolyzing may be used as the starting ceramics. When the reinforcing fibers are short fibers, injection molding, extrusion molding and casting may be employed as the molding method. By jointly using HIP (hot isostatic pressing) in pyrolyzing, the performance of the composite material may be increased. On the other hand, excellent composite materials may also be obtained by vapor-phase methods such as CVD and CVI.

The fracture toughness K$_{Ic}$, of the ceramic composite material to that of the matrix alone containing no fibers is about 2 to 7, and the ceramic composite material has a reduction rate of flexural strength (to be referred to as a "flexural strength reduction rate"), measured by a thermal shock fracture resistance method, of less than about 10%.

The fracture toughness (K$_{Ic}$) is measured by the IF method (Indentation Fracture Method) described in J. Am. Ceram. Soc. 59, 371, 1976) of A. G. Evan.

The flexural strength reduction rate is determined from the flexural strength of a sample (obtained by heat-treating a piece, 3×3×30 mm, cut out from the ceramic composite material at a temperature of 800° to 1,300° C. in air or nitrogen for 20 minutes, immediately then immersing it in water at 25° C., and then drying it) measured by a three-point flexural strength testing method, and that of the ceramic composite material not subjected to the above heat-treatment.

The initial rate of fiber degradation induced by reaction to be simply referred to as the "degradation rate" is determined as follows:

The inorganic fibers, silicon carbide fibers or alumina fibers are embedded in the powdery ceramic matrix and then heated in an argon atmosphere at a predetermined temperature (the temperature used at the time of producing the composite material) for 5 minutes. The fibers are then taken out, and their tensile strength is measured. The difference between the measured tensile strength and the tensile strength of the fibers before the treatment is divided by the heating time (seconds), and the quotient is defined as the above "degradation rate".

As compared with conventional ceramic composite materials reinforced with carbon fibers, the above ceramic composite material can be used at high temperatures in an oxidizing atmosphere. Furthermore, as compared with ceramic composite materials reinforced with other fibers, the increase of K$_{Ic}$ in the above ceramic composite material greatly improves the inherent brittleness or the inherent nonuniformity of mechanical strength of the above ceramic composite material. Accordingly it is suitable for use as a structural material. The improvement of high temperature impact strength enables the above ceramic matrix composite material to be used in an environment where variations in temperature from high to low temperatures are great. The fibers of this invention are stable to the ceramic as a matrix, and fully achieves the inherent purpose of reinforcement with fibers.

Fiber-reinforced composite materials including carbon as a matrix:

Both the first and the second fibers of this invention can be used as the reinforcing fibers.

These fibers may be directly oriented in the monoaxial or multiaxial directions in the matrix. Alternatively, they may be used in woven fabrics such as a plain weave fabric, a satin weave fabric, an imitation gauze fabric, a twill fabric, a helical weave fabric, or a three-dimensionally woven fabric, or in the form of chopped fibers.

The proportion of the fibers of this invention mixed in the matrix is preferably 10 to 70% by volume. If the above mixing ratio is less than 10% by volume, the reinforcing effects of the fibers does not appear sufficiently. If it exceeds 70%, the amount of the ceramics is small so that it is difficult to fill the interstices of the fibers sufficiently with the ceramics.

Carbonaceous material for matrices of ordinary C/C composites may be used as materials for matrices of the above composite materials. Examples include materials which can be converted to carbon by pyrolyzing, for example, thermosetting resins such as phenolic resins and furan resin, and thermoplastic polymers such as pitch, moldable materials such as carbon powder or a mixture of carbon powder and the above resins. When carbon powder is used as a carbonaceous material for matrix, the use of a binder is more effective for increasing the adhesion of the matrix to the fibers.

Examples of the binder are organic silicon polymers such as diphenylsiloxane, dimethylsiloxane, polyborodiphenylsiloxane, polyborodimethylsiloxane, polycarbosilane, polydimethylsilazane, polytitanocarbosilane and polyzirconocarbosilane and organic silicon compounds such as diphenylsilanediol and hexamethyldisilazene.

The aggregate of the carbonaceous material and the fibers may be molded, for example, by a method comprising carbon powder optionally containing the binder to the reinforcing fibers, and molding the mixture by using a rubber press, a mold or a hot press, or a method comprising impregnating a solution of a thermosetting or thermoplastic resin in a bundle of the fibers or a woven fabric of the fibers, drying and removing the solvent, and molding the prepreg sheets by an ordinary method of molding an ordinary FRP, or a method comprising laminating prepreg sheets on a mold, and molding them by a hot press.

The resulting molded article, if required, is rendered infusible, and then in an inert atmosphere, heated at 800° to 3000° C. to carbonize the matrix component.

The resulting fiber-reinforced material may directly be used in various applications. Alternatively, it may be further repeatedly subjected to a step of impregnating it with a melt or solution of a thermoplastic or thermosetting resin and carbonizing the coated material to give a higher density and a higher strength. In particular, where mechanical properties are required, the density of the material can be effectively increased by a vapor-phase method such as CVI.

In the fiber-reinforced carbon material obtained, the reinforcing fibers are the fibers of this invention having high strength and high modulus, and have improved adhesion to the carbon matrix. Accordingly, the resulting fiber-reinforced carbon material has high strength, modulus and tenaciousness and also excellent practical mechanical properties such as abrasion resistance.

Accordingly, the resulting composite materials may advantageously be used in various kinds of brakes and heat-resistant structural materials.

Fiber-reinforced composite materials including a sintered body matrix produced from the polymer composition of the invention:

These composite materials include a composite material comprising the first fibers of the invention as the reinforcing fibers and a carbonized product of the first polymer composition of the invention as the matrix; a composite material comprising the first fibers of the invention as the reinforcing fibers, and a carbonized product of the second polymer composition of the invention as the matrix; a composite material comprising the second fibers of the invention as the reinforcing fibers and a carbonized product of the first polymer composition of the invention as the matrix; and a composite material comprising the second fibers of the invention as the reinforcing fibers and a carbonized product of the second polymer composition of the invention as the matrix.

To describe these composite materials comprehensively, the "first and second" qualifying the fibers and the polymer compositions will be omitted hereinafter.

A fiber-containing molded article is produced by, for example, a method comprising adding a powder of the polymer composition to a fabric of the fibers such as a plain weave fabric, a satin weave fabric, an imitation gauze fabric, a twill fabric, a helical woven fabric or a three-dimensionally woven fabric, a method comprising impregnating the fabric with a solution or slurry of the polymer composition, removing the solvent, drying the impregnated fabric, and heat-molding the prepreg sheet, or a method comprising melt-kneading the short fibers or chopped fibers with the polymer composition and molding the mixture by compression or injection molding. At this time, the content of the fibers in the molded article is preferably 10 to 70% by volume. The polymer composition of this invention as such may be used in this step. However, since it is not necessary to fiberize the polymer composition further, the ratio of silicon to carbon may be set within a slightly broader range than in the case of the composition of this invention.

The proportions of the optically isotropic pitch used may be adjusted to 10 to 4,900 parts by weight per 100 parts by weight of the organic silicon polymer. The proportion of the mesophase pitch may be adjusted to 5 to 50,000 parts by weight per 100 parts by weight of the reaction product of the organic silicon polymer and the isotropic pitch.

In the production of the fiber-containing molded article, the polymer composition may be used as a mixture of it with a calcined inorganic powder obtained by pyrolyzing the polymer composition at 800° to 1,000° C. in an inert atmosphere.

This calcined powder preferably consists essentially of 0.01 to 69.9% of Si, 29.9 to 99.9% of C and 0.01 to 10% of O if it does not contain a transition metal compound. If it contains a tansition metal, it preferably consists essentially of 0.005 to 30% of the transition metal, 0.01 to 69.9% of Si, 29.9 to 99.9% of C and 0.01 to 10% of O.

Then, as required, the product is subjected to a curing treatment.

The methods of curing in the production of the fibers of this invention may be directly used to perform this treatment.

The molded article rendered infusible is pyrolyzed at a temperature of 800° to 3,000° C. in vacuum or in an inert gas to give a composite material containing a matrix composed of carbon, silicon and oxygen, which is carbonized and fiber-reinforced.

It is presumed that in the process of heating, carbonization begins to be vigorous at about 700° C., and is nearly compeleted at about 800° C. It is preferred therefore to perform pyrolyzing at temperatures of 800° C. or above. To obtain temperatures higher than 3,000° C. requires expensive equipment, and pyrolyzing at high temperatures above 3,000° C. is not practical from the viewpoint of cost.

The step of curing may be omitted by greatly decreasing the temperature-elevation rate for carbonization in this step or by using a shape retaining jig for the molded article, or a shape retaining means such as a powder head. By performing the molding with a high temperature hot press, a high-density composite can be obtained in one step.

The fiber-reinforced carbonaceous composite material obtained by pyrolyzing and carbonization contains some open pores. If required, it may be impregnated with a molten liquid, solution or slurry of the polymer composition and then pyrolyzed and carbonized after optionally it is cured. This gives a composite having a higher density and higher strength. The impregnation may be effected by any of the molten liquid, solution and slurry of the polymer composition. To induce permeation into fine open pores, after the composite material is impregnated with the solution or slurry of the polymer composition, it is placed under reduced pressure to facilitate permeation into the fine pores. Then, it is heated while evaporating the solvent, and subjected to a pressure of 10 to 500 kg/mm$^2$. As a result, the molten liquid of the polymer composition can be filled in the pores.

The resulting impregnated material can be cured, pyrolyzed and carbonized in the same way as above. By repeating this operation 2 to 10 times, a fiber-reinforced composite material having a high density and high strength can be obtained.

This fiber-reinforced carbonaceous composite material is characterized by having high strength, high modulus of elasticity and excellent tenaciousness since, the reinforcing fibers have high strength and modulus of elasticity, and improved adhesion to the carbon matrix.

Furthermore, it has excellent oxidation resistance and abrasion resistance attributed to the effect of the siliicon carbide component contained in the fibers and the matrix. Accordingly, this composite material have excellent mechanical properties, oxidation resistance and abrasion resistance, and is useful as various types of brakes and thermally resistant structural materials.

Fiber-reinforced composite materials including a metal as a matrix:

The first and second fibers of this invention may be used directly as the reinforcing fibers. They may also be used as fibers to which at least one adhering material selected from the group consisting of fine particles, short fibers and whiskers of thermally resistant materials.

First, a method of adhering at least one adhering material selected from the group consisting of fine particles, short fibers and whiskers of thermally stable materials to the surface of the fibers of this invention provided as continuous filaments will be described.

Examples of the thermally stable materials are metals, ceramics and carbon.

Specific examples of the metals as the thermally stable materials are steel, stainless steel, molybdenum and tungsten. Specific examples of the ceramics include carbides such as SiC, TiC, WC and B$_4$C, nitrides such as Si$_3$N$_4$, BN and AlN, borides such as TiB$_2$ and ZrB$_2$ and oxides such as Al$_2$O$_3$, B$_2$O$_3$, MgO, ZrO$_2$ and SiO$_2$. Other examples of the ceramics include polycarbosilane compositions, polymetallocarbosilane compositions, and calcination products of the first and second polymer compositions of this invention.

The form of the adhering material differs depending upon the combination of it with the continuous inorganic filaments or the required properties. The short fibers or whiskers of the adhering material desirably have an average particle diameter 1/3,000 to 1/5 of that of the continuous filaments and an aspect ratio of from 50 to 1,000. The fine particles desirably have an average diameter 1/5,000 to ½ of that of the continuous fibers.

The amount of the adhering material to be applied to the continuous fibers differs depending upon the properties of both, and the use of the fiber-rein-forced composite produced. In the case of using it for fiber-reinforced metals, the volume ratio of the adhering material based on the continuous filaments is preferably about 0.1 to 500%.

The adhering materials may be used singly or in combination. For example, when the fibers of this invention are to be used for reinforcing Al containing Co, Si, Mg and Zn, it is especially preferable to apply the fine particles to the neighborhood of the surface of the continuous fibers and apply the short fibers and/or the whiskers to the outside of the fine particles in order to prevent microsegregation of the added elements on the surface of the continuous filaments. In this case, the suitable ratio of the fine particles to the short fibers and/or the whiskers is from 0.1:5–40:1.

It is preferred to immerse the continuous filaments in a suspension of the adhering material because it is simple and has a wide range of application.

FIG. 1 shows one example of the outline of an apparatus used in the production of the above fibers.

A bundle 4 of continuous filaments (a woven fabric from the continuous filament bundle may be used instead of the continuous filament bundle) wound on a bobbin 5 is unwound, conducted by movable rollers 6 and 7, and passed through a liquid 3 in which the adhering material is suspended. Then, it is pressed by press rollers 8 and 9 and wound up on a bobbin 10. In the resulting filament bundle or fabric, the adhering material adheres to the surface of every individual continuous filament. There may be one treating vessel 1 containing a treating liquor 3. For various modified methods, two or more tgeating vessels containing treating liquors of different compositions respectively may be used.

To promote the adhesion of the adhering material to the continuous filaments, ultrasonic vibration 2 may be applied to the treating liquor 3. In the case of applying two or more kinds of the adhering material to the continuous filaments, the treating liquor may be a suspension of the fine particles and the short fibers and/or whiskers, or it is possible to use two treating vessels one containing a suspension of the fine particles as the treating liquor and the other containing a suspension of the short fibers and/or whiskers as the treating liquor. In the latter case, the sequence of immersing the continuous filament bundle or the woven fabric may start with the suspension of the fine particles or the suspension of the short fibers and/or whiskers.

Since the fibers having the adhering material are composed of a continuous filament bundle in which the adhering material adheres to the surface of every individual filament of the invention having high strength and high modulus of elasticity, these continuous filaments can be uniformly dispersed in the composite material, and the volume ratio of the fibers can be controlled to a very broad range. Furthermore, the contact among the continuous filaments decreases, and the resulting composite material has a uniform composition. This brings about the advantage of improving the mechanical properties such as strength of the composite material.

The reinforcing fibers may be applied to the matrix by, for example, arranging the fibers themselves in the monoaxial or multiaxial direction, or used in the form of various woven fabrics such as a plain weave fabric, a satin weave fabric, an imitation gauze fabric, a twill fabric, a helical woven fabric or a three-dimensionally woven fabric, or in the form of chopped fiber, to give the composite material of this invention.

Metals that can be used in this invention may be, for example, aluminum, aluminum alloys, magnesium, magnesium alloys, titaniuum, and titanium alloys.

The mixing proportion of the reinforcing fibers in the matrix is preferably 10 to 70% by weight.

The composite material can be produced by the following methods of producing ordinary fiber-reinforced metal composite materials. There are (1) a diffusion bonding method, (2) a melting permeation method, (3) a flame spraying method, (4) an electrolytic deposition method, (5) an extrusion and hot roll method, (6) a chemical vapor-phase deposition method, and (7) a sintering method.

(1) According to the diffusion bonding method, a composite material of reinforcing fibers and a matrix metal can be produced by aligning the reinforcing fibers and wires of the matrix metal alternately in one direction, covering the upper and lower surfaces of the arrangement with a thin coating of the matrix metal, or covering only the lower surface of it with the above thin coating and the upper surface of it with a powder of a mixture of the matrix metal and an organic binder to form a composite layer, laminating a plurality of such composite layers, and consolidating the laminate under heat and pressure.

The organic binder desirably volatilizes and dissipates before it is heated to a temperature at which it forms a carbide with the matrix metal. For example, CMC, paraffins, resins and mineral oils may be used.

Alternatively, the composite material may also be produced by bonding and coating a mixture of the matrix metal powder and the organic binder to the surfaces of the reinforcing fibers, aligning and laminating a plurality of layers of such fibers, and consolidating the laminate under heat and pressure.

(2) According to the melting permeation method, the composite material can be produced by filling the interstices of the aligned reinforcing fibers with molten aluminum, aluminum alloy, magnesium, magnesium alloy, titanium or titanium alloy. Since the wettability of the metal-coated fibers with the matrix metal is good, the interstices of the aligned fibers can be filled uniformly with the matrix metal.

(3) According to the flame spraying method, a tape-like composite material can be produced by coating the matrix metal on the surface of aligned reinforcing fibers by plasma flame spray or gas flame spray. It may be used directly, or a plurality of the tape-like composite materials are laminated and subjected to the diffusion bonding method (1) to produce a composite material.

(4) According to the electrolytic deposition method, a composite material can be produced by electrolytically depositing the matrix metal on the surface of the reinforcing fibers, laminating a plurality of the composite materials, aligning them, and subjecting the lamination to the diffusion bonding method (1).

(5) According to the extrusion and hot roll method, a composite material can be produced by aligning the reinforcing fibers in one direction, sandwiching the aligned reinforcing fibers between foils of the matrix metal, optionally passing the sandwich structure between heated rolls to bond the fibers and the matrix metal.

(6) According to the chemical vapor deposition method, a composite material can be produced by placing the fibers in a heating furnace, introducing a gaseous mixture of, for example, aluminum chloride and hydrogen to thermally decompose the gas to deposit aluminum metal on the surface of the fibers, and laminating the metal-deposited fibers, and subjecting the laminate to the diffusion bonding method (1).

(7) According to the sintering method, a composite material can be produced by filling a powder of the matrix metal in the interstices of aligned fibers, and sintering the resulting product under pressure or without pressure.

The tensile strength ($\sigma_c$) of the composite material produced from the inorganic fibers and the metal matrix is represented by the above equation (see the above description on the composite material including a plastic matrix).

As shown by the above equation, the strength of the composite material becomes higher as the volume proportion of the reinforcing fibers in the composite material becomes larger. Hence, to produce a composite material having high strength, it is necessary to increase the volume proportion of the reinforcing fibers. However, if the volume proportion of the reinforcing fibers exceeds 70%, the amount of the metal matrix is small so that the intersices of the reinforcing fibers cannot be fully filled with the metal matrix. Hence, the composite material produced cannot exhibit the strength shown by the above equation. If the volume proportion of the reinforcing fibers in the composite material is decreased, the strength of the composite material decreases as shown by the above equation. To obtain a composite material having practical utility, it is mecessary to combine at least 10% of the reinforcing fibers. Accordingly, if the volume proportion of the reinforcing fibers is limited to 10 to 70% by volume in the production of the fiber-reinforced metal composite material, the best result can be obtained.

In the production of the composite material, it is necessary to heat the metal to a temperature near the melting point or a higher temperature as stated above, and combine it with the reinforcing fibers. Thus, the reduction of fiber strength by the reacion of the reinforcing fibers with the molten metal gives rise to a problem. But when the fibers of this invention are immersed in the molten metal, the abrupt degradation seen in ordinary carbon fibers is not observed, and therefore, a composite material having excellent mechanical strength can be obtained.

The methods of measuring the various mechanical properties used in this invention will be described.

(a) Initial rate of degradation induced by reaction (1) In the case of metals and alloys having a melting point of not more than 1200° C.

The fibers are immersed for 1, 5, 10, and 30 minutes respectively in a molten metal heated to a temperature 50° C. higher than the melting point of the metal. Then, the fibers are extracted, and their tensile strength is measured. From the results obtained, a reaction degradation curve showing the relation between the immersion time and the tensile strength of the fibers is determined. From a tangent at an immersion time of 0 minute, the initial rate of degradation induced by reaction (kg/mm$^2$-sec$^{-1}$) is determined.

(2) In the case of metals and alloys having a melting point higher than 1200° C.

The fibers are laminated to a metal foil. The laminate is placed under vacuum, heated to a temperature of (the melting point of the metal foil)×(0.6–0.7), and maintained under a pressure of 5 kg/mm$^2$ for 5, 10, 20 and 30 minutes, respectively. Then, the fibers are extracted, and their tensile strength is measured.

From the results, the initial rate of degradation induced by reaction is determined by the same procedure as in (1).

(b) Ratio of fiber strength reduction

The fiber strength at an immersion time and a maintenance time of 30 minutes in (a) above is determined. The ratio of fiber strength reduction is calculated by dividing (the initial strength—the fiber strength determined above) by the initial strength.

The initial rate of reduction by reaction shows the degree of the reaction between the fibers and the matrix in the production of a fiber-reinforced metal within a short time. The smaller this value, the better the affinity between the fibers and the matrix and the larger the fiber reinforcing effect.

(c) Interlayer shear strength test

The same as the method described above with respect to a composite material comprising plastics as a matrix.

(d) Fatigue test

A round rod (10 mm in diameter×100 mm in length) is produced from a composite material in which the inorganic fibers are aligned monoaxially. The axial direction of the composite material is the longitudinal direction of the rod. The rod is worked into a test specimen for a rotational bending fatigue test. The specimen is subjected to a rotational bending fatigue test with a capacity of 1.5 kgm, and its fatigue strength after $10^7$ times is measured and defined as the fatigue.

The ratio of the fatigue strength and the tensile strength is an index showing the strength of bonding between the matrix and the fibers.

Since the degradation of the fiber strength due to the reaction with the molten metal is little in the fibers of this invention, the fiber-reinforced metal composite materials including the fibers of this invention have excellent tensile strength and other mechanical properties, high modulus of elasticity and excellent thermal resistance and abrasion resistance. Accordingly, they are useful as various material in various technological fields such as synthetic fibers, synthetic chemistry, machine industry, construction machinery, marine and space exploitation, automobiles and foods.

According to this invention, a carbonized sintered body can be produced from a polymer composition by the following procedure.

Examples of the polymer composition that can be used at this time are the first and second polymer compositions of the invention, and polymer compositions having a slightly broader chemical composition than the polymer compositions of this invention, which are described with reference to the description of fiber-reinforced composite materials comprising a carbonized product of the polymer composition of the invention as a matrix.

The polymer composition or a mixture of the polymer composition and its calcination product is first finely pulverized, and can be molded by using a method of molding an ordinary carbonaceous material. The calcination may be carried out at a temperature of 800° to 1300° C.

The molding method can be selected from the molding methods for ordinary carbonaceous material by considering shape, size, use of the molded product and the productivity of molding. For example, for production of articles of the same shape with good productivity, a dry mold press method is suitable. To obtain molded articles of a slightly complex shape, an isostatic molding method (rubber press molding method) is suitable. For molding a molten mass of the above polymer, a hot press molding method, an injection molding method and an extrusion molding method are suitable.

In the case of molding the mixture of the polymer composition and its calcination product, the proportions of the polymer composition and its calcination product may be properly determined by considering the shape, use and cost of the molded article to be obtained.

The molded article is then subjected to an curing treatment.

A typical method of curing is to heat the molded article in an oxidizing atmosphere. The curing temperature is preferably 50° to 400° C. If the curing temperature is excessively low, bridging of the polymer does not take place. If this temperature is excessively high, the polymer burns.

The purpose of curing is to render the polymer constituting the molded article in the three-dimensional infusible insoluble bridged state and to have the molded article retain its shape without melting during carbonization in the next step. The gas constituting the oxidizing atmosphere during curing may be, for exampe, air, ozone, oxygen, chlorine gas, bromine gas, ammonia gas, or mixtures of these gases.

An alternative method of curing which may also be used comprises applying gamma-ray irradiation or electron beam irradiation to the molded article in an oxidizing or non-oxidizing atmosphere while as required heating it at low temperatures.

The purpose of gamma ray or electron beam irradiation is to prevent the matrix from melting and losing the shape of the molded article by further polymerizing the polymer constituting the molded article.

The suitable irradiation dose of gamma rays or electron beams is $10^6$ to $10^{10}$ rads.

The irradiation may be carried out in vacuum, in an inert gas atmosphere or in an atmosphere of an oxidizing gas such as air, ozone, oxygen, chlorine gas, bromine gas, ammonia gas or mixtures of these.

Curing by irradiation may also be carried out at room temperature. If required, by performing it while heating at a temperature of 50° to 200° C., the curing may be achieved in a shorter period of time.

The molded article rendered infusible is then pyrolyzed and carbonized at a temperature of 800° to 3000° C. in vacuum or in an inert gas.

It is presumed that in the heating process, carbonization begins to become vigorous at about 700° C., and is nearly completed at about 800° C. Hence, the pyrolyzing is preferably carried out at a temperature of at least 800° C. To obtain temperatures higher than 3000° C., expensive equipment is required. Accordingly, pyrolyzing at high temperatures higher than 3000° C. is not practical in view of cost.

The curing step may be omitted by making the temperature elevation rate for carbonization in this step very slow, or by using a jig for retaining the shape of the molded article or a shape retaining means such as a powder head. Alternatively, by using a high temperature hot press method in this molding step, the next step may be omitted.

As required, the resulting carbonaceous material may be impregnated with a melt, solution or slurry of the polymer solution, and pyrolyzed for carbonization. This further increases the density and strength of the carbonaceous material.

For impregnation, any of the melt, solution and slurry of the polymer composition may be used. To facilitate permeation into fine open pores, the carbonaceous material after impregnation with the solution or slurry of the polymer composition is placed under reduced pressure to facilitate permeation into the fine pores, heated while evaporating the solvent, and pressed under 10 to 500 kg/cm$^2$ thereby to fill the melt of the polymer composition into the pores.

The carbonaceous material impregnated with the polymer composition may be cured, pyrolyzed and carbonized in the same way as in the previous step. By repeating this operation 2 to 10 times, a carbonaceous material having high density and high strength can be obtained.

The state of existence of Si, C and O in the silicon-containing component corresponding to the constituent (iii) of the first fibers in the resulting carbonaceous material can be controlled by the carbonization temperature in the above-mentioned step.

When it is desired to obtain an amorphous material consisting substantially of Si, C and O, it is proper to adjust the carbonization temperature to 800° to 1000° C. If it is desired to obtain a material consisting substantially of beta-SiC and amorphous $SiO_x$ ($0<x\leq2$), temperatures of at least 1700° C. are suitable.

When a mixture of the aggregates is desired, temperatures intermediate between the above temperatures may be properly selected.

The amount of oxygen in the carbonaceous material of this invention may be controlled, for example, by the curing conditions in the above curing step.

The state of existence of Si, M, C and O in the silicon-containing component corresponding to component (iii) of the second fibers may be controlled likewise.

The resulting carbonaceous material contains a silicon carbide component very uniformly dispersed and integrated in carbon. The presence of this component promotes microcrystallization of carbon at low temperatures, inhibition of consumption of carbon by oxidation, and the increase of hardness.

The carbonaceous material, therefore, has excellent mechanical properties, oxidation resistance and abrasion resistance and can be advantageously used as various types of brakes and thermally stable structural materials.

Figure 1:
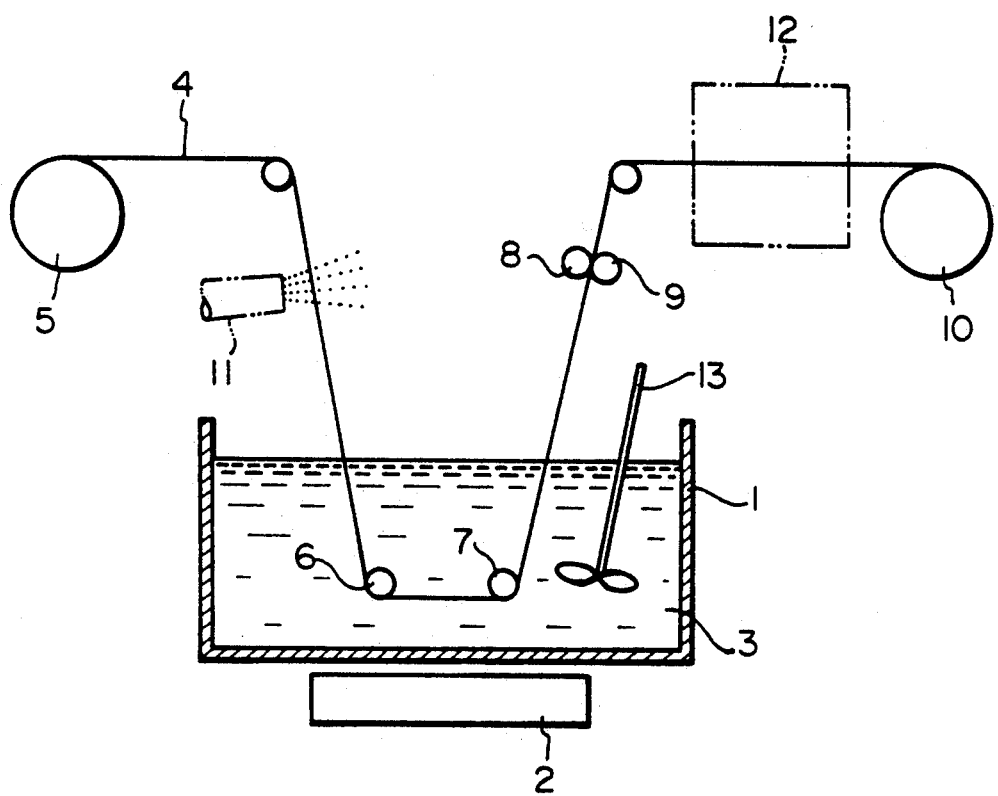
FIG. 1 is an outline view of an apparatus used for applying thermally stable fine particles to the surface of the fibers of this invention.

In the following examples, the weight average molecular weight and the softening point were measured by the following methods.

The weight average molecular weight ($\overline{Mw}$) is a value dertermined by the following procedure.

If the pitch is soluble in GPC measuring solvent (chloroform, THF or o-dichlorobenzene), it is dissolved in that solvent, and its molecular weight is measured by using an ordinary separation column.

The concentration of the sample is not particularly limited because integration may be carried out freely. The suitable concentration is 0.01 to 1% by weight.

On the other hand, when the pitch contains components insoluble in the above organic solvent, it is subjected to a hydrogenation treatment under mild conditions to hydrogenate part of the aromatic rings without cleaving the carbon-carbon bonds to render it solvent-soluble. Then, its GPC measurement is conducted.

The hydrogenation method wih lithium and ethylenediamine described by J. D. Brooks and H. Silverman (Fuel, 41, 1962, p. 67-69) is preferred because the hydrogenation can be performed under mild conditions below 100° C.

The results of the GPC measurement usually have a broad distribution, and $\overline{Mw}$ is determined by approximation to one peak.

The softening point is measured by using a commercial thermal analysis system, for example, Metler FP800 Thermosystem. Specifically, a sample is filled in a sample cylinder having an open pore portion at the bottom, and heated at a rate of 2 ° C./min., and the flowing of the sample from the pore portion by softening is optically detected, and the softening point is determined.

EXAMPLES

The following examples illustrate the present invention.

REFERENCE EXAMPLE 1

In a 5-liter three-necked flask were placed 2.5 liters of anhydrous xylene and 400 g of sodium. The flask inside was heated to the boiling point of xylene in a nitrogen gas current, and 1 liter of dimethyldichlorosilane was dropped into the flask in 1 hour. After the completion of the dropping, the flask contents was subjected to refluxing with heating for 10 hours to form a precipitate. The precipitate was collected by filtration and washed with methanol and water in this order to obtain 420 g of a polydimethylsilane as a white powder.

400 g of this polydimethylsilane was fed into a 3-liter three-necked flask provided with a gas-blowing tube, a stirrer, a cooler and a distillate tube and subjected to a heat treatment at 420° C. with stirring in a nitrogen current of 50 ml/min. to obtain 350 g of a colorless transparent slightly viscous liquid.

The liquid had a number-average molecular weight of 470 as measured by an osmotic pressure method.

The substance, as measured for infrared absorption spectrum, showed absorptions of Si—CH$_3$ at 650–900 cm$^{-1}$ and 1250 cm$^{-1}$, Si—H at 2100 cm$^{-1}$, Si—CH$_2$—Si at 1020 cm$^{-1}$ and 1355 cm$^{-1}$ and C—H at 2900 cm$^{-1}$ and 2950 cm$^{-1}$. The substance, as measured for far infrared absorption spectrum, showed an absorption of Si—Si at 380 cm$^{-1}$.

It was confirmed from the results of NMR analysis and infrared absorption analysis that the above organosilicon polymer was a polymer wherein the ratio of the total number of (Si—CH$_2$) units to the total number of (Si—Si) units is about 1:3.

300 g of the above organosilicon polymer was treated with ethanol to remove a low-molecular portion to obtain 40 g of a polymer having a number-average moleculer weight of 1200.

This substance was measured for infrared absorption spectrum, which gave the same absorption peaks as above.

It was confirmed from the results of NMR analysis and infrared absorption analysis that the organosilicon polymer was a polymer wherein the ratio of the total number of (Si—$CH_2$) units to the total number of (Si—Si) units was about 7:1.

REFERENCE EXAMPLE 2

High-boiling petroleum fractions (gas oil and heavier fractions) were subjected to fluid catalytic cracking and rectification at 500° C. in the presence of a silica-alumina cracking catalyst, and then a residue was obtained from the rectifier bottom. Hereinafter, this residue is referred to as FCC slurry oil.

The FCC slurry oil had a C/H atomic ratio of 0.75 by elemental analysis and an aromatic carbon ratio of 0.55 by NMR analysis.

EXAMPLE 1

First Step 100 g of the FCC slurry oil obtained in Reference Example 2 was heated for 2 hours at 420° C. in a nitrogen gas current of 1 liter/min to remove the 420° C. fraction. The residue was filtered at 150° C. to remove the portion which was not in a molten state at 150° C., and thereby to obtain 57 g of a lighter reforming pitch.

The reforming pitch had a xylene insoluble content of 60%.

57 g of the pitch was mixed with 25 g of the organosilicon polymer obtained in Reference Example 1 and 20 ml of xylene. The mixture was heated with stirring and, after distilling off xylene, was subjected to a reaction for 6 hours at 400° C. to obtain 43 g of a reaction product.

Infrared absorption spectrum analysis indicated that in the reaction product there occurred the decrease of the Si—H bond (IR: 2100 $cm^{-1}$) present in organosilicon polymer and the new formation of Si—C (this C is a carbon of benzene ring) bond (IR: 1135 $cm^{-1}$). Therefore, it became clear that the reaction product contained a structure in which part of the silicon atoms of organosilicon polymer bonded directly with a polycyclic aromatic ring.

The reaction product contained no xylene insoluble and had a weight-average molecular weight of 1450 and a melting point of 265° C.

Second Step 400 g of the FCC slurry oil obtained in Reference Example 2 was heated for 1 hour at 450° C. in a nitrogen gas current of 1 liter/min to remove the 450° C. fraction. The residue was filtered at 200° C. to remove the portion which was not in a molten state at 200° C., and thereby to obtain 180 g of a reforming pitch.

180 g of the reforming pitch was subjected to a condensation reaction for 8 hours at 400° C. in a nitrogen current while removing the light fractions formed by the reaction, to obtain 80.3 g of a heat-treated pitch. This heat-treated pitch had a melting point of 310° C., a xylene insoluble content of 97% and a quinoline insoluble content of 20%. The pitch was a meso phase pitch having an optical anisotropy of 95% when the polished surface was observed by a polarizing microscope.

Third Step 40 g of the reaction product obtained in the first step and 80 g of the mesophase pitch obtained in the second step were melt mixed for 1 hours at 350° C. in a nitrogen atomosphere to obtain a uniform silicon-containing reaction product.

This silicon-containing reaction product had an optical anisotropy of 51%, a xylene insoluble content of 68% and a melting point of 281° C. The reaction product, when subjected to a hydrogenation reaction under mild conditions and subsequently to the measurement of weight-average molecular weight by gel permeation chromatography (GPC), had a Mw of 1250.

The above silicon-containing reaction product was heated at 1000° C. in air; the resulting ash was subjected to alkali fusion and then to a hydrochloric acid treatment, and dissolved in water; the aqueous solution was measured for silicon concentration using a high frequency plasma emission spectrochemical analysis apparatus (ICP), which indicated that the silicon content in the silicon-containing reaction product was 5.2%.

EXAMPLES 2-8

Various silicon-containing reaction products were obtained by varying the feeding ratio of the organosilicon polymer and the reforming pitch and their copolymerization conditions in the first step of Example 1, the heat treatment conditions in the second step of Example 1, and the feeding ratio and the melt mixing (melt condensation) conditions in the third step of Example 1. The results are shown in Table 1 together with the results of Example 1. In all the Examples, the obtained silicon-containing reaction product had a silicon content of 0.4-24.8% and an optical anisotropy.

TABLE 1

| | First step | | | | | Second step | | |
|---|---|---|---|---|---|---|---|---|
| | Silicon-containing polymer (parts) | Pitch (parts) | Reaction temp. (°C.) | Reaction time (h) | Yield (%) | Reaction temp. (°C.) | Reaction time (h) | Yield (%) |
| Example 1 | 100 | 230 | 400 | 6 | 52 | 400 | 8 | 45 |
| Example 2 | 100 | 100 | 410 | 5 | 46 | 420 | 4 | 40 |
| Example 3 | 100 | 90 | 450 | 6 | 38 | 480 | 0.2 | 28 |
| Example 4 | 100 | 300 | 460 | 12 | 31 | 350 | 18 | 64 |
| Example 5 | 100 | 500 | 380 | 10 | 40 | 410 | 6 | 42 |
| Example 6 | 100 | 900 | 480 | 0.5 | 22 | 430 | 3 | 36 |
| Example 7 | 100 | 1900 | 420 | 3 | 42 | 450 | 0.5 | 35 |
| Example 8 | 100 | 100 | 320 | 48 | 65 | 380 | 12 | 52 |

| Third step | | | | Properties of silicon-containing reaction product | | | | |
|---|---|---|---|---|---|---|---|---|
| Reaction product obtained in first step | Mesophase pitch | Reaction temp. | Reaction time | Silicon content | Optical anisotropy | Xylene insoluble | Melting point | Weight-average molecular weight |

TABLE 1-continued

|  | (parts) | (parts) | (°C.) | (h) | (%) | (%) | (%) | (°C.) | ($\overline{Mw}$) |
|---|---|---|---|---|---|---|---|---|---|
| Example 1 | 100 | 200 | 350 | 1.0 | 5.2 | 51 | 68 | 281 | 1250 |
| Example 2 | 100 | 400 | 300 | 2.0 | 7.0 | 64 | 71 | 275 | 1460 |
| Example 3 | 100 | 10 | 400 | 0.5 | 24.8 | 8 | 12 | 310 | 3500 |
| Example 4 | 100 | 100 | 480 | 1.5 | 6.5 | 36 | 51 | 360 | 7000 |
| Example 5 | 100 | 600 | 330 | 3.0 | 1.0 | 71 | 80 | 265 | 1050 |
| Example 6 | 100 | 900 | 310 | 1.0 | 0.4 | 93 | 95 | 290 | 480 |
| Example 7 | 100 | 20 | 290 | 3.5 | 2.3 | 54 | 65 | 251 | 660 |
| Example 8 | 100 | 150 | 230 | 1.0 | 11.0 | 31 | 48 | 210 | 750 |

COMPARATIVE EXAMPLE 1

First Step 200 g of the FCC slurry oil obtained in Reference Example 2 was heated for 2 hours at 420° C. in a nitrogen gas current of 1 liter/min to remove the 420° C. fraction and thereby to obtain 114 g of a reforming pitch. The pitch was dissolved in 500 ml of xylene of 130° C. to remove 69 g of the xylene insoluble portion. The resulting xylene soluble pitch portion (45 g) was mixed with 45 g of the organosilicon polymer obtained in Reference Exxample 1, and the mixture was subjected to a copolymerization reaction for 6 hours at 400° C. to obtain 32 g of a reaction product.

Second Step 200 g of the xylene soluble pitch component was subjected to a heat treatment for 6 hours at 400° C. in an inert atmosphere to obtain 41 g of a heat-teated pitch.

Third Step 30 g of the reaction product obtained in the first step and 60 g of the heat-treated pitch obtained in the second step were mixed with heating for 2.5 hours at 300° C.

The product obtained above had a weight-average molecular weight (Mw) of 1750 and a silicon content of 10.5%, but had a low melting point of 198° C. and a low xylene insoluble content of 11% and was optically isotropic.

COMPARATIVE EXAMPLE 2

100 g of the reforming pitch obtained in the first step of Example 1 was mixed with 50 g of the organosilicon polymer obtained in Reference Example 1, and the mixture was subjected to a reaction for 6 hours at 400° C. to obtain 79 g of a reaction product.

The reaction product had a melting point of 252° C. and a silicon content of 15% and contained no xylene insoluble and no mesophase portion.

EXAMPLE 9

Each of the silicaon-containing reaction products obtained in Examples 1 and 2 was used as a spinning dope and subjected to melt spinning using a spinning nozzle of 0.3 mm in diameter. The resulting precursor fiber was cured at 300° C. in an air current and then subjected to pyrolyzing at 1300° C. in an argon current to obtain two carbonaceous inorganic fibers. The carbonaceous inorganic fiber producted from the Example 1 dope had a diameter of 14 $\mu$, a tensile strength of 190 kg/mm$^2$ and a tensile modulus of elasticity of 18 t/mm$^2$, and the carbonaceous inorganic fiber produced from the Example 2 dope had a diameter of 17 $\mu$, a tensile strength of 161 kg/mm$^2$ and a tensile modulus of elasticity of 16 t/mm2.

Observation by a scanning type electron microscope indicated that the both fibers had a sectional structure similar to the radial structure preferably used in pitch fibers and, in the two fibers, the mesophase component which had been present in the respective dopes was orientated to the fiber axis direction by the spinning, curing and pyrolyzing procedures.

COMPARATIVE EXAMPLE 3

Each of the reaction products obtained in Comparative Examples 1 and 2 was subjected to spinning, curing and pyrolyzing under the same conditions as in Example 9 to obtain two pyrolyzed fibers. The fiber obtained from the Comparative Example 1 dope had a diameter of 17 $\mu$, a tensile strength of 105 kg/mm$^2$ and a tensile modulus of elasticity of 7.1 t/mm$^2$, and the fiber obtained from the Comparative Example 2 dope had a diameter of 16 $\mu$, a tensile strength of 75 kg/mm$^2$ and a tensile modulus of elasticity of 5.0 t/mm$^2$.

The sections of these fibers contained no structure showing orientation.

EXAMPLE 10

First Step 200 g of the FCC slurry oil obtained in Reference Example 2 was heated for 0.5 hours at 450° C. in a nitrogen gas current of 2 liters/min to remove the 450° C. fraction. The residue was filtered at 200° C. to remove the portion which was not in a molten state at 200° C. and thereby to obtain 57 g of a reforming pitch.

This reforming pitch had a xylene insoluble content of 25%.

57 g of the pitch was mixed with 25 g of the organosilicon polymer obtained in Rference Example 1 and 20 ml of xylene. The mixture was heated with stirring to remove xylene and then subjected to a reaction for 6 hours at 400° C. to obtain 51 g of a reaction product.

Infrared absorption spectrum analysis indicated that in the reaction product there occurred the decrease of the Si—H bond (IR: 2100 cm$^{-1}$) present in organosilicon polymer and the new formation of Si—C (this C is a carbon of benzene ring) bond (IR: 1135 cm$^{-1}$). Therefore, it became clear that the reaction product contained a structure in which part of the silicon atoms of organosilicon polymer bonded directly with a polycyclic aromatic ring.

The reaction product contained no xylene insoluble and had a weight-average molecular weight of 1400, a melting point of 265° C. and a softening point of 310° C.

Second Step 180 g of the reforming pitch was subjected to a condensation reaction for 8 hours at 400° C. in a nitrogen current while removing the light fractions formed by the reaction, to obtain 97.2 g of a heat-treated pitch. The heat-treated pitch had a melting point of 263° C., a softening point of 308° C., a xylene insoluble content of 77% and a quinoline insoluble content of 31%. Observation by a polarizing microscope indicated that the pitch was a mesophase pitch having an optical anisotropy of 75%.

Third Step 6.4 g of the reaction product obtained in the first step and 90 g of the mesophase pitch obtained in the second step were melt mixed for 1 hour at 380° C. in a nitrogen atomosphere to obtain a uniform silicon-contaning reaction product.

This silicon-containing reaction product had an optical anisotropy of 61%, a xylene insoluble content of 70%, a melting point of 267° C. and a softening point of 315° C.

The reaction product was subjected to hydrogenation under mild conditions and then to gel permeation chromatography (GPC) to measure the weight-average molecular weight (Mw) of the reaction product. The Mw was 900.

The silicon-containing reaction product was heated to 1000° C. in air; the resulting ash was subjected to slkali fusion and then to a hydrochloric acid treatment, and dissolved in water; the aqueous solution was measured for silicon concentration using a high frequency plasma emission spectrochemical analysis apparatus (ICP), which indicated that the silicon content in the silicon-containing reaction product was 0.91%. Examples 11–19.

Various silicon-containing reaction products were obtained by varying the feeding ratio of the organosilicon polymer and the lighter reforming pitch and their copolymerization conditions in the first step of Example 10, the heat treatment conditions in the second step of Example 10, and the feeding ratio and the melt mixing (melt condensation) conditions in the third step of Example 10. The results are shown in Table 2 together with the results of Example 10. All of the silicon-containing reaction products obtained in Examples 11–19 had an optical anisotropy.

TABLE 2

| | First step | | | | | Second step | | |
|---|---|---|---|---|---|---|---|---|
| | Organo-silicon polymer (parts) | Pitch (parts) | Reaction temp. (°C.) | Reaction time (h) | Yield (%) | Reaction temp. (°C.) | Reaction time (h) | Yield (%) |
| Example 10 | 100 | 280 | 400 | 6 | 62 | 400 | 8 | 54 |
| Example 11 | 100 | 230 | 400 | 6 | 62 | 400 | 8 | 54 |
| Example 12 | 100 | 100 | 410 | 5 | 55 | 420 | 4 | 51 |
| Example 13 | 100 | 90 | 450 | 6 | 46 | 480 | 0.2 | 34 |
| Example 14 | 100 | 300 | 460 | 12 | 40 | 350 | 18 | 75 |
| Example 15 | 100 | 500 | 380 | 10 | 49 | 410 | 6 | 53 |
| Example 16 | 100 | 900 | 480 | 0.5 | 31 | 430 | 3 | 44 |
| Example 17 | 100 | 1900 | 420 | 3 | 50 | 450 | 0.5 | 43 |
| Example 18 | 100 | 100 | 320 | 48 | 71 | 380 | 12 | 60 |
| Example 19 | 100 | 228 | 400 | 6 | 62 | 400 | 8 | 54 |

| | Third step | | | | Properties of silicon-containing reaction product | | | | |
|---|---|---|---|---|---|---|---|---|---|
| | Reaction product obtained step (parts) | Mesophase pitch (parts) | Reaction temp. (°C.) | Reaction time (h) | Silicon content (%) | Optical anisotropy (%) | Xylene insoluble (%) | Melting point (°C.) | Weight-average molecular weight (Mw) |
| Example 10 | 100 | 1406 | 380 | 1.0 | 0.9 | 61 | 70 | 267 | 900 |
| Example 11 | 100 | 200 | 350 | 1.0 | 5.2 | 41 | 55 | 267 | 1150 |
| Example 12 | 100 | 400 | 300 | 2.0 | 7.0 | 50 | 58 | 261 | 1370 |
| Example 13 | 100 | 10 | 400 | 0.5 | 24.8 | 7 | 10 | 295 | 3400 |
| Example 14 | 100 | 100 | 480 | 1.5 | 6.5 | 30 | 41 | 341 | 6800 |
| Example 15 | 100 | 600 | 330 | 3.0 | 1.0 | 57 | 66 | 251 | 1020 |
| Example 16 | 100 | 900 | 310 | 1.0 | 0.4 | 71 | 79 | 271 | 700 |
| Example 17 | 100 | 20 | 290 | 3.5 | 2.3 | 45 | 52 | 250 | 680 |
| Example 18 | 100 | 150 | 230 | 1.0 | 11.0 | 26 | 39 | 220 | 740 |
| Example 18 | 100 | 6400 | 380 | 1.0 | 0.2 | 65 | 70 | 266 | 850 |

EXAMPLE 20

The silicon-containing reaction products obtained in Examples 10, 11 and 19 were used as a spining dope and subjected to melt spinning using a nozzle of 0.15 mm in diameter. Each of the resulting precursor fibers was cured at 300° C. in an air current and then pyrolyzed at 1300° C. in an argon current to obtain three carbonaceous inorganic fibers. The fiber obtained from the Example 10 dope had a diameter of 8 $\mu$, a tensile strength of 320 kg/mm$^2$ and a tensile modulus of elasticity of 26 t/mm$^2$; the fiber obtained from the Example 11 dope had a diameter of 9 $\mu$, a tensile strength of 260 kg/mm$^2$ and a tensile modulus of elasticity of 24 t/mm2; and the fiber obtained from the Example 19 dope had a diameter of 8 $\mu$, a tensile strength of 300 kg/mm$^2$ and a tensile modulus of elasticity of 22 t/mm$^2$.

Observation by a scanning type electron microscope indicated that all the fibers had a sectional struture similar to the radial structure preferably used in pitch fibers and, in these fibers, the mesophase componnt which had been present in the respective dopes was orientated to the fiber axis direction by the spinning, curing and pyrolyzing procedures.

EXAMPLE 21

First Step 100 g of the FCC slurry oil obtained in Reference Example 2 was heated for 2 hours at 420° C. in a nitrogen gas current of 1 liter/min to remove the 420° C. fraction. The residue was filtered at 150° C. to remove the portion which was not in a moleten state at 150° C. and thereby to obtain 57 g of a reforming pitch.

The reforming pitch had a xylene insoluble content of 60%.

57 g of the reforming pitch was mixed with 25 g of the organosilicon polymer obtained in Reference Example 1 and 20 ml of xylene. The mixture was heated with stirring and, after removing xylene, was subjected to a reaction for 4 hours at 400° C. to obtain 53 g of a reaction product. Infrared absorption spectrum analysis indicated that in the reaction product there occurred the decrease of the Si—H bond (IR: 2100 cm$^{-1}$) present in organosilicon polymer and the new formation of Si—C (this C is a carbon of benzene ring)bond (IR: 1135 cm$^{-1}$). Therefore, it became clear that the reaction product contained a structure in which part of the silicon atoms of organosilicon polymer bonded directly with a polycyclic aromatic ring.

The reaction product contained no xylene insoluble and had a weight-average molecular weight of 1150 and a melting point of 245° C.

Second Step 400 g of the FCC slurry oil obtained in Reference Example 2 was heated to 420° C. in a nitrogen gas current to remove the 420° C. fraction. The residue was filtered at 150° C. to remove the portion which was not in a molten state at 150° C., and then subjected to a condensation reaction for 9 hours at 400° C. to obtain a heat-treated pitch. The pitch had a melting point of 265° C., a softening point of 305° C. and a quinoline insoluble content of 25%. Observation of the polished surface of the pitch by a polarizing microscope indicated that the pitch was a mesophase pitch showing anisotropy.

This mesophase pitch was hydrogeneted at a hydrogen pressure of 100 kg/cm$^2$ using a michel-cobalt solid catalyst (carrier: zeolite), for 1 hour at 360° C. The hydrogenation product contained no quinoline insoluble and, when the polished surface was observed by a polarizing microscope, was an optically isotropic pitch. This pitch was kept for 30 minuites at 400° C. in a nitrogen current to effect heat stabilization and thereby to obtain a heated-treated pitch. The resulting pitch contained no quinoline insoluble, had a melting point of 230° C. and a softening poing of 238° C., and was an isotropic pitch. This heat-treated pitch was mede into a fiber using a capillary of 0.5 mm in diameter; the fiber was cured at 300° C. in air and pyrolyzed at 1000° C. in a nitrogen current; and the section of the resulting fiber was observed, which indicated that the fiber had orientation in the fiber axis direction. Therefore, the heat-treated pitch was found to be potentially anisotropic.

Third Step 40 g of the reaction product obtained in the first step and 80 g of the heat-treated pitch obtained in the second step were melt mixed for 1 hour at 350° C. in a nitrogen current to obtain a uniform silicon-containing reaction product.

This silicon-containing reaction product contained no quinoline insoluble and had a xylene insoluble content of 32%, an optical isotropy, a melting point of 241° C. and a softening point of 262° C. The reaction product had a weight-averagge molecular weight ($\overline{M}w$) of 980 as measured by gel permeation chromatography (GPC).

The silicon-containing reaction product was heated to 1000° C. in air; the resulting ash was subjected to alkali fusion and then to a hydrochloric acid treatment, and dissolved in water; the resulting aqueous solution was measured for silicon concentration by a high frequency plasma emission spectrochemical analyzer (ICP). It indicated that the silicon content in the silicon-containing reaction product was 5.4%.

EXAMPLE 22

First Step

A reaction poroduct was obtained in the same manner as in the first step of Example 21 except that the ratio of the reforming pitch and the organosilicon polymer was changed to 60 parts: 40 parts and the copolymerization temperature and time were changed to 420° C. and 2 hours, respectively. The reaction product had a melting point of 238° C. and a weight-average molecular weight ($\overline{M}w$) of 1400 and contained no quinoline insoluble.

Second Step

The same procedure as in the second step of Example 21 was repeated except that the conditions for obtaining a mesophase were 420° C. and 4 hours and the hydrogenation was effected for 2 hours at 95° C. using metallic lithium and ethylenediamine, to obtain a heat-treated pitch. This heat-treated pitch had a melting point of 225° C. and a softening point of 231° C. and was confirmed by the same method as in Example 21 to be potentially anisotropic.

Third Step

The same procedure as in the third step of Example 21 was repeated except that the feeding ratio of the reaction product obtained in the above first step and the heat-treated pitch obtained in the above second step was 1:6 by weight and the melt mixing temperature wa 380° C., to obtain a silicon-containing reaction product. This reaction product had a weight-avedrage molecular weight ($\overline{M}w$) of 800, a silicon content of 3.2%, a melting point of 232° C. and a softening point of 245° C.

COMPARATIVE EXAMPLE 4

First Step

This was effected in the same manner as in Comparative Example 1.

Second Step 200 g of the xylene-soluble pitch component obtained in the first step was heat-treated for 2 hours at 400° C. in a nitrogen atomosphere to obtain 65 g of a pitch which contained no quinoline insoluble and which was optically isotropic. This pitch caused no orientation when subjected to shear by the method of Example 21 and accordingly contained no potantially anisotropic component.

Third Step 30 g of the reaction product obtained in the first step and 60 g of the heat-treated pitch obtained in the second step were mixed for 1 hour at 340° C. The resulting product had a weight-average molecular weight ($\overline{M}w$) of 1450 and a silicon-content of 9.8% but a low melting point of 185° C.

EXAMPLE 23

The silicon-containing reaction products obtained in Examples 21 and 22 were used as a spinning dope and subjected to melt spinning using a nozzle of 0.3 mm in diameter. The resulting precursor fibers were cured at 300° C. in an air current and pyrolyzed at 1300° C. in an argon current to obtain carbonized inorganic fibers. The fiber obtained from the Example 21 dope had a diameter of 10 μ, a tensile strength of 260 kg/mm² and a tensile modulus of elasticity of 20 t/mm². The fiber obtained from the Example 22 dope had a diameter of 9 μ, a tensile strength of 290 kg/mm² and a tensile modulus of elasticity of 24 t/mm².

Observation by a scanning type electron microscope indicated that the both fibers had a sectional structure similar to the radial structure preferably used in pitch fibers and, in the two fibers, the mesophase component which had been present in the respective dopes was oriented to the fiber axis direction by the spinning, curing and pyrolyzing procedures.

COMPARATIVE EXAMPLE 5

The reaction product obtained in Comparative Example 4 was subjected to spinning, curing and pyrolyzing under the same conditions as in Example 23 to obtain a fiber. The fiber had a diameter of 17 μ, a tensile strength of 95 kg/mm² and a tensile modulus of elasticity of 6.0 t/mm². The section of the fiber contained no portion of orientation structure.

EXAMPLE 24

First Step

This was effected in the same manner as in the first step of Example 1.

Second Step 400 g of the FCC slurry oil obtained in Reference Example 2 and 300 g of 1,2,3,4-tetrahydroquinoline were subjected to a hydrogenation treatment for 10 minutes at 450° C. in an autoclave. Then, the tetrahydroquinoline was removed by distillation to obtain a hydrogenated pitch.

The pitch was fed into a metallic container. The container was immersed in a tin bath under a reduced pressure of 10 mmHg to treat the pitch for 10 minutes at 450° C. to obtain 62 g of a pitch.

The pitch had a melting point of 230° C., a softening point of 238° C. and a quinoline insoluble content of 2%.

Third Step 40 g of the reaction product obtained in the first step and 80 g of the pitch obtained in the second step were melt mixed for 1 hour at 350° C. in a nitogen atomosphere to obtain a uniform silicon-containing reaction product.

This silicon-containing reaction product had an optical isotropy, a xylene insoluble content of 45% and a melting point of 251° C. The reaction product, when hydrogenated under mild conditions and subjected to gel permeation chromatography to measure a weight-average molecular weight ($\overline{Mw}$), had a $\overline{Mw}$ of 1080.

The silicon-containing reaction product was heated to 1000° C. in air; the resulting ash was subjected to alkali fusion and then to a hydrochloric acid treatment, and dissolved in water; the resulting aqueous solution was measured for silicon concentration by a high frequency plasma emission spectrochemical analyzer (ICP). It indicated that the silicon content in the silicon-containing reaction product was 5.8%.

EXAMPLE 25

First Step

The same procedure as in Example 24 was repeated except that the ratio of the reforming pitch and the organosilicon polymer was changed to 60 parts: 40 parts and their copolymerization temperature and time were changed to 420° C. and 2 hours, respectively, to obtain a reaction procuct. This reaction product had a melting point of 238° C. and a weight-average molecular weight ($\overline{Mw}$) of 1400 and contained no quinoline insoluble.

Second Step

The FCC slurry oil obtained in Reference Example 2 was treated in an autoclave for 1 hour at 430° C. in a nitrogen atmosphere at an antogenic pressure of 95 kg/cm² (hydrogen partial pressure was 21 kg/cm²); then, the 320° C. or lower fraction was removed under a reduced pressure of 10 mmHg; and the resulting pitch was heated for 3 minutes at 450° C. to obtain a heat-treated pitch having a melting point of 251° C., a softening point of 260° C. and a quinoline insoluble content of 5%.

Third Step

The same procedure as in Example 24 was repeated except that the feeding ratio of the raction product obtained in the above first step and the heat-treated pitch obtained in the above second step were 40 parts: 60 parts and the melt mixing temperature and time were 380° C. and 30 minutes, respectively, to obtain a silicon-containing reaction product. The reaction product had an optical isotropy, a xylene insoluble content of 39%, a weight-average molecular weight ($\overline{Mw}$) of 1210, a silicon content of 8.2% and a melting point of 258° C.

EXAMPLE 26

The silicon-containing reaction products obtained in Examples 23 and 24 were used as a spinning dope and subjected to melt spinning using anozzle of 0.3 mm in diameter. The resulting precursor fibers were cured at 300° C. in an air current and pyrolyzed at 1300° C. in an argon current to obtain carbonized inorganjic fibers. The fiber obtained from the Example 23 dope had a diameter of 11 μ, a tensile strength of 288 kg/mm² and a tensile modulus of elasticity of 24 t/mm². The fiber obtained from the Example 24 dope had a diameter of 9 μ, a tensile strength of 261 kg/mm² and a tensile modulus of elasticity of 21 t/mm².

Observation by a scanning type electron microscope indicated that the both fibers had a sectional structure similar to the radial structure preferably used in pitch fibers and, in the two fibers, the mesophase component which had been present in the respective dopes was orientated to the fiber axis direction by the spinning, curing and pyrolyzing procedures.

EXAMPLE 27

First Step 170 g of the FCC slurry oil obtained in Reference Example 2 was heated to 420° C. in a nitrogen gas current to remove the 420° C. fraction. The residue was filtered at 150° C. to remove the portion which was not in a molten state at 150° C., to obtain 98 g of a reforming pitch.

The xylene soluble portion was removed from the reforming pitch to obtain a xylene insoluble component in an amount of 60%.

60 g of the xylene insoluble component was mixed with 25 g of the organosilicon polymer obtained in Reference Example 1 and 20 ml of xylene. The mixture was heated with stirring and, after distilling off xylene, subjected to a reaction for 4 hours at 400° C. to obytain 58 g of a reaction product.

Infrared absorption spectrum analysis indicated that in the reaction product there occurred the decrease of the Si—H bond (IR: 2100 cm$^{-1}$) present in organosilicon polymer and the new formation of Si—C (this C is a carbon of benzene ring) bond (IR: 1135 cm$^{-1}$). Therefore, it became clear that the reaction product contained a structure in which part of the silicon atoms of organosilicon polymer bonded directly with a polycyclic aromatic ring.

The above reaction product contained no xylene insoluble and had a weight-average molecular weight of 1250 and a melting point of 248° C.

Second Step 500 g of the FCC slurry oil obtained in Reference Example 2 was heated to 450° C. in a nitrogen gas current to remove the 450° C. fraction. The residue was filtered at 200° C. to remove the portion which was not in a molten state at 200° C. and thereby to obtain 225 g of a reforming pitch.

The xylene soluble portion was removed from the reforming pitch to obtain 180 g of a xylene insoluble portion.

180 g of the xylene insoluble portion was subjected to a condensation reaction for 6 hours at 400° C. in a nitrogen current while removing the light fractions formed by the reaction, to obtain 96 g of a heat-treated pitch. This heat-treated pitch had a melting point of 262° C. and a quinoline insoluble content of 7%. The pitch was found by observing its polished surface by a polarizing microscope, to be mesophase pitch having an optical anisotropy of 96%.

Third Step 40 g of the reaction product obtained in the first step and 80 g of the mesophase pitch obtained in the second step were melt mixed for 1 hour at 350° C. in a nitrogen atmosphere to obtain a uniform silicon-containing reaction poroduct.

The silicon-containing reaction product had an optical anisotropy of 58%, a xylene insoluble content of 71% and a melting 250° C. and, when subjected to hydrogenation under conditions and then to measurement of weight-average molecular weight ($\overline{M}w$) by gel permeation chromatography (GPC), had a $\overline{M}w$ of 1025.

The silicon-containing reaction product was heated to 1000° C. in air; the resulting ash was subjected to alkali fusion and then to a hydrochloric acid treatment, and dissolved in water; the resulting aqueous solution was measured for silicon concentration by a high frequency plasam emission spectrochemical analyzer (ICP). It indicated that the silicon content in the silicon-containing reaction product was 4.8%.

EXAMPLE 28

First Step

The same procedure as in Example 27 was repeated except that the xylene used as a solvent for washing the reforming pitch was changed to benzene, the ratio of the organosilicon polymer and the benzene insoluble portion was changed to 60 parts: 40 parts and the reaction conditions were changed to 420° C. and 2.5 hours, to obtain a reaction product. This reaction product had a melting point of 256° C. and a weitht-average molecular weight ($\overline{M}w$) of 1480.

Second Step

The same procedure as in Example 27 was repeated except that the xylene used as a solvent for washing the reforming pitch was changed to toluene and the heat treatment conditions were changed to 380° C. and 12 hours, to obtain a meso phase-containing pitch. This pitch had a melting point of 248° C. and a quinoline insoluble content of 5% and was found by observing its polished surface by a polarizing microscope, to be a meso- phase pitch having an optical anisotropy of 75%.

Third Step

The same procedure as in Example 27 was repeated except that the feeding ratio of the raction product obtained in the above first step and the mesophase pitch obtained in the above second step was 40 parts: 60 parts and the melt mixing conditions were 370° C. and 30 minutes, to obtain a silicon-containing raction product.

This reaction product had a melting point of 55° C., a xylene insoluble content of 58%, an optical anisotropy of 45%, a weight-average molecular weight ($\overline{M}w$) of 1210 and a silicon content of 8.5%.

EXAMPLE 29

The silicon-containing reaction products obtained in Examples 27 and 28 were used as a spinning dope and subjected to melt spinning using a nozzle of 0.3 mm in diameter. The resulting precursor fibers were cured at 300° C. in an air current and pyrolyzed at 1300° C. in an argon current to obtain carbonized inorganic fibers. The fiber obtained from the Example 27 dope had a diameter of 12 μ, a tensile strength of 288 kg/mm$^2$ and a tensile 15 modulus of elasticity of 26 t/mm$^2$. The fiber obtained from the Example 28 dope had a diameter of 11 μ, a tensile strength of 270 kg/:mm$^2$ and a tensile modulus of elasticity of 24 t/mm$^2$.

Observation by a scanning type electron microscope indicated that the bothe fibers had a sectinal structure similar to the radial structure preferably used in pitch fibers and, in the two finers, the mesophase components which had been present in the respective dopes was orientated to the fiber acis direction by the spinning, curing and pyrolyzing procedures.

EXAMPLE 30

(1) The mesophase pitch having an optical anisotropy of 95%, obtained in the second step of Example 1 was allowed to stand at 350° C. to separate and remove the light portion by means of specific gravity difference and thereby to obtain 80 g of the residue.

The reaction product obtained in the first step of Example 1 was melted and allowed to stand at 300° C. to separate and remove the light portion by means of specific grativy difference and thereby to obtain 40 g of the residue.

The above two residues (80 g and 40 g) were mixed and allowed to stand for 1 hour at 350° C. in a nitrogen atmosphere to obtain a uniform silicon-containing reaction product. This reaction product had a melting point of 290° C. and a xylene insoluble content of 70%.

Hereinafter, the reaction product is referred to as the matrix polymer I.

(2) A two-dimensional plain weave fabric made from a commercially available PAN-based carbon fiber having a diameter of 7 μm, a tensile strength of 300 kg/mm² and a tensile modulus of elasticity of 21 t/mm² was cut into discs each of 7 cm in diameter. The discs were impregnated with a xylene slurry containing 30% of the matrix polymer I and then dried to obtain prepreg sheets. In a mold, these prepreg sheets were laminated in a total sheet number of 30 with the fine powder of the matrix polymer I being packed between each two neighboring sheets and with the fiber direction of a sheet differing from that of the lower sheet by 45° C., and hot pressed at 350° C. at a pressure of 50 kg/cm² to form a disc-like molded material. This molded material was buried in a carbon powder bed for shape retention and heated to 800° C. at a rate of 5° C./h in a nitrogen current and then to 1300° C. to carbonize the matrix. The resulting composite material had a buld density of 1.60 g/cm³.

The composite material was immersed in a xylene slurry containing 50% of the polymer I; the system was heated to 350° C. under reduced pressure while distilling off xylene; then, a pressure of 100 kg/cm² was applied to effect impregnation. Thereafter, the impregnated composite material was heated to 300° C. in air at a rate of 5° C./h for curing and carbonized at 1300° C. This impregnation procedure was repeated three times to obtain a material having a bulk density of 1.95 g/cm³. The composite material had a flexural strength of 45 kg/mm².

COMPARATIVE EXAMPLE 6

Using, as a matrix polymer, a petroleum-based heat-treated pitch having a softening point of 150° C. and a carbon residue of 60%, the procedure of Example 30 (2) was repeated to obtain a carbon fiber-reinforced carbon material. This material had a low bulk density of 1.67 g/cm³ and a low flexural strength of 15 kg/mm².

EXAMPLE 31

(1) 50 g of the organosilicon polymer obtained in Reference Example 1 was mixed with 50 g of a reforming pitch. The mixture was subjected to a reaction for 4 hours at 420° C. to obtain a reaction product.

Separately, the reforming pitch was subjected to a reaction for 4 hours at 430° C. to obtain a mesophase pitch.

The reaction product and the mesophase pitch were mixed at a 50-50 weight ratio and melted to obtain a silicon-containing reaction product. Hereinafter, this reaction product is referred to as the matrix polymer II.

(2) A three-dimensional fabric made from a Si—M—C—O fiber [Tyranno (registered trade name) manufactured by Ube Industries, Ltd.] was impregnated with a xylene solution containing 50% of the matrix polymer II obtained in (1) above, in an autoclave and, after removing xylene by distillation, was pressurezed at 100 kg/cm² at 400° C. to obtain a molded material. This molded material was cured at 280° C. and pyrolyzed at 1300° C. for carbonization. The above procedure was repeated four times to obtain a composite material having a bulk density of 1.88 g/cm³ and a flexural strength of 38 kg/mm².

EXAMPLE 32

A bundle of commercially available pitch-based carbon fibers each having a diameter of 10 μm, a tensile strength of 300 kg/mm² and a tensile modulus of elasticiy of 50 t/mm² and arranged in the same one direction and a fine powder obtained by carbonizing the matrix polymer I at 800° C. were laminated by turns and hot pressed at 2000° C. at 500 kg/cm². The resulting composite material had a buld density of 2.05 g/cm³ and a flexural strength of 58 kg/mm².

EXAMPLE 33

The composite materials of Examples 30, 31 and 32 and the compjosite material of Comparative Example 6 were each heated for 1 hour in an oven having an atmospheric temperature of 600° C. and then measured for flexural strength.

In the composite material of Comparative Example 6, oxidative degradation progressed to such an extent that the strength measurement was impossible. Meanwhile in the composite material of Example 30, the flexural strength decreased by only 10% and, in the composite materials of Examples 31 and 32, no strength decrease was seen.

EXAMPLE 34

The powder of the matrix polymer I obtained in Example 30 was heated to 800° C. in a nitrogen current to prepare a prefired material. This prefired material was finely ground to obtain a prefired powder. This prefired powder and an equal weight of the polymer I powder were subjected to wet mixing to obtain a powder. The powder was hot pressed at 350° C. at 100 kg/cm² to obtain a disc-like molded material having a diameter of 7 cm. This molded material was buried in a carbon powder bed for shape retention and heated to 800° C. in a nitrogen current at a rate of 5° C./h and further to 1300° C. for carbonization. The resulting carbonaceous inorganic material had a bulk density of 1.50 g/cm³.

This carbonaceous inorganic material was immersed in a xylene slurry containing 50% of the polymer I and heated to 350° C. under reduced pressure while distilling off xylene; a pressure of 100 kg/cm² was applied for impregnation; the impregnated material was heated to 300° C. in air at a rate of 5° C./h for curing and then carbonized at 1300° C. This impregnation and carbonization procedure was repeated three more times to obtain a material having a bulk density of 1.95 g/cm³. The material had a flexural strength of 21 kg/mm². This carbonaceous inorganic material was pyrolyzed at 2500° C. in argon, whereby the bulk density and flexural strength improved to 1.99 g/cm³ and 24 kg/mm², respectively. Also, the material had a flexural strength of 25 kg/mm² at 1500° C. in nitrogen.

EXAMPLE 35

A prefired powder was prepared from the matrix polymer I in the same manner as in Example 34. 70% of this prefied powder was added to 30n % of a powder of the matrix polymer II obtained in Example 31 (1). They were molded and carbonized in the same manner as in Example 34 to obtain a carbonaceous inorganic material having a bulk density of 1.67 g/cm³.

In the same manner as in Example 34, this material was immersed in a xylene slurry containing 50% of the matrix polymer II and then carbonized; the impregnation and carbonization procedure was repeated three more times to obtain a carbonaceous inorganic material having a bulk density of 2.01 g/cm$^3$. The material had a flexural strength of 23 kg/mm$^2$. When this material was kept for 24 hours at 600° C. in air, there was no decrease in weight or in strength.

COMPARATIVE EXAMPLE 7

80% of a synthetic graphite powder having a bulk density of 0.15 g/cm$^3$ (under no load) was mixed with 20% of the mesophase pitch obtained in the second step of Example 1. The mixture was subjected to molding and carbonization in the same manner as in Example 34 to obtain a carbon material having a bulk density of 1.66 g/cm$^3$.

The impregnation of the carbon material with mesophase pitch and the subsequent carbonization of the impregnated carbon material was repeated four times in the same manner as in Example 34 to obtain a carbon material having a bulk density of 1.92 g/cm$^3$.

The carbon material had a flexural strength of 5 5.0 kg/mm$^2$. When the material was kept for 24 hours at 600° C. in air, the weight decreased by 20% and the material turned porous.

COMPARATIVE EXAMPLE 8

The carbon material having a bulk density of 1.66 g/cm$^3$, obtained in Comparative Example 7 was covered with a metallic silicon powder and heated to 1500° C. to give rise to melt impregnation, a reaction and sintering and thereby to obtain a carbon-carbon silicide composite material. The material had an improved flexural strength of 8.2 kg/mm$^2$. However, when the material was measured for flrxural strength at 1500° C. in nitrogen, the strength decreased to 3.0 kg/mm$^2$ because the unreacted siliconn melted and consequently deformation occurred.

EXAMPLE 36

First Step 500 g of the FCC slurry oil obtained in Reference Example 2 was heated for 1 hour at 450° C. in a nitrogen gas current of 1 liter/min to distil off the 450° C. fraction. The residue was filtered at 200° C. to remove the portion which was not in a molten state at 200° C. and thereby to obtain 225 g of a reforming pitch.

This reforming pitch had a xylene insoluble content of 75% and an optical isotropy.

49 g of the pitch was mixed 21 g of the organosilicon polymer obtained in Reference Example 1 and 20 ml of xylene. The mixture was heated with stirring and, after distilling off xylene, was subjected to a reaction for 6 hours at 400° C. to obtain 39 g of a precursor reaction product.

Infrared absorption spectrum analysis indicated that in the precursor reaction product there occurred the decrease of the Si—H bond (IR: 2100 cm$^{-1}$) present in organosilicon polymer and the new formation of Si—C (this C is a carbon of benzene ring) bond (IR: 1135 cm$^{-1}$). Therefore, it became clear that the precursor reaction product contained a structure in which part of the silicon atoms of organosilicon polymer bonded directly with a polycyclic aromatic ring.

Second Step 39 g of the precursor reaction product was mixed with 11 g of a xylene solution containing 2.75 g (25%) of tetraoctoxy-titanium [Ti(OC$_8$H$_{17}$)$_4$]. After distilling off xylene, the mixture was subjected to a reaction for 2 hours at 340° C. to obtain 38 g of a reaction product.

The reaction product contained no xylene insoluble and had a weight-average molecular weight of 1650 and a melting point of 272° C.

Third Step 400 g of a FCC slurry oil was heated to 450° C. in a nitrogen gas current to distil off the 450° C. fraction. The residue was filtered at 200° C. to remove the portion which was not in a molten state at 200° C., to obtain 180 g lighter reforming pitch.

180 g of the pitch was subjected to a condensation reaction for 7 hours at 400° C. in a nitrogen current while removing the light fractions formed by the reaction, to obtain 85 g of a heat-treated pitch.

The heat-treated pitch had a melting point of 268° C., a xylene insoluble content of 92% and a quinoline insoluble content of 12% and, when its polished surface was observed by a polarizing microscope, was a mesophase pitch having an optical anisotropy of 89%.

Fourth Step 15 g of the raction product obtaine in the second step and 75 g of the mesophase pitch obtained in the third step were melt mixed for 1 hour at 310° C. to obtain a uniform reaction product containing silicon and titanium.

This titanium-containing reaction product had an optical anisotropy of 66%, a xylene insoluble of 74% and a melting point of 270° C. and, when hydrogenated under mild conditions and measured for weight-average molecular weight ($\overline{M}w$) by gel permeation chromatography (GPC), had a $\overline{M}w$ of 880.

The titanium-containing reaction product was heated to 1200° C. in air; the resulting ash was subjected to alkali fusion and then to a hydrochloric acid treatment, and dissolved in water; the resulting aqueous solution was measured for silicon and titanium concentrations by a high frequency plasma emission spectrochemical analyzer (ICP). It indicated that the silicon and titanium concentrations in the titanium-containing reaction product were 3.1% and 0.1%, respectively.

EXAMPLES 37–42

Various titanium-containing reaction products were obtained by varying the feeding ratio and reaction conditions of the pitch, the organosilicon polymer and Ti(OC$_8$H$_{17}$)$_4$ in the first and second steps of Example 36, the heat treatment connditions in the third step of Example 36 and the feeding ratio and melt mixing (melt condensation) conditions in the fourth step of Example 36. The results are shown in Table 3 together with the results of Example 36. In each Example, the titanium-containing reaction product obtained contained silicon and titanium in amounts of 0.4–22.0% and 0.01–3.5% of, respectively, and had an optical anisotropy.

TABLE 3

| | First step | | Second step | Third step |
|---|---|---|---|---|
| | Organo- | Re- | | |

TABLE 3-continued

|  | silicon polymer (parts) | Pitch (parts) | Reaction temp. (°C.) | action time (h) | Yield (%) | Ti-(OC$_8$H$_{17}$)$_4$ (parts) | Reaction temp. (°C.) | Reaction time (h) | Reaction temp. (°C.) | Reaction time (h) | Yield (%) |
|---|---|---|---|---|---|---|---|---|---|---|---|
| Example 36 | 100 | 230 | 400 | 6 | 55 | 13 | 340 | 2 | 400 | 7 | 47 |
| Example 37 | 100 | 230 | 400 | 7 | 51 | 8 | 340 | 1 | 400 | 8 | 46 |
| Example 38 | 100 | 230 | 420 | 5 | 62 | 70 | 340 | 3 | 420 | 4 | 40 |
| Example 39 | 100 | 230 | 440 | 3 | 58 | 20 | 350 | 1 | 430 | 2 | 42 |
| Example 40 | 100 | 90 | 450 | 7 | 38 | 40 | 320 | 3 | 380 | 12 | 50 |
| Example 41 | 100 | 1900 | 420 | 4 | 63 | 10 | 300 | 6 | 460 | 0.5 | 35 |
| Example 42 | 100 | 500 | 480 | 0.5 | 26 | 30 | 330 | 4 | 410 | 6 | 42 |

|  | Fourth step | | | | Properties of titanium-containing reaction product | | | | | |
|---|---|---|---|---|---|---|---|---|---|---|
|  | Reaction product in second step (parts) | Meso-phase pitch (parts) | Reaction temp. (°C.) | Reaction time (h) | Silicon content (%) | Titanium content (%) | Optical aniso-tropy (%) | Xylene in-soluble (%) | Melting point (°C.) | Weight-average molecular weight (Mw) |
| Example 36 | 100 | 500 | 310 | 1 | 3.0 | 0.10 | 66 | 74 | 270 | 880 |
| Example 37 | 100 | 200 | 340 | 1 | 5.4 | 0.14 | 49 | 65 | 268 | 1240 |
| Example 38 | 100 | 400 | 300 | 2 | 2.8 | 0.61 | 63 | 70 | 272 | 960 |
| Example 39 | 100 | 900 | 350 | 1 | 1.5 | 0.30 | 81 | 86 | 273 | 650 |
| Example 40 | 100 | 20 | 400 | 0.5 | 22.0 | 3.50 | 12 | 20 | 340 | 5500 |
| Example 41 | 100 | 600 | 320 | 2 | 0.4 | 0.01 | 92 | 92 | 292 | 500 |
| Example 42 | 100 | 100 | 330 | 1 | 4.5 | 0.40 | 45 | 59 | 310 | 1150 |

COMPARATIVE EXAMPLE 9

First Step 200 g of the FCC oil slurry obtained in Reference Example 2 was heated at 420° C. for 2 hours in a nitrogen gas current of 1 liter/min to distil off the 420° C. fraction and thereby to obtain 114 g of a reforming pitch. The pitch was dissolved in 500 ml of xylene of 30° C. to remove 69 g of the xylene insrluble portion. The resulting xylene soluble portion (45 g) of the pitch was mixed with 45 g of the organosilicon polymer obtained in Reference Example 1, and the mixture was subjected to a copolymerization reaction for 6 hours at 400° C. to obtain 32 g of a precursor reaction product.

Second Step 200 g of the xylene soluble pitch component obtained in the first step was heat treated for 6 hours at 400° C. in an inert atmosphere to obtain 41 g of a heat-treated pitch.

Third Step 30 g of the copolymer obtained in the first step and 60 g of the heat-treated pitch obtained in the second step were mixed for 2.5 hours at 300° C.

The resulting reaction product had a weight-average molecular weight ($\overline{\text{Mw}}$) of 1750 and a silicon content of 10.5% but had a low melting point of 198° C., a low xylene insoluble content of 11% and an optical isotropy.

COMPARATIVE EXAMPLE 10

100 g of the mesophase pitch obtained in the third step of Example 36 was mixed with 50 g of the organosilicon polymer obtained in Example 1, and the mixture was subjected to a reaction for 6 hours at 400° C. to obtain 79 g of a precursor reaction product. The co-polymer had a melting point of 252° C., a silicon content of 15% and a weight-average molecular weight ($\overline{\text{Mw}}$) of 1400 and contained no xylene insoluble and no mesophase portion.

EXAMPLE 43

39 g of the precursor reaction product obtained in the first step of Example 36 was mixed with an ethanolxylene solution containing 5.4 g (1.5%) of tetrakisacetylacetonatozirconium. After distilling off the solvent, the mixture was subjected to a polymerization reaction for 1 hour at 250° C. to obtain 39.5 g of a reaction product.

20 g of this reaction product and 50 g of a mesophase pitch prepared in the same manner as in Example 36 were melt mixed for 1 hour at 350° C. to obtain 67 g of a reaction product containing silicon and zirconium.

This zirconium-containing reaction product had a melting point of 274° C., a xylene insoluble content of 69% and a number-average molecular weight of 1050.

The silicon and zirconium contents in the reaction product were 4.1% and 0.8%, respectively.

EXAMPLE 44

Using 60 g of the mesophase pitch obtained in Example 36 and 40 g of an organosilicon polymer, there was obtained 57 g of a precursor reaction product in the same manner as in Example 36.

40 g of this precursor reaction product was mixed with an ethanol-xylene solution containing 7.2 g of hafnium chloride. After distilling off ethanol and xylene, the mixture was subjected to a polymerization reaction for 1 hour at 250° C. to obtain 43.5 g of a reaction product.

20 g of this reaction product and 80 g of a mesophase pitch were melt mixed for 1 hour at 350° C. to obtain 96 g of a hafnium-containing reaction product.

This hafnium-containing reaction product had a melting point of 280° C., a xylene insoluble content of 76% and a number-average molecular weight of 980.

The silicon and hafnium contents in the reaction product were 3.6% and 1.9%, respectively.

EXAMPLE 45

The metal-containing reaction products obtained in Examples 36, 38, 39, 43 and 44 were used as a spinning dope and subjected to melt spinning using a nozzle of 0.15 mm in diameter. The resulting precursor fibers were cured at 300° C. in an air current and pyrolyzed at 1300° C. in an argon current to obtain carbonaceous inorganic fibers. The fiber obtained from Example 36 dope had a diameter of 9.5 μ, a tensile strength of 325 kg/mm² and a tensile modulus of elasticity of 32 t/mm². The fiber obtained from Example 38 dope had a diameter of 9.0 μ, a tensile strength of 318 kg/mm² and a tensile modulus of elasticity of 36 t/mm². The fiber obtained from Example 39 dope had a diameter of 8.6 μ, a tensile strength of 360 kg/mm² and a tensile modulus of elasticity of 33 t/mm². The fiber obtained from the Example 43 dope had a diameter of 11.5 μ, a tensile strength of 340 kg/mm² and a tensile modulus of elasticity of 34 t/mm². The fiber obtained from the Example 44 dope had a diameter of 12.0 μ, a tensile strength of 328 kg/mm² and a tensile modulus of elasticity of 38 t/mm².

Observation of fiber section by a scanning type electron microscope indicated that each fiber had a coral-like radom structure, a random-radial structure (the radial occupied a basic structure) and a spiral-like onion structure and, in each fiber, the mesophase component which had been present in its dope was orientated to the film axis direction by the spinning, curing and pyrolyzing procedures.

COMPARATIVE EXAMPLE 11

The reaction products obtained in Reference Examples 9 and 10 were subjected to spinning, curing and pyrolyzing in the same conditions as in Example 45, to obtain pyrolyzed fibers. The fiber obtained from the Comparative Example 9 dope had a diameter of 11 μ, a tensile strength of 120 kg/mm² and a tensile modulus of elasticity of 7.5 t/mm². The fiber obtained from the Comparative Example 10 dope had a diameter of 10.5 μ, a tensile strength of 85 kg/mm² and a tensile modulus of elasticity of 5.7 t/mm².

The sections of these fibers contained no orientation structure.

EXAMPLE 46

First Step 700 g of the FCC slurry oil obtained in Reference Example 2 was heated for 0.5 hours at 450° C. in a nitrogen gas current of 2 liters/min to distil off the 450° C. fraction. The residue was filtered at 200° C. to remove the portion which was not in a molten state at 200° C., to obtain 200 g a reforming pitch.

This reforming pitch contained 25% of a xylene insoluble and was optically isotropic.

57 g of this pitch was mixed with 25 g of the organosilicon polymer obtained in Reference Example 1 and 20 ml of xylene. The mixture was heated with stirring to distil off xylene and subjected to a reaction for 4 hours at 400° C. to obtain 57.4 g of a precursor reaction product.

Infrared absorption spectrum analysis indicated that in the precursor reaction product there occurred the decrease of the Si—H bond (IR: 2100 cm⁻¹) present in the organosilicon polymer and the new formation of Si—C (this C is a carbon of benzene ring) bond (IR: 1135 cm⁻¹). Therefore, it became clear that the precursor reaction product contained a structure in which part of the silicon atoms of organosilicon polymer bonded directly with a polycyclic aromatic ring.

Second Step 57.4 g of the precursor reaction product was mixed with 15.5 g of a xylene solution containing 3.87 g (25%) of tetraoctoxytitanium [Ti(OC$_8$H$_{17}$)$_4$]. After distilling off xylene, the mixture was subjected to a reaction for 1 hour at 340° C. to obtain 56 g of a reaction product.

This reaction product contained no xylene insoluble and had a weight-average molecular weight of 1580, a melting point of 258° C. and a softening point of 292° C.

Third Step 180 g of the lighter reforming pitch obtained in Reference Example 2 was subjected to a condensation reaction for 8 hours at 400° C. while removing the light fractions formed by the reaction, to obtain 97.2 g of a heat-treated pitch.

This heat-treated pitch had a melting point of 263° C., a softening point of 308° C., a xylene insoluble content of 77% and a quinoline insoluble content of 31% and, by observing its polished surface by a polarizing microscope, was found to be a mesophase pitch having an optical anisotropy of 75%.

Fourth Step 6.4 g of the reaction product obtained in the second step and 90 g of the mesophase pitch obtained in the third step wrer melt mixed for 1 hour at 380° C. to obtain a uniform titanium-containing reaction product.

This titanium-containing reaction product had an optical anisotropy of 62%, a xylene insoluble content of 68%, a melting point of 264° C. and a softening point of 307° C. and, when hydrogenated under mild conditions and measured for weight-average molecular weight $\overline{M}w$ by gel permeation chromatography (GPC), had a $\overline{M}w$ of 860.

The titanium-containing reaction product was heated at 1200° C. in air; the resulting ash was subjected to alkali fusion and then to a hydrochloric acid treatment, and dissolved in water; the aqueous solution was measured for silicon and titanium concentrations using a high frequency plasma emission spectrochemical analyzer (ICP). It indicated that the silicon and titanium contents in the titanium-containing reaction product were 0.91% and 0.06%, respectively.

EXAMPLES 47-54

Various titanium-containing reaction products were obtained by varying the feeding ratio of the pitch, the organosilicon polymer and Ti(OC$_8$H$_{17}$)$_4$ and their reaction conditions in the first and second steps of Example 46, the heat treatment conditions in the third step of Example 46 and the feeding ratio and the melt mixing (melt condensation) conditions in the fourth step of Example 46. The results are shown in Table 4 together with the results of Example 46. In each Example, the titanium-containing reaction product had an optical anirotropy.

TABLE 4

| | First step | | | | | Second step | | | Third step | | |
|---|---|---|---|---|---|---|---|---|---|---|---|
| | Organo-silicon polymer (parts) | Pitch (parts) | Reaction temp. (°C.) | Reaction time (h) | Yield (%) | Ti-(OC$_8$H$_{17}$)$_4$ (parts) | Reaction temp. (°C.) | Reaction time (h) | Reaction temp. (°C.) | Reaction time (h) | Yield (%) |
| Example 46 | 100 | 230 | 400 | 4 | 70 | 15.5 | 340 | 1 | 400 | 8 | 54 |

TABLE 4-continued

| | | | | | | | | | | | |
|---|---|---|---|---|---|---|---|---|---|---|---|
| Example 47 | 100 | 230 | 400 | 6 | 62 | 13 | 340 | 2 | 400 | 7 | 61 |
| Example 48 | 100 | 230 | 400 | 7 | 58 | 8 | 340 | 1 | 400 | 8 | 54 |
| Example 49 | 100 | 230 | 420 | 5 | 60 | 70 | 340 | 3 | 420 | 4 | 51 |
| Example 50 | 100 | 230 | 440 | 3 | 56 | 20 | 350 | 1 | 430 | 2 | 48 |
| Example 51 | 100 | 90 | 450 | 7 | 44 | 40 | 320 | 3 | 380 | 12 | 60 |
| Example 52 | 100 | 1900 | 420 | 4 | 65 | 10 | 300 | 6 | 460 | 0.5 | 40 |
| Example 53 | 100 | 500 | 480 | 0.5 | 33 | 30 | 330 | 4 | 410 | 6 | 53 |
| Example 54 | 100 | 230 | 400 | 4 | 70 | 15.5 | 340 | 1 | 400 | 8 | 54 |

| | Fourth step | | | | Properties of titanium-containing reaction product | | | | | |
|---|---|---|---|---|---|---|---|---|---|---|
| | Reaction product in second step (parts) | Meso- phase pitch (parts) | Reaction temp. (°C.) | Reaction time (h) | Silicon content (%) | Titanium content (%) | Optical aniso- tropy (%) | Xylene in- soluble (%) | Melting point (°C.) | Weight- average mole- cular weight (Mw) |
| Example 46 | 100 | 1406 | 380 | 1 | 0.91 | 0.06 | 62 | 68 | 264 | 860 |
| Example 47 | 100 | 500 | 310 | 1 | 3.0 | 0.10 | 59 | 65 | 262 | 830 |
| Example 48 | 100 | 200 | 340 | 1 | 5.4 | 0.14 | 45 | 59 | 260 | 1180 |
| Example 49 | 100 | 400 | 300 | 2 | 2.8 | 0.61 | 56 | 62 | 264 | 900 |
| Example 50 | 100 | 900 | 350 | 1 | 1.5 | 0.30 | 75 | 77 | 270 | 630 |
| Example 51 | 100 | 20 | 400 | 0.5 | 22.0 | 3.50 | 11 | 19 | 330 | 5400 |
| Example 52 | 100 | 600 | 320 | 2 | 0.4 | 0.01 | 81 | 86 | 290 | 700 |
| Example 53 | 100 | 100 | 330 | 1 | 4.5 | 0.40 | 42 | 54 | 308 | 1200 |
| Example 54 | 100 | 6400 | 380 | 1 | 0.21 | 0.01 | 66 | 68 | 265 | 840 |

EXAMPLE 55

39 g of the precursor polymer obtained in Example 46 was mixed with an ethanol-xylene solution containing 5.4 g (1.5%) of tetrakisacetylacetonatozirconium. After distilling off the solvent, the mixture was subjected to a polymerization reaction for 1 hour at 250° C. to obtain 39.5 g of a reaction product.

20 g of this reaction product and 50 g of a mesophase pitch prepared in the same manner as in Example 46 were melt mixed for 1 hour at 360° C. to obtain 67 g of a reaction product containing silicon and zirconium.

This zirconium-containing reaction product had a melting point of 266° C., a xylene insoluble content of 54% and a weight-average molecular weight of 1010.

The silicon and zirconium contents in the reaction product were 4.1% and 0.8%, respectevely.

EXAMPLE 56

Using 60 g of the pitch obtained in Example 46 and 40 g of an organosilicon polymer, there was obtained 57 g of a precursor reaction product in the same manner as in Example 46.

40 g of the precursor reaction product was mixed with an ethanol-xylene solution contaning 7.2 g of hafnium chloride. After distilling off xylene and ethanol, the mixture was subjected to a polymerization reaction for 1 hour at 250° C. to obtain 43.5 g of a reaction product.

20 g of this reaction product and 80 g of a mesophase pitch were melt mixed for 1 hour at 350° C. to obtain 96 g of a hafnium-containing reaction product.

This hafnium-containing reaction product had a melting point of 269° C., a xylene insoluble content of 60% and a weight-average molecular weight of 930.

The silicon and hafnium contents in the reaction product were 3.6% and 1.9%, respectively.

EXAMPLE 57

The metal-containing reaction products obtained in Examples 46, 47, 54, 55 and 56 were used as a spinning dope and subjected to melt spinning using a nozzle of 0.15 mm in diameter. The resulting precursor fibers were cured at 300° C. in an air current and pyrolyzed at 1300° C. in an argon current to obtain carbonaceous inorganic fibers. The fiber obtained from the Example 46 dope had a diameter of 7.5 μ, a tensile strength of 358 kg/mm$^2$ and a tensile modulus of elasticity of 32 t/mm$^2$. The fiber obtained from the Example 47 dope had a diameter of 9.5 μ, a tensile strength of 325 kg/mm$^2$ and a tensile modulus of elasticity of 32 t/mm$^2$. The fiber obtained from the Example 54 had a diameter of 8.5 μ, a tensile strength of 15 362 kg/mm$^2$ and a tensile modulus of elasticity of 34 t/mm$^2$. The fiber obtained from the Example 55 dope had a diameter of 11.0 μ, a tensile strength of 350 kg/mm$^2$ and a tensile modulus of elasticity of 34 t/mm$^2$. The fiber obtained from the Example 56 dope had diameter of 12.0 μ, a tensile strength of 340 kg/mm$^2$ and a tensile modulus of elasticity of 38 t/mm$^2$.

Observation of fiber section by a scanning type electron microscope indicated that each fiber had a coral-like random structure, a random-radial structure (th radial occupied a basic portion) and a spiral-like onion structure and, in each fiber, the meso phase component which had been present in its dope was orientated to the fiber axis direction by spinning, infusibilization and pyrolyzing procedures.

EXAMPLE 58

First Step 500 g of the FCC slurry oil obtained in Reference Example 2 was heated to 450° C. in a nitrogen gas current to distil off the 450° C. fraction. The residue was filtered at 200° C. to remove the portion which was not in a molten state at 200° C., to obtain 225 g of a reforming pitch.

This reforming pitch contained a xylene insoluble in an amount of 75% and was optically isotropic.

49 g of the pitch was mixed with 21 g of the organosilicon polymer obtained in Reference Example 1 and 20 ml of xylene, and the mixture was heated with stirring to distil off xylene and then subjected to a reaction for 6 hours at 400° C. to obtain 39 g of a precursor reaction product.

Infrared absorption spectrum analysis indicated that in the precursor reaction product there occurred the decrease of the Si—H bond (IR: 2100 cm$^{-1}$) present organosilicon polymer and the new formation of Si—C (this C is a carbon of benzene ring) bond (IR: 1135 cm$^{-1}$). Therefore, it becsme clear that the precursor reaction product contained a structure in which part of the silicon atoms of organosilicon polymer bonded directly with a polycyclic aromatic ring.

Second Step 39 g of the precursor reaction product was mixed with 11 g of a xylene solution containing 2.75 g (25%) of tetraoctoxytitanium [Ti(OC$_8$H$_{17}$)$_4$]. After distilling off xylene, the mixture was subjected to a reaction for 2 hours at 340° C. to obtain 38 g of a reaction product.

This reaction product contained no xylene insoluble and had a weight-average molecular weight of 1650 and a melting point of 272° C.

Third Step 400 g of the FCC slurry oil obtained in Reference Example 2 was heated to 420° C. in a nitrogen gas current to distil off the 420° C. fraction. The residue was filtered at 150° C. to remove the portion which was not in a molten state at 150° C., and then subjected to a polycondensation reaction while removing the light fractions formed by the reaction, to obtain 75 g of a heat-treated pitch. This heat-treated pitch had a melting point of 275° C., a softening point of 305° C., a xylene insoluble content of 96% and a quinoline insoluble content of 25% and, by observing its polished surface by a polarizing microscope, was found to be a mesophase pitch having an optical anisotropy of 95%.

This mesophase pitch was subjected to hydrogenation for 1 hour at 360° C. at a hydrogen pressure of 100 kg/cm$^2$ using a nichel-cobalt solid catalyst supported by zeolite. The resulting hydrogenation product contained no quinoline insoluble and, by oberving its polished surface by a polarizing microscope, was found to be an optically isotropic pitch. This pitch was thermally stabilized by keeping for 30 minutes at 400° C. in a nitrogen current, to obtain a heat-treated pitch. This heat-trdeated pitch contained no quinoline insoluble and had a melting point of 230° C., a softening point of 238° C. and an optical isotropy. This pitch was made into a precursor fiber using a capillary having a diameter of 0.5 mm; the precursor fiber was cured at 300° C. in air and pyrolyzed at 1000° C. in a nitrogen current; the resulting fiber had an orientation to the fiber axis direction when its section was observed microscopically. Therefore, the heat-treated pitch was potentially anisotropic Fourth Step 40 g of the reaction product obtained in the second step and 80 g of the heat-treated pitch obtained in the third step were melt mixed for 1 hour at 350° C. to obtain a uniform titanium-containing reaction product.

This titanium-containing reactio product contained no xylene insoluble and had an optical isotropy, a melting point of 248° C. and a softening point of 270° C. The reaction product was measured for weight-average molecular weight ($\overline{M}w$) by gel permeation chromatography (GPC), which was 1020.

The titanium-containing reaction product was heated to 1000° C. in air; the resulting ash was subjected to alkali fusion and then to a hydrochloric acid treatment, and dissolved in water; the resulting aqueous solution was measured for metal concentrations by a high frequency plasma emission spectrochemical analyzer (ICP). It indicated that the silicon and titanium contents in the titanium-containing reaction products were 5.2% and 0.2% respectively.

EXAMPLE 59

First Step 39 g of a precursor reaction product was obtained in the same manner as in the first step of Example 58.

Second Step 39 g of the precursor reaction product was mixed with an ethanol-xylene solution containing 5.4 g (15%) of tetrakisacetylacetonatozirconium. After distilling off the solvent, the mixture was polymerized for 1 hour at 250° C. to obtain 39.5 g of a reaction product.

Third Step

A heat-treated pitch was obtained in the same manner as in Example 58 except that the conditions for converting to a meso phase were 420° C. and 4 hours and hydrogenation was effected for 2 hours at 95° C. using metallic lithium and ethylenediamine. This heat-treatedf pitch had a melting poing of 225° C. and a softening point of 231° C., and was found by the same method as in Example 58 to be potentially anisotropic.

Fourth Step 20 g of the raction product obtained in the second step and 50 g of the heat-treated pitch obtained in the third step were melt mixed for 1 hour at 350° C. to obtain 67 g of a reaction product containing silicon and zirconium.

This zirconium-containing reaction product had a melting point of 242° C., a softening point of 268° C., a xylene insoluble content of 55% and a weight-average molecular weight of 960.

The silicon and zirconium contents in the reaction product were 4.1% and 0.8%, respectively.

EXAMPLE 60

First Step

Using 60 g of the pitch obtained in the first step of Example 58 and 40 g of an organosilicon polymer, there was obtained 57 g of a precursor reaction product in the same manner as in Example 58.

Second Step 40 g of the precursor reaction product was mixed with an ethanol-xylene solution containing 7.2 g of hafnium chloride. After distilling off xylene, the mixture was polymerized for 1 hour at 250° C. to obtain 43.5 g of a reaction product.

Third Step

A heat-treated pitch was obtained in the same manner as in Example 58 except that the conditions for converting to a mesophase were 430° C. and 1 hour and hydrogenation was effected for 1 hour at 420° C. at a hydrogen pressure of 80 kg/cm$^2$ using no catalyst. This heat-treated pitch had a melting point of 233° C. and a softening point of 241° C. and was confermed by the same method as in Example 58 to be potentialy anisotropic.

Fourth Step 20 g of the reaction product obtained in the second step and 50 g of the heat-treated pitch obtained in the third step were melt mixed for 1 hour at 350° C. to obtain 95 g of a reaction product containing silicon and hafnium.

This hafnium-containing reaction product had a melting point of 248° C., a softening point of 271° C., a xylene insoluble content of 63% and a weight-average molecular weight of 890.

The silicon and hafnium contents in the reaction product were 3.6% and 1.9%, respectively.

EXAMPLE 61

The metal-containing reaction products obtained in Examples 58, 59 and 69 were used as a spinning dope and subjected to melt spinning using a nozzle of 0.15 mm in diameter. The resulting precursor fibers were cured at 300° C. in an air current and pyrolyzed at 1300° C. in an argon current to obtain carbonaceous inorganic fibers. These fibers had diameters, tensile strengths and tensile moduli of elasticity of 9.0 $\mu$, 360 kg/mm$^2$ and 30 t/mm$^2$ in the case of the fiber obtained from the Example 58 dope, 10.9 $\mu$, 365 kg/mm$^2$ and 33 t/mm$^2$ in the case of the fiber obtained from Example 59 dope and 11.2 $\mu$, 351 kg/mm$^2$ and 32 t/mm$^2$ in the case of the fiber obtained from the Example 60 dope.

Observation of fiber section by a scanning type electron microscope indicated that each fiber had a coral-like random structure, a random-radial structure (the radial occupied a basic structure) and a spiral-like onion structure and, in each fiber, the meso phase component which had been present in its dope was orientated to the fiber axis direction by the spinning, curing and pyrolyzing procedures.

EXAMPLE 62

First and Second Steps

These two steps were effected in the same manner as in the first and second steps of Example 36.

Third Step 400 g of the FCC slurry oil obtained in Reference Example 2 and 300 g of 1, 2, 3, 4-tetrahydroquinoline were subjected to hydrogenation for 10 minutes at 450° C. in an autoclave. Then, the tetrahydroquinoline was distilled off to obtain a hydrogenated pitch.

The pitch was fed into a metallic container. The container was immersed in a tin bath under a reduced pressure of 10 mmHg, and the pitch in the container was heat treated for 10 minutes at 450° C. to obtain 62 g of a heat-treated pitch.

The heat-treated pitch had a melting point of 230° C., a softening point of 238° C. and a quinoline insoluble content of 2%.

Fourth Step 40 g of the reaction product obtained in the second step and 80 g of the heat-treated pitch obtained in the third step were melt mixed for 1 hour at 350° C. in a nitrogen atomosphere to obtain a uform titanium-containing reaction product.

This titanium-containing reaction product had an optical isotropy, a xylene insoluble content of 50%, a melting point of 254° C. and a softening point of 271° C. and, when hydrogenated under mild conditions and measured for weight-average molecular weight ($\overline{Mw}$) by gel permeation chromatography (GPC), had a $\overline{Mw}$ of 1100.

The titanium-containing reaction product was heated to 1000° C. in air; the resulting ash was subjected to alkali fusion and then to a hydrochloric acid treatment, and dissolved in water; the resulting aqueous solution was measured for metal concentrations using a high frequency plasma emission spectrochemical analyzer (ICP). It indicated that the silicon and titanium contents in the titanium-containing reaction product were 5.8% and 0.2%, respectively.

EXAMPLE 63

First Step

A precursor reactio product was obtained in the same manner as in the first step of Example 62.

Second Step 39 g of the precursor reaction product was mixed with an ethanol-xylene solution containing 5.4 g (1.5%) of tetrakisacetylacetonatozirconium. After distilling off the solvent, the mixture was polymerized for 1 hour at 250° C. to obtain 39.5 g of a reaction product.

Third Step

The FCC slurry oil obtained in Reference Example 2 was hydrogenated in an autoclave for 1 hour at 350° C. at a hydrogen pressure of 80 kg/cm$^2$ using a nickel-cobalt solid catalyst supported by zeolite. The resulting oil was put under a reduced pressure of 15 mmHg to distil off the 320° C. or lower fraction. The resulting pitch was heated for 10 minutes at 440° C. under a reduced pressure of 2 mmHg to obtain a heat-treated pitch having a melting point of 248° C., a softening point of 255° C. and a quinoline insoluble content of 1%.

Fourth Step 20 g of the reaction product obtained in the second step and 50 g of the heat-treated pitch obtained in the third step were melt mixed for 1 hour at 350° C. to obtain 67 g of a reaction product containing silicon and zirconium.

This zirconium-contining reaction product had a melting point of 254° C., a softening point of 273° C., a xylene insoluble content of 61% and a weight-average molecular weight ($\overline{Mw}$) to 1010.

The silicon and zirconium contents in the reaction product were 4.0% and 0.8%, respectively.

EXAMPLE 64

First Step

Using 60 g of the pitch obtained in Example 62 and 40 g of an organosilicon polymer, there was obtained 57% of a precursor reaction product in the same manner as in Example 62.

Second Step 40 g of the precursor reaction product was mixed with an ethanol-xylene solution containing 7.2 g of hafnium chloride. After distilling off the solvent, the mixture was polymerized for 1 hour at 250° C. to obtain 43.5 g of a reaction product.

Third Step

The FCC slurry oil obtained in Reference Example 2 was treated in an autoclave for 1 hour at 430° C. in a nitrogen atmosphere at an autogenic pressure of 95 kg/cm$^2$ (hydrogen partial pressure was 21 kg/cm$^2$). Then, the 320° C. or lower fraction was removed under a reduced pressure of 10 mm Hg. The resulting pitch was heated for 3 minutes at 450° C. under a reduced pressure of 10 mmHg to obtain a heat-treated pitch having a melting point of 251° C., a softening point of 260° C. and a quinoline insoluble content of 260° C.

Fourth Step 20 g of the reaction product obtained in the second step and 80 g of the heat-treated pitch obtained in the third step were melt mixed for 1 hour at 350° C. to obtain 96 g of a reaction product containing silicon and hafnium.

This hafnium-containing reaction product had a melting point of 253° C., a xylene insoluble content of 71% and a weight-average molecular weight of 870.

The silicon and hafnium contents in the reaction product were 3.6% and 1.9%, respectively.

COMPARATIVE EXAMPLE 12

First Step 200 g of the FCC slurry oil obtained in Reference Example 2 was heated to 420° C. in a nitrogen gas current to distil off the 420° C. fraction to obtain 114 g of a reforming pitch. The pitch was dissolved in 500ml or xylene of 130° C. The xylene insoluble portion (69 g) was removed and the resulting xylene soluble portion (45 g) of the pitch was mixed with 45 g of the organosilicon polymer obtained in Reference Example 1. The mixture was subjected to a copolymerization reaction for 6 hours at 400° C. to obtain 32 g of a precursor polymer.

Second Step 200 g of the xylene soluble pitch component obtained in the first step was heat treated for 2 hours at 400° C. in a nitrogen gas current to obtain 65 g of heat-treated pitch which contained no quinoline insoluble and which had an optical isotropy.

Third Step 30 g of the precursor polymer obtained in the first step and 60 g of the heat-treated pitch obtained in the second step were miced for 1 hour at 340° C. The resulting product had a weight-average molecular weight ($\overline{M}w$) of 1450 and a silicon content of 9.8% but had a melting point of 185° C.

COMPARATIVE EXAMPLE 13

100 g of the reforming pitch obtained in Example 62 and 50 g of the organosilicon polymer obtained in Reference Example 1 were reacted for 6 hours at 400° C. to obtain 79 g of a precursor polymer.

The precursor polymer had a melting point of 252° C., a silicon content of 15% and a weight-average molecular weight ($\overline{M}w$) of 1400.

EXAMPLE 65

The metal-containing reaction products obtained in Examples 62, 63 and 64 were used as a spinning dope and subjected to melt spinning using a nozzle of 0.15 mm in diameter. The resulting precursor fibers were cured at 1300° C. in an air current and pyrolyzed at 300° C. in an argon current to obtain carbonaceous inorganic fibers. These fibers had diameters, tensile strengths and tensile moduli of elasticity of 9.5 $\mu$, 345 kg/mm$^2$ and 32 t/mm$^2$ in the case of the fiber obtained from the Example 62 dope, 12.0 $\mu$, 350 kg/mm$^2$ and 34 t/mm$^2$ in the case of the fiber obtained from the Example 63 dope and 12.5 $\mu$, 330 kg/mm$^2$ and 33 t/mm$^2$ in the case of the fiber obtained from the Example 64 dope.

Observation of fiber section by a scanning type electron microscope indicated that each fiber had a coral-like random structure, a random-radial structure (the radial occupied a basic portion) and a spiral-like onion structure and, in each fiber, the meso-phase component which had been present in its dope was orientated to the fiber axis direction by the spinning, curing and pyrolyzing procedures.

COMPARATIVE EXAMPLE 14

The polymers obtained in Comparative Examples 12 and 13 were subjected to spinning, curing and pyrolyzing under the same conditions as in Example 65, to obtain pyrolyzed fibers. These fibers had diameters, tensile strength and tensile moduli of elasticity of 17 $\mu$, 95 kg/mm$^2$ and 6.0 t/mm$^2$ in the case of the fiber obtained from the Comparative Example 12 dope and 16 $\mu$, 75 kg/mm$^2$ and 5.0 t/mm$^2$ in the case of the fiber obtained from the Comparative Example 13 dope. The section of each fiber contained no orientation structure.

EXAMPLE 66

First Step 500 g of the FCC slurry oil obtained in Reference Example 2 was heated to 450° C. in a nitrogen gas current to distil off the 450° C. fraction. The residue was filtered at 200° C. to remove the portion which was not in a molten state at 200° C., to obtain 225 g of a lighter reforming pitch.

From this reforming pitch was removed the xylene soluble to obtain 180 g of an organic solvent insoluble (1).

49 g of the organic solvent insoluble (1) was mixed with 21 g of the organosilicoan polymer obtained in Reference Example 1 and 20 ml of xylene. The mixture was heated with stirring to distil off xylene and then subjected to a reaction for 4 hours at 400° C. to obtain 48 g of a predursor reaction product.

Infrared absorption spectrum analysis indicated that in the precursor reaction product there occurred the decrease of the Si—H bond (IR: 2100 cm$^{-1}$) present in organosilicon polymer and the new formation of Si—C (this C is a carbon of benzene ring) bond (IR: 1135 cm$^{-1}$). Therefore, it became clear that the precursor reaction product contained a structure in which part of the silicon atoms of organosilicon polymer bonded directly with a polycyclic aromatic ring.

Second Step 50 g of the precursor reaction product was mixed with a 11 g of xylene solution containing 4.0 g (25 %) of tetraoctoxytitanium [Ti(OC$_8$H$_{17}$)$_4$]. After distilling off xylene, the mixture was subjected to a reaction for 2 hours at 340° C. to obtain 49 g of a reaction product.

This reaction product contained no xylene insoluble and had a weight-average molecular weight of 1710 and a melting point of 275° C.

Third Step 180 g of the organic solvent insoluble (1) obtained in the first step was subjected to a polycondensation reaction for 6 hours at 400° C. in a nitrogen current while distilling off the light fractions formed by the reaction, to obtain 96 g of a heat-treated pitch. The heat-treated pitch had a melting point of 262° C. and a quinoline insoluble content of 7% and, when its polished surface was observed by a polarizing microscope, was a mesophase pitch having an optical anisotropy of 96%.

Fourth Step 40 g of the reaction product obtained in the second step and 80 g of the mesophase pitch obtained in the third step were melt mixed for 1 hour at 350° C. in a nitrogen atmosphere to obtain a uniform titanium-containing reaction product.

This titanium-containing reaction product had an optical anisotropy of 61%, a xylene insoluble content of 75%, a melting point of 263° C. and a softening point of 272° C. and, when hydrogenated under mild conditions and measured for weight-average molecular weight ($\overline{M}w$) by gel permeation chromatography (GOC), had a $\overline{M}w$ of 1045.

This titanium-containing reaction product was heated to 1000° C. in air; the resulting ash was subjected to alkali fusion and then to a hydrochloric acid treatment, and dissolved in water; the resulting aqueous solution was measured for metal concentrations using a high frequency plasma emission spectro-chemical analyzer (ICP). It indicated that the silicon and titanium contents in the titanium-containing reaction product were 4.8% and 0.18, respectively.

EXAMPLE 67

First Step

A precursor reaction product was obtained in the same manner as in the first step of Example 66.

Second Step 39 g of the precursor reaction product was mixed with an ethanol-xylene solution containing 5.4 g (1.5%f) of tetrakisacetylacetonatozirconium. After distilling off the solvent, the mixture was polymerized for 1 hour at 250° C. to obtain 39.5 g a reaction product.

Third Step

A mesophase pitch was obtained in the same manner as in Example 66 except that the solvent used for washing the reforming pitch was toluene and the heat treatment conditions were 380° C. and 18 hours, The mesophase pitch had a melting point of 248° C. and a quinoline insoluble of 5% and, when its polished surface was observed by a polarizing microscope, had an optical anisotropy of 75%.

Fourth Step 20 g of the reaction product obtained in the second step and 50 g of the meso phase pitch obtained in the third step were melt mixed for 1 hour at 350° C. to obtain 67 g of a reaction product containing silicon and zirconium.

This zirconium-containing reaction product had a melting point of 258° C., a softening point of 270° C., a xylene insoluble content of 72% and a weight-average molecular weight ($\overline{M}w$) of 960.

The silicon and zirconium contents in the reaction product were 4.1% and 0.8, respectively.

EXAMPLE 68

First Step

Using 60 g of the organic solvent insoluble (1) obtained in Example 66 and 40 g of an organosilicon polymer, there was obtained 57 g of a precursor reaction product in the same manner as in Example 66.

Second Step 40 g of the precursor reaction product was mixed with an ethanol-xylene solution containing 7.2 g of hafnium chloride. After distilling off xylene, the mixture was polymerized for 1 hour at 250° C. to obtain 43.5 g of a reaction product.

Third Step

A mesophase pitch was obtained in the same manner as in Example 66 except that the solvent used for washing the reforming pitch was benzene and the heat treatment conditions were 420° C. and 4 hours. This mesophase pitch had a melting point of 256° C. and a quinoline insoluble content of 7% and, when its polished surface was observed by a polarizing microscope, had an optical anisotropy of 80%.

Fourth Step 20 g of the reaction product obtained in the second step and 80 g of the mesophase pitch obtained in the third step were melt mixed for 1 hour at 350° C. to obtain 97 g of a reaction product containing silicon and hafnium. This hafnium-containing reaction product had a melting point of 260° C., a xylene insoluble content of 79% and a weight-average molecular weight of 920.

The silicon and hafnium contents in the reaction product were 3.6% and 1.9%, respectively.

EXAMPLE 69

The metal-containing reaction products obtained in Examples 66.67 and 68 were used as a spinning dope and subjected to melt spinning using a nozzle of 0.15 mm in diameter. The resulting precursor fibers were cured at 300° C. in an air current and pyrolyzed at 1300° C. in an argon current to obtain carbonaceous inorganic fibers. These fibers had diameters, tensile strengths and tensile moduli of elasticity of 9,5 $\mu$, 340 kg/mm$^2$ and 32 t/mm$^2$ in the case of the fiber obtained from the Example 66 dope, 11.1 $\mu$, 348 kg/mm$^2$ and 34 t/m$^2$ in the case of the fiber obtained from the Example 67 dope and 11.5 $\mu$, 332 kg/mm$^2$ and 32 t/mm$^2$ in the case of the fiber obtained from the Example 68 dope.

Observation of fiber section by a scanning type electron microscope indicated that each fiber had a coral-like random structure, a random-radial structue (the radial occupied a basic portion) and a spiral-like onion structure and, in each fiber, the mesophase component which had been present in its dope was orientated to the fiber axis direction by the spinning, curing and pyrolyzing procedures.

EXAMPLE 70

(1) 35 g of the raction product obtained in the second step of Example 36 and 70 g of the mesophase pitch obtained in the third step of Example 36 were melt mixed for 1 hour at 350° C. in a nitrogen atmosphere to obtain a uniform reaction product containing silicon and titanium.

This reaction product had a melting point of 272° C. and a xylene insoluble content of 59%. Hereinafter the reaction product is referred to as the matrix polymer III.

(2) A two-dimensional plain weave fabric made from a commercially available PAN-based carbon fiber having a diameter of 7 $\mu$m, a tensile strength of 300 kg/mm$^2$ and a tensile modulus of elasticity of 21 t/mm$^2$ was cut into discs of 7 cm in diameter. The discs were impregnated with a xylene slurry containing 30% of the matrix polymer III and then dried to obtain prepreg sheets. In a die, these prepreg sheets were laminated in a total sheet number of 30 with the fine powder of the matrix polymer III being packed between each two neighboring sheets and with the fiber direction of a sheet differing from that of the lower sheet by 45°, and hot pressed at 350° C. at a pressure of 50 kg/cm$^2$ to form a disc-like molded material. This molded material was buried in a carbon powder bed shape retention and heated to 800° C. at a rate of 5° C./h in a nitrogen current and then to 1300° C. to carbonize the matrix. The resulting composite material had a bulk density of 1.67 g/cm$^3$.

The composite material was immersed in a xylene slurry containing 50% of the matrix polymer III; the system was heated to 350° C. under reduced pressure while distilling off xylene; then, a pressure of 100 kg/cm$^2$ was spplied to effect impregnation. Thereafter, the impregnated composite material was heated to 300° C. in air at a rate of 5° C./h for infusibilization and carbonized at 1300° C. This impregnation procedure was repeated three times to obtain a material having a bulk density of 2.05 g/cm$^3$. The composite material had a flexural strength of 55 kg/mm$^2$.

COMPARATIVE EXAMPLE 15

Using, as a matrix polymer, a petroleoum-based heat-treated pitch having a softening point of 150° C. and a carbon residue of 60%, there was obtained a carbon fiber-reinforced carbon material, in the same manner as in Example 70. The material had a bulk density of 1.71 g/cm$^3$ and a flexural strength of 19 kg/mm$^2$.

EXAMPLE 71

(1) 39 g of the precursor reaction product obtained in the first step of Example 36 was mixed with an ethanolxylene solution containing 5.4 g (1.5%) of tetrakisacetylacetonatozirconium. After distilling off xylene and ethanol, the mixture was polymerized for 1 hour at 250° C. to obtain 39.5 g of a reaction product.

20 g of the reaction product and 50 g of a meso phase pitch prepared in the same manner as in the fiest step of Example 36 were finely ground and melt-mixed and at 350° C. to obtain a zirconium-containing reaction product.

This reaction product is hereinafter referred to as the matrix polymer IV.

(2) A bundle of commercially available pitch-based carbon fibers each having a diameter of 10 μm, a tensile strength of 300 kg/mm$^2$ and a tensile modulus of elasticity of 50 t/mm$^2$ and arranged in the same one direction and a fine powder obtained by carbonizing the matrix polymer IV at 800° C. were laminated by turns and hot pressed at 2000° C. at 500 kg/cm$^2$. The resulting composite material had a bulk density of 2.05 and a flexural strength of 61 kg/mm$^2$.

EXAMPLE 72

(1) 57 g of a precursor reaction product was obtained in the same manner as in the first step of Example 36 except that the amounts of the reforming pitch and the organosilicon polymer used were changed to 50 g and 50 g, respectively.

40 g of the precursor reaction product was mixed with an ethanol-xylene solution containing 7.2 g (1.5%) of hafnium chloride. After distilling off xylene and ethanol, the mixture was polymerized for 1 hour at 250° C. to obtain 43.5 g of a reaction product.

60 g of the reaction product and 40 g of a mesophase pitch were melt mixed at 320° C. to obtain a hafnium-containing reaction product. This product is hereinafter referred to as the matrix polymer V.

(2) A three-dimensional fabric made from a Si—M—C—O fiber [Tyranno (registered trade name) manufactured by Ube Industries, Ltd.] was impregnated with a xylene solution containing 30% of the matrix polymer V, in an autoclave and, after distilling off xylene, was pressurized at 100 kg/cm$^2$ at 400° C. to obtain a molded material. This molded material was cured at 280° C. and pyrolyzed at 1300° C. for carbonization. The above procedure was repeated four times to obtain a composite material having a bulk density of 1.91 g/cm$^3$ and a flexural strength of 42 kg/mm$^2$.

EXAMPLE 73

The composite materials of Examples 70–72 and the composite material of Comparative Example 15 were heated for 1 hour in an air oven of 600° C. and then measured for flexural strength.

In the composite material of Comparative Example 15, oxidative deterioration progressed to such as extent that the measurement of flexural strength was impossible. In the composite material of Example 70, the flexural strength decreased by only 7%. In the composite materials of Examples 71 and 72, there was no decrease in flexural strength.

EXAMPLE 74

The powder of the matrix polymer III obtained in Example 70 (1) was heated to 800° C. in a nitrogen current to prepare a prefired material. This material was finely ground to obtain a prefired material powder. The prefired material powder was set mixed with an equal weight of the powder of the matrix polymer III. The resulting powder was hot pressed at 100 kg/cm$^2$ at 350° C. to obtain a disc-like molded material of 7 cm in diameter. This molded material was buried in a carbon powder bed for shape retention and heated to 800° C. at a rate of 5° C./h in a nitrogen current and further to 1300° C. for carbonization. The resulting carbonaceous inorganic material had a bulk density of 1.52 g/cm$^3$.

The carbonaceous inorganic material was immersed in a xylene slurry containing 50% of the matrix polymer III; the system was heated to 350° C. under reduced pressure while distilling off xylene; then, a pressure of 100 kg/cm$^2$ was applied to effect impregnation. Thereafter, the impregnated composite material was heated to 300° C. in air at a rate of 5° C./h for curing and carbonized at 1300° C. This impregnation and carbonization procedure was repeated three more times to obtain a material having a bulk density of 1.96 g/cm$^3$. The material had a flexural strength of 23 kg/mm$^2$. When the carbonaceous inorganic material was fired at 2500° C. in argon, the bulk density and the flexural strength improved to 1.99 g/cm3 and 28 kg/mm$^2$, respectively. The flexural strength at 1500° C. in nitrogen was 29 kg/mm$^2$.

EXAMPLE 75

The matrix polymer IV obtained in Example 71 (1) was subjected to the same procedure as in Example 74 to obtain a prefired powder. 70% of this prefired powder was mixed with 30% of the powder of the matrix polymer V obtained in Example 75 (1), and the mixture was molded and carbonized in the same manner as in Example 74 to obtain a carbonaceous inorganic material having a bulk density of 1.72 g/cm$^3$.

In the same manner as in Example 74, this material was impregnated with a xylene slurry containing 50% of the matrix polymer IV; the impregnated material was carbonized; this impregnation and carbonization procedure was repeated three more times to obtain a carbonaceous inorganic material having abulk density of 2.04 g/cm$^3$. This material had a flexural strength of 28 kg/mm$^2$. When the material was kept for 24 hours at 600° C. in air, there was no reduction in weight and strength.

COMPARATIVE EXAMPLE 16

80% of a synthetic graphite powder having a bulk density of 0.15 g/cm$^3$ under no load was mixed with 20% of the meso phase pitch obtained in the third step of Example 36. The mixture was molded and carbonized in the same manner as in Example 74 to obtain a carbon material having a bulk density of 1.66 g/cm$^3$.

Impregnation of this carbon material with mesophase pitch and subsequent carbonization were repeated four times in the same manner as in Example 74 to obtain a carbon material having a bulk density of 1.92 g/cm$^3$.

The carbon material had a flexural strength of 5.0 kg/mm$^2$. When the material was kept for 24 hours at 600° C. in air, the material showed a 20% reduction in weight and became porous.

COMPARATIVE EXAMPLE 17

The carbon material having a bulk density of 1.66 g/cm$^3$, obtained in comparative Example 16 was covered with a metallic silicon powder and heated to 1500° C. to effect melt impregnation, reaction and sintering to obtain a carbon-silicon carbide composite material. The material had an improved flexural strength of 8.2 kg/mm$^2$. When the material was measured for flexural strength at 1500° C. in nitrogen, the material caused deformation owing to the melting of unreacted silicon and showed a reduced flexural strength of 3.0 kg/mm$^2$.

EXAMPLE 76

The same silicon-containing reaction product as obtained in Example 30 (1) was used as a spinning material and subjected to melt spinning at 360° C. using a metallic nozzle of 0.15 mm in diameter. The spun fiber was cured at 300° C. in air and pyrolyzed at 1300° C. in an argon atmosphere to obtain an inorganic fiber having a diameter of 10 μm.

The fiber had a tensile strength of 295 kg/mm$^2$ and a tensile modulus of elasticity of 26 t/mm$^2$ and, when its breaking surface was observed, clearly had a radial structure.

When the fiber was subjected to thermal oxidation, there occurred substantially no weight decrease up to 700° C. and, at 800° C., only 5% of the total weight was lost.

The inorganic fiber was used as a reinforcing agent for an epoxy resin of bisphenol A type to obtain a unidirectionally reinforced epoxy resin composite material (Vf: 60%). This composite material had flexural strengths at 0° and 90° directions of 195 kg/mm$^2$ and 12.8 kg/mm$^2$, respectively, which were far superior to the flexural strengths at 0° and 90° directions of 100 kg/mm$^2$ and 3.5 kg/mm2 possessed by a unidirectionally reinforced epoxy resin composite material (Vf: 60%) using a conventional pitch-based carbon fiber having a tensile strength of 280 kg/mm$^2$ and a tensile modulus of elasticity of 55 t/mm$^2$.

EXAMPLE 77

The precursor fiber (spun fiber) obtained in Example 76 was cured at 300° C. in air and then pyrolyzed at 1400° C. in an inert gas atmosphere to obtain an inorganic fiber of 9.5 μm in diameter. Observation by a transmission electron microscope indicated that, in the inorganic fiber, amorphous SiC and β-SiC crystallites were uniformly dispersed in crystalline carbon.

The inorganic fiber consisted of a radial structure and partially a random structure and had a tensile strength of 232 kg/mm$^2$ and a tensile modulus of elasticity of 30 t/mm$^2$.

The inorganic fiber was used as a reinforcing agent for an epoxy resin of bisphenol A type to obtain a unidirectionally reinforced epoxy resin composite material (Vf; 60%). This composite material had flexural strengths at 0° and 90° directions of 150 kg/mm$^2$ and 6.8 kg/mm$^2$, respectively.

EXAMPLES 78-80

(A) The residue (the 40-g residue) used in Example 30 (1) and obtained by melting the reaction product obtained in the first step of Example 1 and allowing it to stand at 300° C. to remove the light portion by means of specific rgavity difference [the residue is hereinafter referred to as the polymer (a)] and (B) the 95% meso phase pitch obtained in the second step of Example 1 were melt mixed at various ratios at various temperatures to obtain three uniform silicon-containing reaction products. These reaction products were made into inorganic fibers in the same manner as in Example 76. The inorganic fibers were measured for mechanical properties. The results are shown in Table 5.

TABLE 5

| | Polymer (a) (g) | Mesophase pitch (g) | Mixing temp. (°C.) | Mixing time (h) | Xylene insoluble content (%) | Diameter (μm) | Tensil strength (kg/mm$^2$) | Tensil modulus of elasticity (t/mm) |
|---|---|---|---|---|---|---|---|---|
| Example 78 | 20 | 100 | 360 | 1 | 79 | 11 | 256 | 23 |
| Example 79 | 60 | 60 | 320 | 1.5 | 45 | 12 | 238 | 18 |
| Example 80 | 80 | 40 | 300 | 1.5 | 25 | 12 | 200 | 15 |

EXAMPLE 81

The same silicon-containing reaction product as obtained in Example 10 (3) was used as a spinning material and subjected to melt spinning at 360° C. using a metallic nozzle of 0.15 mm in diameter. The resulting spun fiber was oxidized and cured at 300° C. in air and then pyrolyzed at 1300° C. in an argon atomosphere to obtain an inorganic fiber of 8 μm in diameter.

This inorganic fiber had a tensile strength of 320 kg/mm² and a tensile modulus of elasticity of 26 t/mm² and, when its breaking surface was observed, had a radial structure.

The inorganic fiber was ground, subjected to alkali fusion and a hydrochloric acid treatment, dissolved in water, and then subjected to high frequency plasma emission spectrochemical analysis (ICP). As a result, the inroganic fiber had a silicon content of 0.95%.

The inorganic fiber was oxidized in air with heating. No decrease in mechanical properties was seen even at 600° C. Thus, it was confirmed that the inorganic fiber was superior in oxidation resistance to commercially available carbon fibers which were burnt out at 600° C.

The inorganic fiber was used as a reinforcing agent for an epoxy resin of bisphenol A type to obtain a unidirectionally reinforced epoxy resin composite material (Vf: 60%). This composite material had flexural strengths at 0° and 90° directions of 210 kg/mm² and 13.2 kg/mm², respectively, which were far superior to the flexural strengths at 0° and 90° directions of 100 kg/mm² and 3.5 kg/mm² possessed by a unidirectionally reinforced epoxy resin composite matirial (Vf: 60%) using a conventional pitch-based carbon fiber having a tensile strength of 280 kg/mm² and a tensile modulus of elasticity of 55 t/mm².

EXAMPLE 82

The precursor fiber (spun fiber) obtained in Example 81 was cured at 300° C. in air and then pyrolyzed at 2400° C. in an inert gas atmosphere to obtain an inorganic fiber of 7.1 μm in diameter. Observation by a transmission electron microscope indicated that, in the inorganic fiber, β-SiC crystallites were uniformly dispersed in crystalline graphite.

This inorganic fiber consisted of a radial structure and partially a random structure and had a tensile strength of 340 kg/mm² and a high tensile modulus of elasticity of 55 t/mm².

The unidirectionally reinforced epoxy resin (bisphenol A type) composite material (Vf: 60%) using the above inorganic fiber as a reinjforcing agent had flexural strengths at 0° abd 90° directions of 205 kg/mm² and 6.0 kg/mm², respectively.

EXAMPLES 83-86

The reaction product obtained in the first step of Example 10 and the 75% mesophase pitch obtained in the second step of Example 10 were melt mixed at various ratios at various temperatures to obtain four uniform silicon-containing reaction products. These reaction products were made into inorganic fibers in the same manner as in Example 81. The inorganic fibers were measured for mechanical properties. The results are shown in Table 6.

EXAMPLE 87

100 parts of a bisphenol A type epoxy resin (XB 2879 A manufactured by Ciba Geigy Co.) and 20 parts of a dicyandiamide curing agent (XB2879B manufactured by Ciba Geigy Co.) were mixed uniformly. The mixture was dissolved in a mixed solvent of methyl cellosolve and acetone (1:1 by weight) to prepare a solution containing 28% of the mixture.

The inorganic fiber having a silicon content of 0.95%, obtained in the first half of Example 81 (the fiber is hereinafter referred to as the inorganic fiber I) was impregnated with the above solution and then taken off in one direction using a drum winder, and heated for 14 minutes at 100° C. in a heat circulation oven to prepare prepregs of half-cured inorganic fibers arranged unidirectionally. The prepregs had a fiber content of 60% by volume and a thickness of 0.15 mm.

10 sheets of the prepregs were laminated with the fibers arranged unidirectionally, and press molded at 7kg/cm² for 4 hours at 170° C. to obtain a unidirectionally reinforced epoxy resin composite material of 250 mm×250 mm.

A test sample of 1.27 mm (width)×85 mm (length) ×2 mm (thickness) for measurement of flexural strength was cut out from the above composite material. Using the test sample, a three-point bending test (span/width=32) was conducted at a speed of 2 mm/min. The mechanical properties of the above composite material are shown below.

| | |
|---|---|
| Tensile strength (kg/mm²) | 170 |
| Tensile modulus of elasticity (t/mm²) | 16 |
| Flexural strength (kg/mm²) | 232 |
| Flexural modulus of elasticity (t/mm²) | 16 |
| Tensile strength in direction perpendicular to fiber (kg/mm²) | 6.7 |
| Tensile modulus of elasticity in direction perpendicular to fiber (t/mm²) | 5.1 |
| Flexural strength in direction perpendicular to fiber (kg/mm²) | 9.2 |
| Flexural modulus of elasticity in direction perpendicular to fiber (t/mm²) | 5.0 |
| Interlaminar shear strength (kg/mm²) | 9.0 |
| Flexural shock (kg · cm/mm²) | 255— |

COMPARATIVE EXAMPLE 18

A carbon fiber-reinforced epoxy resin composite material was produced in the same manner as in Example 87 except that the inorganic fiber I was replaced by a high modulus pitch-based carbon fiber having a tensile strength of 280 kg/mm², a tensile modulus of elasticity of 55 t/mm² and a diameter of 10 μ. The composite material had a fiber content of 60% by volume. The mechanical properties of the composite material are shown below.

TABLE 6

| | Reaction* product (g) | Mesophase pitch (g) | Mixing temp. (°C.) | Mixing time (h) | Silicon content (%) | Insoluble (%) | Diameter (μm) | Tensil strength (kg/mm²) | Tensil modulus of elasticity (t/mm²) |
|---|---|---|---|---|---|---|---|---|---|
| Example 83 | 20 | 100 | 360 | 1 | 2.48 | 61 | 8 | 310 | 24 |
| Example 84 | 60 | 60 | 350 | 1.5 | 7.44 | 35.5 | 11 | 260 | 18 |
| Example 85 | 80 | 40 | 340 | 1.5 | 10.01 | 25 | 12 | 210 | 15 |
| Example 86 | 3 | 97 | 400 | 1 | 0.47 | 71 | 8 | 315 | 28 |

*The reaction product obtained in the first step

| | |
|---|---|
| Tensile strength (kg/mm$^2$) | 150 |
| Tensile modulus of elasticity (t/mm$^2$) | 28 |
| Flexural strength (kg/mm$^2$) | 100 |
| Flexural modulus of elasticity (t/mm$^2$) | 12 |
| Tensile strength in direction perpendicular to fiber (kg/mm$^2$) | 3.0 |
| Tensile modulus of elasticity in direction perpendicular to fiber (t/mm$^2$) | 0.5 |
| Flexural strength in direction perpendicular to fiber (kg/mm$^2$) | 3.5 |
| Flexural modulus of elasticity in direction perpendicular to fiber (t/mm$^2$) | 0.5 |
| Interlaminar shear strength (kg/mm$^2$) | 7.5 |
| Flexural shock (kg · cm/mm$^2$) | 70 |

COMPARATIVE EXAMPLE 19

A carbon fiber-reinforced epoxy resin composite material was produced in the same manner as in Example 87 except that the inorganic fiber I was replaced by a surface-treated high strength PAN-based carbon fiber having a tensile strength of 300 kg/mm$^2$, a tensile modulus of elasticity of 21 t/mm$^2$ and a diameter of 7.5 μ. The composite material had a fiber content of 60% by volume and the following mechanical properties.

| | |
|---|---|
| Tensile strength (kg/mm$^2$) | 172 |
| Tensile modulus of elasticity (t/mm$^2$) | 14 |
| Flexural strength (kg/mm$^2$) | 170 |
| Flexural modulus of elasticity (t/mm$^2$) | 13 |
| Tensile strength in direction perpendicular to fiber (kg/mm$^2$) | 4.5 |
| Tensile modulus of elasticity in direction perpendicular to fiber (t/mm$^2$) | 0.88 |
| Flexural strength in direction perpendicular to fiber (kg/mm$^2$) | 6.2 |
| Flexural modulus of elasticity in deraction perpendicular to fiber (t/mm$^2$) | 0.87 |
| Interlaminar shear strength (kg/mm$^2$) | 8.1 |
| Flexural shock (kg · cm/mm$^2$) | 150 |

EXAMPLE 88

(1) 3 g of the reaction product obtained in Example (1) and 97 g of the meso phase pitch obtained in Example 10 (2) were melt mixed for 1 hour at 400° C. in a nitrogen atrmosphere to obtain a uniform silicon-containing reaction product. This reaction product had a melting point of 272° C., a softening point of 319° C. and a xylene insoluble content of 71%. The reaction product was used as a spinning material and subjected to melt spinning at 360° C. using a metallic nozzle of 0.15 mm in diameter. The spun fiber was cured at 300° C. in air and pyrolyzed at 2000° C. in an argon atmosphere to obtain an inorganic fiber II having diameter of 7.3 μ.

The inorganic fiber II had a tensile strength of 325 kg/mm$^2$ and a high tensile modulus of elasticity of 41 t/mm$^2$. The inorganic fiber II was ground, subjected to alkali fusion and then to a hydrochloric acid treatment, and dissolved in water. The resulting aqueous solution was subjected to high frequency plasma emission spectrochemical analysis. As a result, the inorganic fiber II had a silicon content of 0.47%.

(2) The same procedure as in Example 87 was repeated except that the inorganic fiber I was replaced by the inorganic fiber II and the epoxy resin was replaced by a commercially available unsaturated polyester resin, to obtain an inorganic fiber-reinforced polyester composite material having a fiber content of 58% by volume. This composite material had the following mechanical properties.

| | |
|---|---|
| Tensile strength (kg/mm$^2$) | 161 |
| Tensile modulus of elasticity (t/mm$^2$) | 21 |
| Flexural strength (kg/mm$^2$) | 234 |
| Flexural modulus of elasticity (t/mm$^2$) | 205 |
| Tensile strength in direction perpendicular to fiber (kg/mm$^2$) | 6.2 |
| Tensile modulus of elasticity in direction perpendicular to fiber (t/mm$^2$) | 5.5 |
| Flexural strength in direction perpendicular to fiber (kg/mm$^2$) | 9.1 |
| Flexural modulus of elasticity in direction perpendicular to fiber (t/mm$^2$) | 8.7 |
| Interlaminar shear strength (kg/mm$^2$) | 9.0 |
| Flexural shock (kg · cm/mm$^2$) | 251 |

EXAMPLE 89

The same procedure as in Example 87 was repeated except that the epoxy resin was replaced by a polyimide resin manufactured by Ube Industries, Ltd., to obtain an inorganic fiber-reinforced polyimide composite material having a fiber content of 60% by volume.

The composite material had the following mechanical properties.

| | |
|---|---|
| Tensile strength (kg/mm$^2$) | 162 |
| Tensile modulus of elasticity (t/mm$^2$) | 16 |
| Flexural strength (kg/mm$^2$) | 230 |
| Flexural modulus of elasticity (t/mm$^2$) | 16 |
| Tensile strength in direction perpendicular to fiber (kg/mm$^2$) | 6.3 |
| Tensile modulus of elasticity in direction perpendicular to fiber (t/mm$^2$) | 4.9 |
| Flexural strength in direction perpendicular to fiber (kg/mm$^2$) | 8.9 |
| Flexural modulus of elasticity in direction perpendicular to fiber (t/mm$^2$) | 5.0 |
| Interlaminar shear strength (kg/mm$^2$) | 9.0 |
| Flexural shock (kg · cm/mm$^2$) | 251 |

EXAMPLE 90

100 parts of a bisphenol A type epoxy resin (XB2879A manufactured by Ciba Geigy Co.) and 20 parts of a dicyandiamide curing agent (XB2879B manufactured by Ciba Geigy Co.) were mixed uniformly. The mixture was dissolved in a mixed solvent of methyl cellosolve and acetone (1:1 by weight) to prepare a solution containing 28% of the mixture.

The same inorganic fiber I as used in Example 87 was impregnated with the above solution and then taken off in one direction using a drum winder, and heatedf for 14 minutes at 100° C. in a heat circulation oven to prepare prepreg sheets of halfcured inorganic fibers arranged unidirectionally. Separately, a surface-treated carbon fiber (a PAN-based carbon fiber having a diameter of 7 μ, a tensile strength of 300 kg/mm$^2$ and a tensile modulus of elasticity of 24 t/mm$^2$) was subjected to the same treatment as above, to prepare prepreg sheets of halfcured carbon fibers arranged unidirectionally.

The inorganic fiber prepreg sheets and the carbon fiber prepreg sheets were laminated by turns with the fibers arranged in one same direction and then hot pressed to obtain a hydrid fiber (inorganic fiber/carbon fiber)-reinforced epoxy resing composite material.

The composite material had a fiber content of 60% by volume (content of inorganic fiber=30% by volume and content of carbon fiber=30% by volume).

The composite material had a tensile strength, a tensile modulus of elasticity and a flexural strength of 185 kg/mm$^2$, 16.3 t/mm$^2$ and 185 kg/mm$^2$, respectively, at a 0° direction, a flexural strength of 7.3 kg/mm$^2$ at a 90° direction, an interlaminar shear strength of 8.1 kg/mm$^2$ and a flexural shock of 228 kg.cm/cm$^2$.

EXAMPLE 91

(1) 100 parts of a polydimethylsilane obtained by subjecting dimethylchlorosilane to dechlorination condensation with metallic sodium was mixed with 3 parts of a polyborosiloxane. The mixture was condensed at 350° C. in nitrogen to prepare a polycarbosilane having a main chain consisting mainly of a carbosilane unit represented by the formula (Si—CH$_2$) (the silicon atom in the carbosilane unit has a hydrogen atom and a methyl group bonded thereto). This polycatbosilane was mixed with a titanium alkoxide, and the mixture was subjected to crosslinking and polymerization and 340° C. in nitrogen to obtain a polytitanocarbosilane consisting of 100 parts of the carbosilane unit and 10 parts of a titanoxane unit represeented by the formula (Ti—O). This polymer was melt spun, cured at 190° C. in air and successively pyrolyzed at 1300° C. in nitrogen to obtain an inorganic fiber composed mainly of silicon, titanium, carbon and oxygen (titanbium content=3%) and having a diameter of 13 $\mu$, a tensile strength of 310 kg/mm$^2$ and a tensile modulus of elasticity of 16 t/mm$^2$ (monofilament method). The inorganic fiber was a Si—Ti—C—O fiber consisting of a mixed system of (A) an amorphous portion consisting of Si, Ti, C and O, (B) crystalline ultrafine particles each of about 50 Å in diameter, of $\beta$-SiC, TiC, a $\beta$-SiC-TiC solid solution and TiC$_{1-x}$ (0<x<1) and (C) an amorphous portion consisting of SiO$_2$ and TiO$_2$.

(2) The same procedure as in Example 90 was repeated except that the carbon fiber was replaced by the Si—Ti—C—O fiber obtained in (1) above, to obtain a hydrid fiber-reinforced epoxy resin composite material. This composite material had a fiber content of 60% by volume (content of inorganic fiber=30% by volume and content of Si—Ti—C—O fiber=30% by volume). The composite material had a tensile strength, a tensile modulus of elasticity and a flexural strength of 198 kg/mm$^2$, 15.1 t/mm$^2$ and 195 kg/mm$^2$, respectively, at a 0° direction, a flexural strength of 12.0 kg/mm$^2$ at a 90° direction, an interlaminar shear strength of 11.5 kg/mm$^2$ and a flexural shock of 280 kg.cm/cm$^2$.

COMPARATIVE EXAMPLE 20

Using only a carbon fiber (PAN-based, diameter =7 $\mu$) and in the same manner as in Example 90, there were prepared prepreg sheets of half-cured carbon fibers arranged unifirectionally.

These prepreg sheets were laminated, with the fibers arranged in one same direction, and then hot pressed to obtain a carbon fiber-reinforced epoxy resin composite material. The composite material had afiber content of 60% by volume. The composite material had a tensile strength, a tensile modulus of elasticity and a flexural strength of 150 kg/mm$^2$, 14 t/mm$^2$ and 172 kg/mm$^2$, respectively, at a 0° direction, a flexural strength of 6.2 kg/mm$^2$ at a 90° direction, an interlaminar shear strength of 8.1 kg/mm$^2$ and a flexural shock of 150 kg,cm/cm$^2$.

COMPARATIVE EXAMPLE 21

Using only the Si—Ti—C—O fiber obtained in Example 91 (1) and in the same manner as in Example 9, there were prepreg sheets of Si—Ti—C—O fibers. These sheets were made into a Si—Ti—C—O fiber-reinforced epoxy resin composite material in the same manner as in Comparative Example 20. The composite material had a fiber content of 60% by volume. The composite material had a tensile modulus of elasticity of 11.3 t/mm$^2$. The other mechanical strengths of the material were about the same as those of Example 91.

The same procedure as in Example 90 was repeated except that the carbon fiber was replaced by an alumina fiber, a silicon carbide fiber or a glass fiber (their properties are shown in Table 7. They are hereinafter referred to as the second fiber for redinforcement(s)), to obtain hydrid fiber-reinforced epoxy resin composite materials. These composite fibers had a fiber content of 60% by volume (inorganic fiber content=30% by volume, content of second fiber for reinforcement=30% by volume).

The properties of the hydrid fiber-reinforced epoxy resin composite materials are shown in Table 8.

TABLE 7

| Mechanicl Properties | Second fiber for reinforcement | | |
|---|---|---|---|
| | Alumina fiber | Silicon carbide fiber | E-glass fiber |
| Diameter ($\mu$) | 9 | 15 | 10 |
| Tensile strength (kg/mm$^2$) | 260 | 280 | 180 |
| Tensile modulus of elasticity (t/mm$^2$) | 25 | 20 | 7 |

TABLE 8

| | Example | | |
|---|---|---|---|
| | Example 92 | Example 93 | Example 94 |
| | | Second fiber for reinforcement | |
| Mechanical Properties | Alumina fiber | Silicon carbide fiber | E-glass fiber |
| Tensile strength (kg/mm$^2$) | 160 | 192 | 157 |
| Tensile modulus of elasticity (t/mm$^2$) | 16 | 15 | 11 |
| Flexural strength (kg/mm$^2$) | 188 | 214 | 178 |
| Flexural modulus of elasticity (t/mm$^2$) | 14 | 13 | 11 |
| Compression strength (kg/mm$^2$) | 185 | 191 | 165 |

COMPARATIVE EXAMPLES 22-24

Using an alumina fiber, a silicon carbide fiber or a glass fiber and in the same manner as in Example 90, there were prepared alumina fibe prepreg sheets, silicon carbide prepreg sheets and glass fiber prepreg sheets. Using these prepreg sheets and in the same manner as in Comparative Example 20, there were prepared an alumina fiber-reinforced epoxy resin composite material, a silicon carbide fiber-reinforced epoxy resin composite material and a glass fiber-reinforced epoxy resin composite material. These composite materials had a fiber content of 60% by volume.

The mechanical properties of the composite materials are shown in Table 9. The mechanical properties of the reinforcing second fibers used are shown in Table 7.

TABLE 9

| | Example | | |
|---|---|---|---|
| | Comparative Example 22 | Comparative Example 23 | Comparative Example 24 |
| | Second fiber for reinforcement | | |
| Mechanical Properties | Alumina fiber | Silicon carbide fibers | E-glass fibers |
| Tensile strength (kg/mm$^2$) | 130 | 170 | 120 |
| Tensile modulus of elasticity (t/mm$^2$) | 14 | 12 | 4.5 |
| Flexural strength (kg/mm$^2$) | 160 | 193 | 120 |
| Flexural modulus of elasticity (t/mm$^2$) | 12.5 | 9.7 | 4.2 |
| Compression strength (kg/mm$^2$) | 170 | 160 | 46 |

EXAMPLE 95

Using, as reinforcing fibers, the inorganic fiber II and a silicon carbide fiber using carbon as its core, having a diameter of 140 μ, a tensile strength of 350 kg/mm$^2$ and a tensile modulus of elasticity and in the same manner as in Example 90, there was prepared a hydrid fiber-reinforced epoxy resin composite material. The composite material had a fiber content of 46% by volume (inorganic fibe II content=30% by volume, content of silicon carbide fibe using carbon as its core=16% by volume).

The composite material had a tensile strength, a tensile modulus of elasticity and a flexural strength of 165 kg/mm$^2$, 25 t/mm$^2$ and 210 kg/mm$^2$, respectively, at a 0° direction and a flexural strength of 6.1 kg/mm$^2$ at a 90° direction.

COMPARATIVE EXAMPLE 25

Using the silicon carbide fiber using carbon as its core, used in Example 90 and in the same manner as in Example 90, there were prepared prepreg sheets of silicon carbide fiber using carbon as it core. Using these prepreg sheets and in the same manner as in Comparative Example 20, there was obtained an epoxy resin composite material reinforced with a silicon carbide fiber using carbon as its core. The composite material had a fiber content of only 33% by volume becouse the silicon carbide fiber using carbon as its core had a large diameter.

The composite material had a tensile strength, a tendile modulus of elasticity and a flexural strength of 140 kg/mm$^2$, 23 t/mm$^2$ and 195 kg/mm$^2$ at a 90° direction.

EXAMPLE 96

Using, as reinforcing fibers, the inorganic fiber II and a boron fiber having a diameter of 140 μ, a tensile strength of 357 kg/mm$^2$ and a tensile modulus of elasticity of elasticity of 41 t/mm$^2$ and in the same manner as in Example 90, there was prepared a hydrid fiber-reinforced epoxy resin composite material. This composite material had a fiber content of 50% by volume (inorganic fiber II content=30% by volume, boron fiber content=20% by volume).

The composite material had a tensile strength, a tensile modulus of elasticity and a flexural strength of 175 kg/mm$^2$, 25 t/mm$^2$ and 210 kg/mm$^2$, respectively, at a 0° direction and a flexural strength of 6.8 kg/mm$^2$ at a 90° direction.

COMPARATIVE EXAMPLE 26

Using only the boron fiber used in Example 96 and in the same manner as in Example 90, there were prepared boron fiber prepreg sheets. Then, a boron fiber-reinforced epoxy resin composite material was obtained in the same manner as in Comparative Example 20. The composite material had a fiber content of only 31% by volume because the boron fiber had a large diameter. The composite material had a tensile strength, a tensile modulus of elasticity and a flexural strength of 154 kg/mm$^2$, 22 t/mm$^2$ and 193 kg/mm$^2$, respectively, at a 0° direction and a flexural strength of 3.8 kg/mm$^2$ at a 90° direction.

EXAMPLE 97

The same procedure as in Example 90 was repeated except that the carbon fiber was replaced by an aramid fiber having a tensile strength of 270 kg/mm$^2$ and a tensile modulus of elasticity of 13 t/mm$^2$, to obtain a hydrid fiber-reinforced epoxy resin composite material. The composite material had a fiber content of 60% by volume (inorganic fiber content=30% by volume, aramid fiber content=30% by volume).

The composite material had a tensile strength, a tensile modulus of elasticity and a flexural strength of 156 kg/mm$^2$, 12 t/mm$^2$ and 158 kg/mm$^2$, respectively, at a 0° direction and was significantly improved in strength and elastic modulus as compared with an aramid fiber-reinforced epoxy resin having a fiber content of 60% by volume had a tensile strength, a tensile modulus of elasticity and a flexural strength of 95 kg/mm$^2$, 5.3 t/mm$^2$ and 93 kg/mm$^2$, respectively, at a 0° direction. The above composite material also had a flexural shock of 276 kg.cm/cm$^2$ and did not substantially reduce the shock resistance of the aramid fiber which characterizes the fiber. (An aramid fiber-reinforced epoxy resin having a fiber content of 60% by volume had a flexural shock of 302 kg.cm/cm$^2$.)

EXAMPLE 98

To a β-SiC powder having an average particle diameter of 0.2 μm were added 3% of boron carbide and 10% of a polytitanocarbosilane powder, and they were throughly mixed. This mixture and a bundle of the inorganic fibers I of 50 mm in length uniformly arranged in one direction were laminated by turns fo that the inorganic fiber I content in the resulting laminate became 40% by volume. The resulting laminate was press molded at 500 kg/cm$^2$ in a mold. The molded material obtained was heated to 1950° C. in an argon atmosphere at a rate of 200° C./hr and kept at that temperature for 1 hour to obtain an inorganic fiber-reinforced silicon carbide composite sintered material.

COMPARATIVE EXAMPLE 27

(1) Dimethyldichlorosilane was subjected to dechlorination condensation with metallic sodium to synthesize a polydimethylsilane. 100 parts by weight of the polydimethylsilane and 3 parts by weight of a polyborosiloxane were mixed, and the mixture was subjected to condensation at 350° C. in nitrogen to obtain a polycarbosilane having a main chain consisting mainly of a carbosilane unit represented by the formula (Si—H) (the silicon atom of the carbosilane unit has a hydrogen atom and a methyl group bonded thereto). The polycarbosilane was melt spun, cured at 190° C. in air, and successively pyrolyzed at 1300° C. in nitrogen to obtain a silicon carbide fiber composed mainly of Si, C and O, having a diameter of 13 μ, a tensile strength of 300 kg/mm² and a tensile modulus of elasticity of 16 t/mm².

(2) The same procedure as in Example 98 was repeated except that the inorganic fiber I was replaced by the silicon carbide fiber produced only from a polycarbosilane in (1) above, to obtain a silicon carbide fiber-reinforced silicon carbide composite sintered material.

COMPARATIVE EXAMPLE 28

Using a commercially available PAN-based carbon fiber having a diameter of 7.0 μm, a tensile strength of 300 kg/mm² and a tensile modulus of elasticity of 21 t/mm² and in the same manner as in Example 98, there was obtained a carbon fiber-reinforced silicon carbide composite sintered material.

COMPARATIVE EXAMPLE 29

The same procedure as in Example 98 was repeated except that neither inorganic fiber nor polytianocarbosilane powder was used, to obtain a silicon carbide sintered material.

EXAMPLE 99

(1) The same spinning material as used in Example 88 (1) was melt spun at 360° C. using a metallic nozzle of 0.15 mm in diameter. The spun fiber was oxidized and cured at 300° C. in air and pyrolyzed at 2500° C. in an argon atmosphere to obtain an inorganic fiber III having a diameter of 7.2 μ.

This fiber had a tensile strength of 335 kg/mm² and a tensile modulus of elasticity of 53 t/mm².

The inorganic fiber III was ground, subjected to alkali fusion and then to a hydrochloric acid treatment, dissolved in water and then subjected to high frequency plasma spectrochemical analysis. As a result, the inorganic fiber III had a silicon content of 0.42%.

(2) The same procedure as in Example 98 was repeated except that the inorganic fiber III was used as a reinforcing fiber, to obtain an inorganic fiber-reinforced silicon carbide composite sintered material.

The mechanical strengths of the sintered materials obtained in Example 98 and 99 and Comparative Examples 27-29 are shown in Table 10. In Table 10 flexural strength is a value when the measurement was made at a direction perpendicular to fiber.

TABLE 10

|  | Flexural strength (kg/mm²) | | | Kic ratio | Reduction in flexural strength (800° C.) (%) | Deterioration rate (1950° C.) (kg/mm² · sec⁻¹) |
|---|---|---|---|---|---|---|
|  | Room temp. | 800° C. (in air) | 1400° C. (in nitrogen) | | | |
| Example 98 | 57 | 48 | 64 | 5.1 | 5 | 0.10 |
| Comparative Example 27 | 15 | — | — | — | — | — |
| Comparative Example 27 | 42 | 20 | 50 | 2.5 | 25 | — |
| Comparative Example 27 | 50 | 53 | 55 | — | 70 | — |
| Example 99 | 63 | 53 | 69 | 4.0 | 8 | 0.08 |

EXAMPLE 100

An αSi₃N₄ powder having an average particle diameter of 0.5 μm was thoroughly mixed with 2% of alumina, 3% of yttria and 3% of aluminum nitride. The resulting powder and a bundle of the inorganic fibers I of 50 mm in length arranged in one direction were laminated by turns so that the fiber content in the resulting laminate became about 10% by volume. At this time, the inorganic fibers I were laminated in two directions of 0° and 90°. The laminate was pressed for 30 minutes at 300 kg/cm² at 1750° C. to obtain an inorganic fiber-reinforced silicon nitride composite sintered material.

The flexural strength at room temperature and 1400° C., etc. of the sintered material are shown in Table 11.

COMPARATIVE EXAMPLE 30

The same procedure as in Example 100 was repeated except that no inorganic fiber I was used, to obtain a sintered material. The results are shown in Table 11.

TABLE 11

|  | Flexural strength (kg/mm²) | | Kic ratio | Reduction in flexural strength (1200° C.) | Deterioration rate (1750° C.) (kg/mm² · sec¹) |
|---|---|---|---|---|---|
|  | Room temp. | 1400° C. | | | |
| Example 100 | 125 | 76 | 2.2 | 5 | 0.20 |
| Comparative Example 30 | 120 | 45 | — | 55 | — |

EXAMPLE 101

To a powder (average particle diameter = 44 μm) of a borosilicate glass (7740 manufactured by Corning Glass Works) were added 45% by volume of chopped fibers of 10 mm in length obtained by cutting the inorganic fiber 1. They were thoroughly dispersed in isopropyl alcohol to obtain a slurry. This slurry and a bundle of the inorganic fibers I arranged in one direction were laminated by turns, dried and hot pressed at 750 kg/cm² for about 10 minutes at 1300° C. in an argon atmosphere to obtain an inorganic fiber-reinforced glass composite material. The results are shown in Table 12.

COMPARATIVE EXAMPLE 31

The same procedure as in Example 101 was repeated except that the inorganic fiber I was replaced by a commercially available silicon carbide fiber, to obtain a glass ceramic. The results are shown in Table 12.

TABLE 12

| | Flexural strength (kg/mm²) (Room temperature) (kg/mm²) | Kic ratio | Reduction in flexural strength (900° C.) (%) | Deterioration rate (1300° C.) (kg/mm² · sec⁻¹) |
|---|---|---|---|---|
| Example 101 | 21.0 | 4.8 | 3 | 0.28 |
| Comparative Example 31 | 14.2 | 4 | 2 | 1.50 |

EXAMPLE 102

An alumina powder having an average particle diameter of 0.5 μm was mixed with 2% by weight of titanium oxide. To the mixture was added 15% by volume of a spun fiber of a silicon-containing reaction product (this spun fiber was a precursor of the inorganic fiber I), and they were thoroghly mixed in an alumina-made ball mill. The precursor fiber had an average length of about 0.5 mm. The mixture was sintered at 2000° C. in an argon atmosphere using a hot press. The resulting sintered material was subjected to a spalling test. That is, the sintered material was made into a shape of plate (40 mm × 10 mm × 3 mm); the plate was rapidly heated for 20 minutes in a nitrogen atmosphere in an oven of 1300° C.; then, the plate was taken out and subjected to forced air cooling for 20 minutes; this cycle was repeated until cracks appeared; thus, the cycle number in which cracks first appeared was examined.

The cycle number and mechanical strength of the sintered material are shown in Table 13.

COMPARATIVE EXAMPLE 32

The same procedure as in Example 102 was repeated except that no precursor fiber was used, to obtain a sintered material.

The results are shown in Table 13.

TABLE 13

| | Kic ratio | Reduction in flexural strength (800° C.) (%) | Spalling test (cycle number) |
|---|---|---|---|
| Example 102 | 2.5 | 5 | 9 |
| Comparative Example 32 | — | 90 | 2 |

EXAMPLE 103

A plain weave fabric of the inorganic fiber I used in Example 87 was immersed in a methanol solution of a resol type phenolic resin (MRW-3000 manufactured by Meiwa Kasei K. K.), pulled up, subjected to methanol removal and dried to obtain a prepreg sheet. The prepreg sheet was cut into square sheets of 5 cm × 5 cm; the square sheets were piled up in a mold and pressed at 50 kg/cm² at 200° C. to cure the phenolic resin to obtain a molded material. The molded material was buried in a carbon powder and heated to 1000° C. at a rate of 5° C./h in a nitrogen current to obtain an inorganic fiber-reinforced carbon composite material. The composite material was a porous material having a bulk density of 1.22 g/cm³.

This compostie material was mixed with the mesophase pitch powder obtained in Example 1 (2), melted at 350° C. in a nitrogen atmosphere in an autoclave, made vacuum to effect impregnation of the pores of the composite material with the mesophase pitch, pressurized at a 100 kg/cm² to further effect impregnation, heated to 300° C. at a rate of 5° C./h for curing, and carbonized at 1300° C. This impregnation with mesophase pitch and carbonization procedure was repeated three more times to obtain a composite matirial having a bulk density of 1.85 g/cm and a flexural strength of 37 kg/mm². The composite material had a fiber content (Vf) of 60% by volume. (Vf was 60% by volume also in the following Example 104.)

EXAMPLE 104

A graphite powder having an average particle diameter of 0.2 μm and the same mesophase pitch powder as used in Example 103 were mixed at a 1:1 weight ratio. The resulting mixed powder and the fabric of the inorganic fiber III obtained in Example 99 (1) were laminated by turns and pressed at 100 kg/cm² at 350° C. to obtain a molded material. This molded material was subjected to four times of impregnation with mesophase pitch and carbonization in the same manner as in Example 103, to obtain a composite material having a bulk density of 1.92 g/cm³ and a flexural strength of 41 kg/mm². When the compostite material was heated to 2500° C. in an argon atmosphere to graphitize the matrix, the flexural strength of the composite material improved to 51 kg/mm².

COMPARATIVE EXAMPLE 33

The same procedure as in Example 103 was repeated except that there was used a commercially availlable PAN-based carbon fiber having a diameter of 7 μm, a tensile strength of 300 kg/mm² and a tensile modulus of elasticity of 21 t/mm², to obtain a composite material. The composite material had a bulk density of 1.83 g/cm³ and a flexural strength of 21 kg/mm².

COMPARATIVE EXAMPLE 34

Impregnation with mesophase pitch and carbonization at 1300° C. were repeated four times in ths same manner as in Example 104 except that there was used a fabric of the silicon carbide fiber obtained in Comparative Example 27 (1), to obtain a composite material. The composite material had a flexural strength of 29 kg/mm². When this material was further pyrolyzed at 2500° C., the flexural strength decreased to 9 kg/mm² and the fiber reinforcement effect was lost completely.

EXAMPLE 105

(1) To 57.4 g of the reaction product of Example 10 (1) was added 15.5 g of a xylene solution containing 25% (3.87 g) of tetraoctoxytitanium Ti(OC₈H₁₇)₄]. After distilling off xylene, the residue was reacted for 1 hour at 340° C. to obtain 56 g of a reaction product.

The reaction product and the mesophase pitch obtained in Example 10 (2) were melt mixed at a ratio of 1:1 at 380° C. in a nitrogen atmosphere to obtain a polymer II.

(2) A two-dimensional plain weave fabric of the same inorganic fiber I as used in Example 87 was cut into discs of 7 cm in diameter. The discs were impregnated with a xylene slurry containing 30% of the polymer II and dried to prepare prepreg sheets. In a mold, these prepreg sheets were laminated in a total number of 30 with the fine powder of the polymer II being packed between each two neighboring sheets and with the fiber direction of a sheet differing from that of the lower sheet by 45°, and hot pressed at 350° C. at a pressure of 50 kg/cm$^2$ to obtain a disc-like molded material. This molded material was buried in a carbon powder bed for shape retention and heated to 800° C. at a rate of 5° C./h in a nitrogen current and then to 1300° C. to carbonize the matrix. The resulting composite material had a bulk density of 1.19 g/cm$^3$.

The composite material was immersed in a xylene slurry containing 50% of the polymer II; the system was heated to 350° C. under reduced pressure while distilling off xylene; then, a pressure of 100 kg/cm$^2$ was applied to effect impregnation. Thereafter, the impregnated composite material was heated to 300° C. in air at a rate of 5° C./h for curing and carbonized at 1300° C. This impregnation and carbonization procedure was repeated three more times to obtain a composite material having a bulk density of 1.96 g/cm$^3$. The composite material had a flexural strength of 57 kg/mm$^2$.

EXAMPLE 106

(1) To 39 g of the reaction product of Example 10 (1) was added an ethanol-xylene solution containing 1.5% (5.4 g) of tetrakisacetylacetonatozirconium. After distilling off xylene, the residue was reacted for 1 hour at 250° C. to obtain 39.5 g of a reaction product.

The reaction product and the same mesophase pitch as mentioned above were melt mixed at a 1:1 ratio at 380° C. in a nitrogen atmosphere to obtain a polymer III.

(2) The polymer III was prefired at 1300° C. in nitrogen to obtain an inorganic material. 50 g of this inorganic material was mixed with 50 g of a powder of the polymer III. The resulting mixture and a two-dimensional plain weave fabric of the inorganic fiber III obtained in Example 99 (1) were piled up by turns and hot pressed at 400° C. at 100 kg/cm$^2$ to obtain a molded material. The molded material was carbonized in the same manner as in Example 105. The resulting material was subjected to four times of (a) impregnation with the polymer III and (b) carbonization, in the same manner as in Example 1. The resulting composite material had a bulk density of 2.03 g/cm$^3$ and a flexural strength of 58 kg/mm$^2$. When the composite material was pyrolyzed at 2200° C. in argon, the bulk density and flexural strength improved to 2.06 g/cm$^3$ and 63 kg/mm$^2$, respectively.

EXAMPLE 107

(1) The procedure of Example 10 (1) was repeated except that the amounts of the reforming pitch and organosilicon polymer used were changed to 60 g and 40 g, respectively, to obtain 57 g of a reaction product.

To 40 g of this reaction product was added an ethanol-xylene solution containing 7.2 g (1.5%) of harfnium chloride. After distilling off xylene, the residue was polymerized for 1 hour at 250° C. to obtain 43.5 g of a reaction product.

The reaction product and the same mesophase pitch as mentioned above were melt mixed at a 1:1 ratio at 380° C. in a nitrogen atmosphere to obtain a polymer IV.

(2) The procedure of Example 105 was repeated except that the polymer IV was used as a polymer for production of prepreg sheets, a polymer for mold packing and a polymer for impregnation, to obtain a composite material. The composite material had a bulk density of 2.10 g/cm$^3$ and a flexural strength of 54 kg/mm$^2$.

COMPARATIVE EXAMPLE 35

A carbon fiber-reinforced carbon material was obtained in the same manner as in Example 105 except that the inorganic fiber III as an reinforcing fiber was replaced by a commercially available PAN-based carbon fiber having a fiber diameter of 7 μm, a tensile strength of 300 kg/mm$^2$ and a tensile modulus of elasticity of 21 t/mm$^2$ and the polymer III was replaced by a petroleum-based heat treated pitch having a softening point of 50° C. and a carbon residue of 60%. This material had a low bulk density of 1.67 g/cm$^3$ and a flexural strength of 15 kg/mm$^2$.

COMPARATIVE EXAMPLE 36

The silicon carbide fiber obtained in Comparative Example 27 (1) and an equal weight mixture, as a matrix material, of (a) synthetic graphite having a bulk density (under no load) of 0.15 g/cm$^3$ and (b) the same pitch powder as used in Comparative Example 35, were subjected to hot pressing in the same manner as in Example 106 to obtain a molded material. The molded material was carbonized. The carbonized material was subjected to four times of (a) impregnation with the above pitch and (b) carbonization, to obtain a composite material having a bulk density of 1.90 g/cm$^3$ and a flexural strength of 21 kg/mm$^2$. It was tried to graphitize the composite material at 2200° C., but the reinforcing fiber deteriorated and the strength of the composite material decreased to 5 kg/mm$^2$.

EXAMPLE 108

The composite materials of Examples 105, 106 and 107 and Comparative Examples 35 and 36 were heated for 1 hour in an air oven of 600° C. and then measured for flexural strength. In the composite materials of Comparative Examples 35 and 36, oxidative deterioration took place to such an extent as to allow no strength measurement. In the composite materials of Examples 105, 106 and 108, there was seen no strength reduction.

EXAMPLE 109

(1) 50 g of a reforming pitch was added to 50 g of the organosilicon polymer obtained in Reference Example 1. The mixture was reacted for 4 hours at 420° C. to obtain 48 g of a reaction product.

Separately, a reforming pitch was reacted for 4 hours at 430° C. to obtain a mesophase pitch.

The reaction product and the mesophase pitch were melt mixed at equal weights to obtain a uniform silicon-containing reaction product. The reaction product is hereinafter referred to as the polymer V.

(2) A two-dimensional plain weave fabric of the inorganic fiber I obtained in Example 87 (1) was cut into discs having a diameter of 7 cm. The discs were impregnated with a xylene slurry containing 30% of the reaction product of Example 10 (1) and dried to prepare prepreg sheets. In a mold, these prepreg sheets were laminated in a total sheet number of 30 with the fine powder of the matrix polymer V being packed between each two neighboring sheets and with the fiber direction (angle) of a sheet advanced from that of the lower sheet by 45°, and hot pressed at 350° at a pressure of 50 kg/cm$^2$ to form a disc-like molded material. This molded material was buried in a carbon powder bed for shape retention and heated to 800° C. at a rate of 5° C./h in a nitrogen current and then to 1300° C. to carbonize the matrix. The resulting composite material had a bulk density of 1.32 g/cm$^3$.

The composite material was immersed in a xylene slurry containing 50% of the product of Example 10 (1); the system was heated to 350° C. under reduced pressure while distilling off xylene; then, a pressure of 100 kg/mm$^2$ was applied to effect impregnation. Thereafter, the impregnated composite material was heated to 300° C. in air at a rate of 5° C./h for curing and carbonized at 1300° C. This impregnation and carbonization procedure was repeated three more times to obtain a material having a bulk density of 1.95 g/cm$^3$. The composite material had a flexural strength of 55 kg/mm$^2$.

EXAMPLE 110

The silicon-containing reaction product obtained in Example 88 (1) was prefired at 1300° C. in nitrogen to obtain an inorganic material. 50 parts of this inorganic material and 50 parts of a powder of the polymer V were mixed. The mixture and a two-dimensional plain weave fabric of the inorganic fiber III obtained in Example 99 (1) were piled up by turns and hot pressed at 400° C. at 100 kg/cm$^2$ to obtain a molded material. The molded material V was carbonized in the same manner as in Example 109. The carbonized material was subjected to four times of (a) impregnation with the polymer V and (b) carbonization, in the same manner as in Example 109. The resulting composite material had a bulk density of 2.02 g/cm$^3$ and a flexural strength of 58 kg/mm$^2$. When the composite material was pyrolyzed at 2200° C. in argon, the bulk density and flexural strength improved to 2.05 g/cm$^3$ and 61 kg/mm$^2$, respectively.

COMPARATIVE EXAMPLE 37

A carbon fiber-reinforced carbon material was obtained in the same manner as in Example 109 except that the inorganic fiber I as a reinforcing fiber was changed to a commercially available PAN-based carbon fiber having a fiber diameter of 7 μm, a tensile strength of 300 kg/mm$^2$ and a tensile modulus of elasticity of 21 t/mm$^2$ and the polymer V was changed to a petroleum-based heat treated pitch having a softening point of 150° C. and a carbon residue of 60%. The material had a low bulk density of 1.67 g/cm$^3$ and a flexural strength of 15 kg/mm$^2$.

COMPARATIVE EXAMPLE 38

The silicon carbide fiber obtained in Comparative Example 27 (1) and an equal weight mixture of (a) snthetic graphite having a bulk density (under no load) of 0.15 g/cm$^3$ and (b) a powder of the same pitch as used in Comparative Example 37 were subjected to hot pressing in the same manner as in Example 110 to obtain a molded material. The molded material was carbonized and then subjected to four times of (a) impregnation with the above pitch and (b) carbonization, to obtain a composite material having a bulk density of 1.90 g/cm$^3$ and a flexural strength of 21 kg/mm$^2$. It was tried to graphitize the composite material at 2200° C., but the reinforcing fiber deteriorated and the strength decreased to 5 kg/mm$^2$.

EXAMPLE 111

The composite materials of Examples 109 and 110, and Comparative Examples 37 and 38 were heated for 1 hour in an air oven of 600° C. and then measured for flexural strength.

In the composite materials of Comparative Examples 37 and 38, oxidative deterioration took place to such an extent as to allow no strength measurement. Meanwhile, in the composite material of Example 109, strength reduction was only 5% and in the composite material of Example 110, there was seen no strength reduction.

EXAMPLE 112

A fiber was produced using an apparatus of FIG. 1.

FIG. 1 is a schematic illustration showing an example of the apparatus used for production of a fiber for use in the composite material of the present invention, wherein the numeral 1 is a treating tank, the numeral 2 is an ultrasonic applicator, the numeral 3 is a treating solution, the numeral 4 is a continuous fiber bundle, the numerals 5 and 10 are bobbins, the numerals 6 and 7 are movable rollers, the numerals 8 and 9 are pressure rollers, the numeral 11 is a blower, the numeral 12 is a drier and the numeral 13 is a stirrer.

250 g of silicon carbide fine particles (average diameter: 0.28 μm) was placed in a treating tank 1 containing 5,000 cc of ethyl alcohol. Ultrasonic vibration was applied by an ultrasonic applicator 2 to suspend the silicon carbide fine particles in ethyl alcohol and thereby to prepare a treating solution 3.

A continuous fiber bundle 4 of the same inorganic fiber I as used in Example 87 was unwound from a bobbin 5 and passed through a treating solution 3 with the passing time controlled at about 15 sec by movable rollers 6 and 7. (During the passing, an ultrasonic wave was applied to the treating solution 3 and the solution 3 was stirred with air being blown.) Then, the continuous fiber bundle was pressed by pressure rollers 8 and 9, wound up by a bobbin 10, and dried at room temperature in air. In FIG. 1, the numerals 11 and 12 are a blower and a drier, respectively, and are used as necessary. The numeral 13 is a stirrer.

The fiber which had been black before the treatment had a grayish green color after the treatment. Weighing of the fiber after the treatment indicated that 6% by volume of the fine particles attached to the fiber.

EXAMPLE 113

The same treatment as in Example 112 was repeated except that as the treating solution in the treating tank 1 there was used a slurry obtained by suspending 100 g of silicon carbide whiskers (average diameter: about 0.2 μm, average length: about 100 μm) and 250 g of silicon carbide fine particles (average particle diameter: 0.28 μm) in 5,000 cc of ethyl alcohol.

The fiber which had been black before the treatment had a grayish green color after the treatment. Observation of the fiber after the treatment by an electron microscope (SEM) indicated that mainly fine particles attached to the surface of each continuous fiber and further mainly whiskers attached thereonto. Weighing of the fiber after the treatment indicated that 9% by volume of the fine particles and whiskers attached to the fiber.

EXAMPLE 114

The same treatment as in Example 113 was repeated except that as the continuous fiber there was used the inorganic fiber II obtained in Example 88 (1), to obtain a fiber to which about 8% of fine particles and whiskers had attached.

EXAMPLE 115

A continuous fiber bundle 4 of the inorganic fiber I was treated in the same manner as in Example 112 except that as the treating solution there was used a suspensin obtained by suspending 100 g of silicon nitride whiskers (average diameter: about 0.3 $\mu$m, average length: about 200 $\mu$m) and 100 g of the above silicon carbide fine particles in 5,000 cc of water. As a result, about 4% by volume of the fine particles and whiskers attached to the continuous fine bundle 4.

EXAMPLE 116

A continuous fiber bundle 4 of the inorganic fiber I was passed through a suspension obtained by stirring 100 g of silicon carbide fine particles in 500 cc of ethanol, while applying an ultrasonic wave to the suspension. Then, the fiber bundle was passed through a suspension obtained by stirring 150 g of silicon nitride whiskers in 500 cc of ethanol, in the same manner and dried. As a result, about 12% by volume of the fine particles and whiskers attached to the fiber bundle.

EXAMPLE 117

The silicon-containing reaction product obtained in the third step of Example 10 was finely ground and then pyrolyzed at 1300° C. in an argon current to obtain a fine powder having an average particle diameter of 0.5 m and consisting of crystalline carbon, amorphous carbon and an amorphous material composed mainly of Si—C—O. 100 g of this fine powder was suspended in 500 cc of ethanol by stirring. A continuous fiber bundle 4 of the inorganic fiber I was passed through the above suspension while applying an ultrasonic wave to the suspension. The fiber bundle was then passed through a suspension obtained by suspending 150 g of silicon nitride whiskers in 500 cc of ethanol by stirring, in the same manner and dried. As a result, about 10% by volume of the fine particles and whiskers attached to the fiber bundle.

COMPARATIVE EXAMPLE 39

Using, as a continuous fiber, a commercially available acrylonitrile-based carbon fiber (HM-35), there was repeated the procedure of Example 112 to obtain a fiber to which a silicon carbide powder had attached, as well as a fiber to which silicon carbide whiskers had attached.

EXAMPLE 118

Using the fiber of Example 112 and an aluminum matrix, there was prepared a unidirectionally reinforced FRM. The FRM had a fiber volume fraction (vf) of 50% and a flexural strength of 165 kg/mm$^2$ (the ROM value was 175 kg/mm$^2$).

COMPARATIVE EXAMPLE 40

Using the fiber to which a silicon carbide powder had attached, obtained in Comparative Example 39 and an aluminum matrix, there was prepared a unidirectionally reinforced FRM. The FRM had a fiber volume fraction (vf) of 60% and a flexural strength of 130 kg/mm$^2$. Therefore, the strength was considerably low as compared with the ROM value (160 kg/mm$^2$).

EXAMPLE 119

Using the fiber of Example 113 or 114 and, as a matrix, aluminum containing 5% in total of copper and magnesium, there were prepared two unidirectionally reinforced FRM's. These FRM's each had a fiber volume fraction of 50%. Their flexural strengths were 170 kg/mm$^2$ when the fiber of Example 113 was used and 165 kg/mm$^2$ when the fiber of Example 114 was used, and were scarcely different from the ROM values (175.0 kg/mm$^2$).

COMPARATIVE EXAMPLE 41

Using the fibers of Comparative Example 39 and the matrix of Example 118, there were prepared two FRM's. The FRM using the fiber to which a silicon carbide powder had attached, had a fiber volume fraction (Vf) of 60% and a flexural strength of 125 kg/mm$^2$ (the ROM value was 160 kg/mm$^2$). The FRM using the fiber to which silicon carbide whiskers had attached, had a fiber volume fraction (Vf) of 50% and a flexural strength of 100 kg/mm$^2$ (the ROM value was 130 kg/mm$^2$). In the both FRM's, the strengths were considerably low as compared with the ROM values.

EXAMPLE 120

The same inorganic fiber as used in Example 87 was unidirectionally arranged on a pure aluminum foil (specified by JIS 1070) of 0.5 mm in thickness. Thereon was placed another aluminum foil of same quality and size. The laminate was subjected to hot rolling at 670° C. to prepare a composite foil of fiber and aluminum. The composite foil was piled up in a total sheet number of 27, was allowed to stand for 10 minutes at 670° C. under vacuum, and then subjected to hot pressing at 600° C. to obtain an inorganic fiber-reinforced aluminum composite material.

The inorganic fiber was measured for initial deterioration rate (kg/mm$^2$.sec$^{-1}$) and fiber strength reduction (%). The composite material was measured for tensile strength in fiber direction (kg/mm$^2$), tensile modulus of elasticity in fiber direction (t/mm$^2$), interlaminar shear strength (kg/mm$^2$), tensile strength in direction perpendicular to fiber (kg/mm$^2$) and fatigue limit/tensile strength. The results are shown in Table 14. The Vf of the composite material was 30% by volume.

COMPARATIVE EXAMPLE 42

A carbon fiber-reinforced aluminum composite material was prepared in the same manner as in Example 120 except that there was used, in place of the inorganic fiber used in the present invention, a commercially available PAN-based carbon fiber having a tensile strength of 300 kg/mm$^2$ and a modulus of elasticity of 21 t/mm$^2$. The carbon fiber and the composite material were measured for the above mentioned properties. The results are shown in Table 14. The Vf of the composite material was 30% by volume.

TABLE 14

|  | Example 120 | Comparative Example 42 |
|---|---|---|
| Initial deterioration rate (kg/mm$^2$ · sec$^{-1}$) | 0.9 | 3.2 |
| Fiber strength | 55 | 90 |

TABLE 14-continued

|  | Example 120 | Comparative Example 42 |
|---|---|---|
| reduction (%) |  |  |
| Tensile strength in fiber direction (kg/mm$^2$) | 51 | 25 |
| Tensile modulus of elasticity in fiber direction (t/mm$^2$) | 9.8 | 6.5 |
| Interlaminar shear strength (kg/mm$^2$) | 4.9 | 2.2 |
| Tensile strength in direction perpendicular to fiber (kg/mm$^2$) | 3.9 | 1.8 |
| Fatigue limit/ tensile strength | 0.38 | 0.25 |

EXAMPLE 121

A fiber-reinforced metal was prepared in the same manner as in Example 120 except that there was used an aluminum alloy foil (specified by JIS 6061). The inorganic fiber and the fiber-reinforced metal were measured for the above mentioned properties. The results are shown in Table 15.

COMPARATIVE EXAMPLE 43

A carbon fiber-reinforced aluminum composite material was prepared in the same manner as in Example 1 except that the inorganic fiber was replaced by a carbon fiber. The carbon fiber and the composite material were measured for the above mentioned properties.

The results are shown in Table 15.

TABLE 15

|  | Example 121 | Comparative Example 43 |
|---|---|---|
| Initial deterioration rate (kg/mm$^2 \cdot$ sec$^{-1}$) | 1.1 | 3.9 |
| Fiber strength reduction (%) | 59 | 95 |
| Interlaminar shear strength (kg/mm$^2$) | 10.1 | 4.0 |
| Tensile strength in direction perpendicular to fiber (kg/mm$^2$) | 7.5 | 3.2 |
| Fatigue limit/ tensile strength | 0.39 | 0.25 |

EXAMPLE 122

A plurality of the inorganic fibers I were arranged unidirectionally and coated with metallic titanium in a thickness of 0.1-10 $\mu$ by the use of a thermal spraying apparatus. This coated inorganic fiber layer was piled up in a plurality of layers with a titanium powder being packed between each two neighboring layers. The laminate was press molded. The molded material was prefired for 3 hours at 520° C. in a hydrogen atmosphere and then hot pressed at 200 kg/cm$^2$ at 1150° C. for 3 hours in an argon atmosphere to obtain an inorganic fiber-reinforced titanium composite material.

The inorganic fiber was measured for initial deterioration rate (kg/mm$^2$.sec$^{-1}$) and fiber strength reduction (%), and the composite material was measured for tensile strength in fiber direction (kg/mm$^2$), interlaminar shear strength (kg/mm$^2$), tensile strength in direction perpendicular to fiber (kg/mm$^2$) and fatigue limit/tensile strength. The results are shown in Table 16.

The tensile strength in fiber direction, of the composite material was 122 kg/mm$^2$, which was about two times the tensile strength of metallic titanium alone. The Vf of the composite material was 45% by volume.

COMPARATIVE EXAMPLE 44

A carbon fiber-reinforced titanium composite material was prepared in the same manner as in Example 122 except that the inorganic fiber was replaced by a carbon fiber. The carbon fiber and the composite material were measured for the above mentioned properties.

The results are shown in Table 16.

TABLE 16

|  | Example 122 | Comparative Example 44 |
|---|---|---|
| Initial deterioration rate (kg/mm$^2 \cdot$ sec$^{-1}$) | 1.0 | 3.7 |
| Fiber strength reduction (%) | 58 | 95 |
| Tensile strength in fiber direction (kg/mm$^2$) | 122 | 52 |
| Interlaminar shear strength (kg/mm$^2$) | 12.1 | 4.7 |
| Tensile strength in direction perpendicular to fiber (kg/mm$^2$) | 8.3 | 3.8 |
| Fatigue limit/ tensile strength | 0.33 | .20 |

EXAMPLE 123

A plurality of the inorganic fibers I were arranged unidirectionally and coated with a titanium alloy (Ti-6Al-4V) in a thickness of 0.1-10 $\mu$ by the use of a thermal spraying apparatus. This coated inorganic fiber layer was piled up in a plurality of layers with a titanium powder being packed between each two neighboring layers. The laminate was press molded. The molded material was prefired for 3 hours at 520° C. in a hydrogen gas atmosphere and then hot pressed at 200 kg/cm$^2$ at 1150° C. for 3 hours in an argon atmosphere to obtain an inorganic fiber-reinforced titanium composite material.

The inorganic fiber was measured for initial deterioration rate (kg/mm$^2$.sec$^{-1}$) and fiber strength reduction (%), and the composite material was measured for interlaminar shear strength (kg/mm$^2$), tensile strength in direction perpendicular to fiber (kg/mm$^2$) and fatigue limit/tensile strength. The Vf of the composite material was 45% by volume. The results are shown in Table 17.

COMPARATIVE EXAMPLE 45

A carbon fiber-reinforced titanium composite material was prepared in the same manner as in Example 123 except that the inorganic fiber was replaced by a carbon fiber. The carbon fiber and the composite material were measured for the above mentioned properties. The results are shown in Table 17.

TABLE 17

|  | Example 123 | Comparative Example 45 |
|---|---|---|
| Initial deterioration rate (kg/mm$^2 \cdot$ sec$^{-1}$) | 1.1 | 4.0 |
| Fiber strength reduction (%) | 61 | 96 |
| Interlaminar shear strength (kg/mm$^2$) | 16.9 | 7.4 |
| Tensile strength in direction perpendicular to fiber (kg/mm$^2$) | 13.5 | 6.0 |
| Fatigue limit/ | 0.32 | 0.19 |

TABLE 17-continued

|  | Example 123 | Comparative Example 45 |
|---|---|---|
| tensile strength |  |  |

EXAMPLE 124

On a pure magnesium foil of 0.5 mm in thickness were unidirectionally arranged a plurality of the inorganic fibers I. Thereon was placed another magnesium foil of same quality and size. The laminate was hot rolled at 670° C. to obtain a composite foil of fiber and magnesium. This composite foil was piled up in a total number of 27, was allowed to stand for 10 minutes at 670° C. under vacuum, and then was hot pressed at 600° C. to obtain an inorganic fiber-reinforced magnesium composite material.

The inorganic fiber was measured for initial deterioration rate (kg/mm$^2$.sec$^{-1}$) and fiber strength reduction (%), and the composite material was measured for interlaminar shear strength (kg/mm$^2$), tensile strength in direction perpendicular to fiber (kg/mm$^2$) and fatigue limit/tensile strength. The Vf of the composite material was 30% by volume. The results are shown in Table 18.

COMPARATIVE EXAMPLE 46

A carbon fiber-reinforced magnesium composite material was prepared in the same manner as in Example 124 except that the inorganic fiber was replaced by a carbon fiber. The carbon fiber and the composite material were measured for the above mentioned properties. The results are shown in Table 18.

TABLE 18

|  | Example 124 | Comparative Example 46 |
|---|---|---|
| Initial deterioration rate (kg/mm$^2$ · sec$^{-1}$) | 1.1 | 4.1 |
| Fiber strength reduction (%) | 64 | 96 |
| Interlaminar shear strength (kg/mm$^2$) | 4.1 | 1.5 |
| Tensile strength in direction perpendicular to fiber (kg/mm$^2$) | 3.1 | 1.3 |
| Fatigue limit/ tensile strength | 0.34 | 0.21 |

EXAMPLE 125

A plurality of the inorganic fibers I were undirectionally arranged on a magnesium alloy foil (specified by JIS A 891) of 0.5 mm in thickness. Thereon was placed another magnesium alloy foil of same quality and size. The laminate was not rolled at 670° C. to prepare a composite foil of fiber and magnesium alloy. This composite foil was piled up in a total number of 27, was allowed to stand for 10 minutes at 670° C. under vacuum, and was hot pressed at 600° C. to obtain an inorganic fiber-reinforced magnesium composite material.

The inorganic fiber was measured for initial deterioration rate (kg/mm$^2$.sec$^{-1}$) and fiber strength reduction (%), and the composite material was measured for interlaminar shear strength (kg/mm$^2$), tensile strength in direction perpendicular to fiber (kg/mm$^2$) and fatigue limit/tensile strength. The Vf of the composite material was 30% by volume. The results are shown in Table 19.

COMPARATIVE EXAMPLE 47

A carbon fiber-reinforced magnesium composite material was obtained in the same manner as in Example 125 except that the inorganic fiber was replaced by a carbon fiber. The carbon fiber and the composite material were measured for the above mentioned properties. The results are shown in Table 19.

TABLE 19

|  | Example 125 | Comparative Example 47 |
|---|---|---|
| Initial deterioration rate (kg/mm$^2$ · sec$^{-1}$) | 1.0 | 4.0 |
| Fiber strength reduction (%) | 62 | 96 |
| Interlaminar shear strength (kg/mm$^2$) | 6.8 | 2.8 |
| Tensile strength in direction perpendicular to fiber (kg/mm$^2$) | 5.2 | 2.2 |
| Fatigue limit/ tensile strength | 0.36 | 0.27 |

EXAMPLE 126

An inorganic fiber-reinforced aluminum composite material was prepared in the same manner as in Example 120 except that there was used the inorganic fiber II. The composite material had a Vf of 30% by volume.

The tensile strength of the composite material was about the same as that of the composite material obtained in Example 120, but the tensile modulus of elasticity was 15.2 t/mm$^2$.

COMPARATIVE EXAMPLE 48

A carbon fiber-reinforced aluminum composite material was prepared in the same manner as in Example 120 except that there was used the silicon carbide fiber obtained in Comparative Example 27 (1).

The tensile strength of the composite material was about the same as that of the composite material obtained in Example 120, but the tensile modulus of elasticity was 6.3 t/mm$^2$. The Vf of the composite material was 30% by volume.

EXAMPLE 127

(1) 500 g of the same FCC slurry oil as obtained in Reference Example 2 was heated for 1 hour at 450° C. in a nitrogen gas current of 1 liter/min to distil off the 450° C. fraction. The residue was filtered at 200° C. to remove the portion which was not in a molten state at 200° C., and thereby to obtain 225 g of a reforming removed pitch.

The reforming pitch had a xylene insoluble content of 75% and was optically isotropic.

(2) 400 g of the FCC slurry oil was heated at 450° C. in a nitrogen gas current to remove the 450° C. fraction. The residue was filtered at 200° C. to remove the portion which was not in a molten state at 200° C., and thereby to obtain 180 g of a reforming pitch. 180 g of the reforming pitch was subjected to a condensation reaction for 7 hours at 400° C. in a nitrogen current while removing the light fractions formed by the reaction, to obtain 85 g of a heat-treated pitch.

This heat-treated pitch had a melting point of 268° C., a xylene insoluble content of 92% and a quinoline insoluble content of 12%. The pitch was a mesophase pitch having an optical anisotropy of 89% when the polished surface was observed by a polarizing microscope. The pitch is hereinafter referred to as the mesophase pitch (A).

The FCC slurry oil was heated at 420° C. in a nitrogen gas current to distil off the 420° C. fraction. The residue was subjected to a polycondensation reaction for 5 hours at 400° C. to obtain a mesophase pitch having a melting point of 258° C., a xylene insoluble content of 65%, a quinoline insoluble content of 6% and an optical anisotropy of 52%. The pitch is hereinafter referred to as the mesophase pitch (B).

(3) 49 g of the pitch obtained in (1) above was mixed with 21 g of the organosilicon polymer obtained in Reference Example 1 and 20 ml of xylene. The mixture was heated with stirring to distil off xylene, and the residue was reacted for 6 hours at 400° C. to obtain 39 g of a precursor reaction product.

Infrared absorption spectrum analysis indicated that in the precursor reaction product there occurred the decrease of the Si—H bond (IR: 2100 cm$^{-1}$) present in organosilicon polymer and the new formation of Si—C (this C is a carbon of benzene ring) bond (IR: 1135 cm$^{-1}$). Therefore, it became clear that the precursor reaction product contained a structure in which part of the silicon atoms of organosilicon polymer bonded directly with carbons of the polycyclic aromatic ring.

39 g of the precursor reaction product was mixed with 11 g of a xylene solution containing 2.75 g (11%) of tetraoctoxytitanium [Ti(OC$_8$H$_{17}$)$_4$]. The mixture was heated to distil off xylene. The residue was reacted for 2 hours at 340° C. to obtain 38 g of a reaction product.

The reaction product contained no xylene insoluble, had a weight-average molecular weight of 1650 and a melting point of 272° C.

(4) 35 g of the above reaction product and 70 g of the mesophase pitch (A) were melt mixed for 1 hour at 310° C. in a nitrogen atmosphere to obtain a uniform titanium-containing reaction product. The product had a melting point of 272° C. and a xylene insoluble content of 59%.

(5) The titanium-containing reaction product was used as a spinning material and subjected to melt spinning at 340° C. using a metallic nozzle of 0.15 mm in diameter. The spun fiber was subjected to curing in air and then to pyrolyzing of 1300° C. in an argon atmosphere to obtain an inorganic fiber of 10 μm in diameter.

The inorganic fiber had a tensile strength of 320 kg/mm$^2$ and a tensile modulus of elasticity of 32 t/mm$^2$. The fiber, when the breaking surface was observed by a scanning type electron microscope, had a coral-like random-radial mixed structure consisting of a plurality of piled crystal layers.

The inorganic fiber, when heated (oxidized) in air, showed substantially no weight decrease up to 700° C. and showed only 7% of weight loss at 800° C.

EXAMPLE 128

39 g of the precursor reaction product obtained in Example 127 (3) was mixed with an ethanol-xylene solution containing 5.4 g (1.5%) of tetrakisacetylacetonatozirconium. After xylene was distilled off, the residue was polymerized for 1 hour at 250° C. to obtain 39.5 g of a reaction product.

20 g of the above reaction product and 50 g of the mesophase pitch (A) prepared in the same manner as in Example 127, were mixed in a fine particle state. The mixture was melted in a spinning chimney at 350° C. and spun at 340° C. using a nozzle of 0.2 mm in diameter. The spun fiber was cured at 250° C. in air and then pyrolyzed at 1400° C. in an argon atmosphere to obtain an inorganic fiber of 11 μ in diameter.

The fiber had a tensile strength of 325 kg/mm$^2$ and a tensile modulus of elasticity of 35 t/mm$^2$.

EXAMPLE 129

57 g of a precursor reaction product was obtained in the same manner as in Example 127 except that the amounts of the reforming pitch and organosilicon polymer used were changed to 60 g and 40 g, respectively.

40 g of the precursor reaction product was mixed with an ethanol-xylene solution containing 7.2 g (1.5%) of hafnium chloride. After xylene was distilled off, the residue was polymerized for 1 hour at 250° C. to obtain 43.5 g of a reaction product.

20 g of the reaction product and 80 g of the mesophase pitch (A) were mixed in a fine particle state. The mixture was melted and deaerated at 350° C. in a spinning chimney, was melt spun at 350° C., was cured at 270° C., and was pyrolyzed at 1200° C. in argon to obtain an inorganic fiber of 12.5 μ. The fiber had a tensile strength of 315 kg/mm$^2$ and a tensile modulus of elasticity of 35 t/mm$^2$.

EXAMPLE 130

18 g0 of the reaction product obtained in the same manner as in Example 127 (3) and 90 g of the mesophase pitch (B) described in Example 127 (2) were melt mixed for 1.5 hours at 300° C. in a nitrogen current to obtain a spinning dope having a melting point of 265° C. and a xylene insoluble content of 49%. The dope was melt spun at 330° C. using a nozzle of 0.15 mm in diameter, was cured at 300° C., and was pyrolyzed at 1700° C. to obtain an inorganic fiber of 8 μ in diameter. The fiber had a tensile strength of 305 kg/mm$^2$ and a tensile modulus of elasticity of 38 t/mm$^2$.

EXAMPLE 131 39 g of the precursor reaction product obtained in Example 127 (3) was mixed with 0.9 g of tetrabutoxytitanium. The mixture was subjected to the same procedure as in Example 127 to obtain 38.5 g of a reaction product. 18 g of this reaction product and 90 g of the mesophase pitch (A) described in Example 127 (2) were melt spun at 345° C. in the same manner as in Example 128, was cured at 300° C., and pyrolyzed at 2100° C. in an argon atmosphere.

The resulting inorganic fiber had a diameter of 7.5 μ, a tensile strength of 290 kg/mm$^2$ and a tensile modulus of elasticity of 45 t/mm$^2$.

EXAMPLE 132

An inorganic fiber was obtained in the same manner as in Example 131 except that the amount of tetrabutoxytitanium used was 9.0 g and the pyrolyzing temperature was 2500° C.

The inorganic fiber had a diameter of 7.5, a tensile strength of 335 kg/mm$^2$ and a tensile modulus of elasticity of 55 t/mm$^2$.

EXAMPLE 133

There were uniformly mixed 100 parts of a bisphenol A type epoxy resin (XB2879A manufactured by Ciba Geigy Co.) and 20 parts of a dicyandiamide curing agent (XB2879B manufactured by Ciba Geigy Co.). The mixture was dissolved in a 1:1 (by weight) mixed solvent of methyl cellosolve and acetone to prepare a solution containing 28% of the mixture.

The inorganic fibers obtained in Examples 127–130 were impregnated with the above solution, were unidirectionally taken off using a drum winder, and were heated for 14 minutes at 100° C. in a heat circulation oven to prepare half-cured inorganic fiber prepregs in which the fibers were arranged unidirectionally. These prepregs had a fiber content of 60% by volume and a thickness of 0.2 mm.

Each prepreg was piled up in a total number of 10 and press molded at 11 kg/cm² at 130° C. for 90 minutes to obtain four kinds of unidirectionally reinforced epoxy resin composite materials of 250 mm×250 mm.

A test sample of 12.7 mm (width), 85 mm (length) and 2 mm (thickness) for measurement of flexural strength was prepared from each of the above composite materials, by cutting. Each test sample was subjected to a three-point bending test (span/width=32, speed=2 mm/min). The flexural strengths of each composite material at 0° and 90° directions are shown in Table 20.

Separately, a composite material was prepared in the same manner as above except that there was used a pitch-based carbon fiber having a tensile strength of 280 kg/mm² and a tensile modulus of elasticity of 55 t/mm². The flexural stengths of this composite material are also shown in Table 20.

TABLE 20

| Fiber | Flexural strengths (kg/mm²) | |
|---|---|---|
|  | 0° | 90° |
| Example 127 | 203 | 13.0 |
| Example 128 | 205 | 13.2 |
| Example 129 | 201 | 13.8 |
| Example 130 | 198 | 12.0 |
| Carbon fiber | 100 | 3.5 |

EXAMPLE 134

(1) 57 g of the pitch containing 25% of a xylene insoluble portion, obtained in Example 10 (1) was mixed with 25 g of the organosilicon polymer obtained in Reference Example 1 and 20 ml of xylene. The mixture was heated with stirring to distil off xylene, and the residue was reacted for 4 hours at 400° C. to obtain 57.4 g of a precursor reaction product.

Infrared absorption spectrum analysis indicated that in the precursor reaction product there occurred the decrease of the Si—H bond (IR: 2100 cm$^{-1}$) present in organosilicon polymer and the new formation of Si—C (this C is a carbon of benzene ring) bond (IR: 1135 cm$^{-1}$). Therefore, it became clear that the precursor reaction product contained a polymer having a portion in which part of the silicon atoms of organosilicon polymer bonded directly with carbons of the polycyclic aromatic ring.

57.4 g of the precursor reaction product was mixed with 15.5 g of a xylene solution containing 3.87 g (25%) of tetraoctoxytitanium [Ti(OC$_8$H$_{17}$)$_4$]. After xylene was distilled off, the residue was reacted for 1 hour at 340° C. to obtain 56 g of a reaction product.

The reaction product contained no xylene insoluble portion, had a weight-average molecular weight of 1580, a melting point of 258° C. and a softening point of 292° C.

(2) 6.4 g of the above reaction product and 90 g of the same mesophase pitch as obtained in Example 10 (2) were mixed. The mixture was melted for 1 hour at 380° C. in a nitrogen atmosphere to obtain a uniform titanium-containing reaction product.

The reaction product had a melting point of 264° C., a softening point of 307° C. and a xylene insoluble content of 68%.

(3) The above reaction product was used as a spinning material and melt spun at 360° C. using a metallic nozzle of 0.15 mm in diameter. The spun fiber was subjected to curing at 300° C. in air and then to pyrolyzing at 1300° C. in an argon atmosphere to obtain an inorganic fiber of 7.5 m in diameter.

The fiber had a tensile strength of 358 kg/mm² and a tensile modulus of elasticity of 32 t/mm². The fiber, when the breaking surface was observed by a scanning type electron microscope, had a coral-like random-radial mixed structure consisting of a plurality of piled crystal layers.

The inorganic fiber was ground, subjected to alkali fusion, and treated with hydrochloric acid to convert into an aqueous solution. The solution was subjected to high frequency plasma emission sp34trochemical analysis (ICP). As a result, the inorganic fiber contained silicon and titanium in amounts of 0.95% and 0.06%, respectively.

The above fiber, when heated and oxidized in air, showed no reduction in above mentioned mechanical properties even at 600° C. and was superior in oxidation resistance to commercially available carbon fibers which were oxidized and burnt out at 600° C.

EXAMPLE 135

39 g of the precursor reaction product obtained in Example 134 was mixed with an ethanol-xylene solution containing 5.4 g (1.5%) of tetrakisacetylacetonatozirconium. After xylene was distilled off, the residue was polymerized at 250° C. for 1 hour to obtain 39.5 g of a reaction product.

20 g of the reaction product and 50 g of the same mesophase pitch as used in Example 134 (1) were finely ground and melt mixed for 1 hour at 360° C. The melt was spun at 350° C. using a nozzle of 0.2 mm in diameter. The spun fiber was cured at 250° C. in air and then pyrolyzed at 1400° C. in an argon atmosphere to obtain an inorganic fiber of 11 in diameter.

The fiber had a tensile strength of 345 kg/mm² and a tensile modulus of elasticity of 35 t/mm².

EXAMPLE 136

57 g of a precursor reaction product was obtained in the same manner as in Example 134 except that the amounts of the reforming pitch and organosilicon polymer used were changed to 60 g and 40 g, respectively.

40 g of the precursor reaction product was mixed with an ethanol-xylene solution containing 7.2 g (1.5%) of hafnium chloride. After xylene was distilled off, the residue was polymerized for 1 hour at 250° C. to obtain 43.5 g of a reaction product.

20 g of the reaction product and 80 g of the same mesophase pitch as used in Example 134 (2) were finely ground and melt mixed for 1 hour at 360° C. The melt was spun at 350° C. The spun fiber was cured at 270° C. and pyrolyzed at 1200° C. in argon to obtain an inorganic fiber of 12.5 μ. The fiber had a tensile strength of 335 kg/mm² and a tensile modulus of elasticity of 35 t/mm².

EXAMPLE 137

1.8 g of the same reaction product as obtained in Example 134 (1) and 90 g of the mesophase pitch (B) obtained in Example 127 (2) were melt mixed for 1.5 hours at 400° C. in a nitrogen current to obtain a spinning dope having a melting point of 265° C. and a xylene insoluble content of 55%. The dope was melt spun at 350° C. using a a nozzle of 0.15 mm in diameter. The spun fiber was cured at 300° C. and then pyrolyzed at 1700° C. to obtain an inorganic fiber of 8 μ in diameter.

The inorganic fiber was ground, subjected to alkali fusion and treated with hydrochloric acid to convert into an aqueous solution. The aqueous solution was subjected to high frequency plasma emission spectrochemical analysis (ICP). As a result, the inorganic fiber contained silicon and titanium in amounts of 0.3% and 0.015%, respectively.

The fiber had a tensile strength of 335 kg/mm$^2$ and a tensile modulus of elasticity of 40 t/mm$^2$.

EXAMPLE 138

39 g of the precursor reaction product obtained in Example 134 was mixed with 0.9 g of tetrabutoxytitanium, and the procedure of Example 134 (1) was repeated to obtain 38.5 g of a reaction product.

18 g of this reaction product and 90 g of the same mesophase pitch as obtained in Example 10 (2) were melt spun at 355° C. in the same manner as in Example 131. The spun fiber was cured at 300° C. and then pyrolyzed at 2100° C. in an argon atmosphere.

The resulting inorganic fiber had a diameter of of 7.5 μ, a tensile strength of 290 kg/mm$^2$ and a tensile modulus of elasticity of 45 t/mm$^2$.

EXAMPLE 139

An inorganic fiber was obtained in the same manner as in Example 138 except that the amount of tetrabutoxytitanium used was changed to 9 g and the pyrolyzing temperature was changed to 2500° C.

The inorganic fiber had a diameter of 7.5 μ, a tensile strength of 335 kg/mm$^2$ and a tensile modulus of elasticity of 59 t/mm$^2$.

EXAMPLE 140

The inorganic fibers obtained in Examples 134-137 were used as a reinforcing agent to obtain unidirectionally reinforced epoxy resin (bisphenol A type) composite materials (Vf: 60% by volume). The flexural strengths of these composite materials are shown in Table 21.

TABLE 21

| Inorganic fiber | Flexural strengths (kg/mm$^2$) | |
|---|---|---|
| | 0° | 90° |
| Example 134 | 248 | 13.0 |
| Example 135 | 240 | 13.2 |
| Example 136 | 238 | 13.8 |
| Example 137 | 235 | 12.0 |

EXAMPLE 141

(1) 700 g of the FCC slurry oil obtained in Reference Example 2 was heated to 450° C. in a nitrogen gas current to distil off the 450° C. fraction. The residue was filtered at 200° C. to remove the portion which was not in a molten state at 200° C., and thereby to obtain 200 g of a reforming pitch.

The reforming pitch contained a xylene insoluble portion in an amount of 25% and was optically isotropic.

57 g of the reforming pitch was mixed with 25 g of the organosilicon polymer obtained in Reference Example 1 and 20 ml of xylene. The mixture was heated with stirring to distil off xylene. The reisdue was reacted for 4 hours at 400° C. to obtain 57.4 g of a precursor reaction product.

Infrared absorption spectrum analysis indicated that in the precursor reaction product there occurred the decrease of the Si—H bond (IR: 2100 cm$^{-1}$) present in organosilicon polymer and the new formation of Si—C (this C is a carbon of benzene ring) bond (IR: 1135 cm$^{-1}$). Therefore, it became clear that the precursor reaction product contained a portion in which part of the silicon atoms of organosilicon polymer bonded directly with carbons of the polycyclic aromatic ring.

57.4 g of the precursor reaction product was mixed with 15.5 g of a xylene solution containing 3.87 g (25%) of tetraoctoxytitanium [Ti(OC$_8$H$_{17}$)$_4$]. After xylene was distilled off, the residue was reacted for 1 hour at 340° C. to obtain 56 g of a reaction product.

The reaction product contained no xylene insoluble portion and had a weight-average molecular weight of 1580, a melting point of 258° C. and a softening point of 292° C.

180 g of the above reforming pitch was subjected to a polycondensation reaction for 8 hours at 400° C. while removing the light fractions generated by the reaction, to obtain 97.2 g of a heat-treated pitch.

The heat-treated pitch had a melting point of 263° C., a softening point of 308° C., a xylene insoluble content of 77% and a quinoline insoluble content of 31%. The pitch, when the polished surface was observed by a polarizing microscope, was a mesophase pitch having an optical anisotropy of 75%.

6.4 g of the reaction product and 90% of the mesophase pitch were melt mixed for 1 hour at 380° C. in a nitrogen atmosphere to obtain a uniform titanium-containing reaction product.

The reaction product had a melting point of 264° C., a softening point of 307° C. and a xylene insoluble content of 68%.

The reaction product was used as a spinning material and melt spun at 360° C. using a metallic nozzle of 0.15 mm in diameter. The spun fiber was cured at 300° C. in air and then pyrolyzed at 1300° C. in an argon atmosphere to obtain an inorganic fiber IV of 7.5 μ in diameter.

The inorganic fiber had a tensile strength of 358 kg/mm$^2$ and a tensile modulus of elasticity of 32 t/mm$^2$. The fiber, when the breaking surface was observed by a scanning type electron microscope, had a coral-like random-radial mixed structure consisting of a plurality of piled crystal layers.

The inorganic fiber was ground, subjected to alkali fusion, treated with hydrochloric acid, and converted to an aqueous solution. The aqueous solution was subjected to high frequency plasma emission spectrochemical analysis (ICP). As a result, the inorganic fiber contained silicon and titanium in amounts of 0.95% and 0.06%, respectively.

(2) 100 parts of a bisphenol A type epoxy resin (XB2879A manufactured by Ciba Geigy Co.) and 20 parts of a dicyandiamide curing agent (XB2879B manufactured by Ciba Geigy Co.) were mixed uniformly. The mixture was dissolved in a 1:1 (by weight) mixed solvent of methyl cellosolve and acetone to obtain a solution containing 28% of the mixture.

The inorganic fiber IV obtained in (1) above was impregnated with the above solution, was taken off unidirectionally using a drum winder, and was heated for 14 minutes at 100° C. in a heat circulation oven to prepare a half-cured inorganic fiber prepreg wherein the fiber had been arranged unidirectionally. The prepreg had a fiber content of 60% by volume and a thickness of 0.15 mm.

The prepreg was piled up in a total number of 10 with the fibers of all the prepregs arranged in the same direction and press molded at 7 kg/cm$^2$ for 4 hours at 170° C. to obtain a unidirectionally reinforced epoxy resin composite material of 250 mm×250 mm.

From the composite material was cut out a test sample of 12.7 mm (width), 85 mm (length) and 2 mm (thickness) for flexural strength measurement. Using the test sample, a three-point bending test (span/width=32 mm) was effected at a speed of 2 mm/min. The mechanical properties of the composite material are shown below.

| | |
|---|---|
| Tensile strength (kg/mm$^2$) | 192 |
| Tensile modulus of elasticity (t/mm$^2$) | 19 |
| Flexural strength (kg/mm$^2$) | 152 |
| Flexural modulus of elasticity (t/mm$^2$) | 18 |
| Tensile strength in direction perpendicular to fiber (kg/mm$^2$) | 6.9 |
| Tensile modulus of elasticity in direction perpendicular to fiber (t/mm$^2$) | 5.5 |
| Flexural strength in direction perpendicular to fiber (kg/mm$^2$) | 10.2 |
| Flexural modulus of elasticity in direction perpendicular to fiber (t/mm$^2$) | 5.4 |
| Interlaminar shear strength (kg/mm$^2$) | 9.3 |
| Flexural shock (kg · cm/mm$^2$) | 272 |

EXAMPLE 142

(1) 39 g of the same precursor reaction product as used in Example 141 (1) was mixed with an ethanol-xylene solution containing 5.4 g (1.5%) of tetrakisacetylacetonatozirconium. After xylene and ethanol were distilled off, the residue was polymerized for 1 hour at 250° C. to obtain 39.5 g of a reaction product.

20 g of the reaction product and 50 g of the same mesophase pitch as used in Example 141 (1) were finely ground and then melt mixed for 1 hour at 360° C. The mixture was melt spun at 350° C. using a nozzle of 0.2 mm in diameter. The spun fiber was cured at 250° C. in air and then pyrolyzed at 1400° C. in an argon atmosphere to obtain a zirconium-containing inorganic fiber V of 11 μ in diameter.

The inorganic fiber had a tensile strength of 345 kg/mm$^2$ and a tensile modulus of elasticity of 35 t/mm$^2$.

(2) There was used, as a reinforcing fiber, the inorganic fiber V obtained in (1) above; as a matrix, there was used a commercially available unsaturated polyester resin in place of the epoxy resin; and the procedure of Example 141 was repeated to prepare an inorganic fiber-reinforced polyester composite material having a fiber content of 60% by volume. The mechanical properties of the composite material are shown below.

| | |
|---|---|
| Tensile strength (kg/mm$^2$) | 180 |
| Tensile modulus of elasticity (t/mm$^2$) | 19 |
| Flexural strength (kg/mm$^2$) | 240 |
| Flexural modulus of elasticity (t/mm$^2$) | 18 |
| Tensile strength in direction perpendicular to fiber (kg/mm$^2$) | 6.5 |
| Tensile modulus of elasticity in direction perpendicular to fiber (t/mm$^2$) | 5.5 |
| Flexural strength in direction perpendicular to fiber (kg/mm$^2$) | 9.7 |
| Flexural modulus of elasticity in direction perpendicular to fiber (t/mm$^2$) | 5.5 |
| Interlaminar shear strength (kg/mm$^2$) | 9.0 |
| Flexural shock (kg · cm/mm$^2$) | 264 |

EXAMPLE 143

(1) 57 g of a precursor reaction product was obtained in the same manner as in Example 141 (1) except that the amounts of the reforming pitch and organosilicon polymer used were changed to 60 g and 40 g, respectively.

40 g of the precursor reaction product was mixed with an ethanol-xylene solution containing 7.2 g (1.5%) of hafnium chloride. After xylene and ethanol were distilled off, the residue was polymerized for 1 hour at 250° C. to obtain 43.5 g of a reaction product.

20 g of the reaction product and 80 g of the same mesophase pitch as used in Example 141 (1) were finely ground and then melt mixed for 1 hour at 360° C. The mixture was melt spun at 350° C. using a nozzle of 0.2 mm in diameter. The spun fiber was cured at 270° C. in air and pyrolyzed at 1200° C. in an argon atmosphere to obtain a hafnium-containing inorganic fiber VI of 12.5 μ in diameter.

The inorganic fiber had a tensile strength of 335 kg/mm$^2$ and a tensile modulus of elasticity of 35 t/mm$^2$.

(2) The procedure of Example 141 was repeated except that there was used, as a reinforcing fiber, the inorganic fiber VI obtained in (1) above and, as a matrix, there was used a polyimide resin manufactured by Ube Industries, Ltd. in place of the epoxy resin, to prepare an inorganic fiber-reinforced polyimide composite material having a fiber content of 60% by volume.

The mechanical properties of the composite material are shown below.

| | |
|---|---|
| Tensile strength (kg/mm$^2$) | 177 |
| Tensile modulus of elasticity (t/mm$^2$) | 19 |
| Flexural strength (kg/mm$^2$) | 239 |
| Flexural modulus of elasticity (t/mm$^2$) | 18.5 |
| Tensile strength in direction perpendicular to fiber (kg/mm$^2$) | 6.4 |
| Tensile modulus of elasticity in direction perpendicular to fiber (t/mm$^2$) | 5.4 |
| Flexural strength in direction perpendicular to fiber (kg/mm$^2$) | 9.6 |
| Flexural modulus of elasticity in direction perpendicular to fiber (t/mm$^2$) | 5.4 |
| Interlaminar shear strength (kg/mm$^2$) | 8.9 |
| Flexural shock (kg · cm/mm$^2$) | 261 |

EXAMPLE 144

(1) 1.8 g of the same reaction product as obtained in Example 141 (1) and 90 g of a mesophase pitch were melt mixed for 1.5 hours at 400° C. in a nitrogen current to obtain a spinning dope having a melting point of 265° C. and a xylene insoluble content of 55%. The dope was melt spun at 350° C. using a nozzle of 0.15 mm in diameter. The spun fiber was cured at 300° C. and then pyrolyzed at 1700° C. to obtain an inorganic fiber VII of 8 μ in diameter.

The inorganic fiber VII was ground, subjected to alkali fusion, treated with hydrochloric acid, and converted to an aqueous solution. The aqueous solution was subjected to high frequency plasma emission spectrochemical analysis (ICP). As a result, the inorganic fiber VII contained silicon and titanium in amounts of 0.3% and 0.015%, respectively.

The fiber had a tensile strength of 335 kg/mm$^2$ and a tensile modulus of elasticity of 40 t/mm$^2$.

(2) The inorganic fiber VII obtained in (1) above was used as an inorganic fiber and the procedure of Example 141 was repeated to obtain an inorganic fiber-reinforced epoxy composite material having a fiber content of 60% by volume.

The mechanical properties of the composite material are shown below.

| | |
|---|---|
| Tensile strength (kg/mm$^2$) | 180 |
| Tensile modulus of elasticity (t/mm$^2$) | 24 |
| Flexural strength (kg/mm$^2$) | 242 |
| Flexural modulus of elasticity (t/mm$^2$) | 22 |
| Tensile strength in direction perpendicular to fiber (kg/mm$^2$) | 6.5 |
| Tensile modulus of elasticity in direction perpendicular to fiber (t/mm$^2$) | 6.6 |
| Flexural strength in direction perpendicular to fiber (kg/mm$^2$) | 9.9 |
| Flexural modulus of elasticity in direction perpendicular to fiber (t/mm$^2$) | 6.4 |
| Interlaminar shear strength (kg/mm$^2$) | 9.0 |
| Flexural shock (kg · cm/mm$^2$) | 265 |

EXAMPLE 145

100 parts of a bisphenol A type epoxy resin (XB2879A manufactured by Ciba Geigy Co.) and 20 parts of a dicyandiamide curing agent (XB2879B manufactured by Ciba Geigy Co.) were mixed uniformly. The mixture was dissolved in a 1:1 (by weight) mixed solvent of methyl cellosolve and acetone to prepare a solution containing 28% of the mixture.

The same inorganic fiber IV as used in Example 141 (1) were impregnated with the above solution, was taken off unidirectionally using a drum winder, and was heated for 14 minutes at 100° C. in a heat circulation oven to prepare half-cured inorganic fiber prepreg wherein the fiber had been arranged in the same direction.

Using a surface-treated carbon fiber (polyacrylonitrile-based, tensile strength = 300 kg/mm$^2$, tensile modulus of elasticity = 24 t/mm$^2$, fiber diameter = 7 μ) and, in the same manner as above, there was prepared a half-cured carbon fiber prepreg sheet wherein the fiber had been arranged in the same direction.

The inorganic IV fiber prepreg sheet and the carbon fiber prepreg sheet both obtained above were piled up by turns with the fibers directed in the same direction and then hot pressed to prepare a hybrid fiber (inorganic fiber/carbon fiber)-reinforced epoxy composite material.

The composite material had a total fiber content of 60% by volume (inorganic fiber = 30% by volume, carbon fiber = 30% by volume).

The composite material had a tensile strength at 0° of 197 kg/mm$^2$, a tensile modulus of elasticity at 0° of 16.8 t/mm$^2$, a flexural strength at 0° of 199 kg/mm$^2$, a flexural strength at 90° of 8.0 kg/mm$^2$, an interlaminar shear strength of 9.1 kg/mm$^2$ and a flexural shock of 235 kg.cm/cm$^2$.

EXAMPLE 146

A hybrid fiber-reinforced epoxy composite material was prepared in the same manner as in Example 145 except that the carbon fiber was replaced by the same Si—Ti—C—O fiber as obtained in Example 91 (1). The composite material had a total fiber content of 60% by volume (inorganic fiber = 30% by volume, Si—Ti—C—O fiber = 30% by volume). The composite material had a tensile strength at 0° of 207 kg/mm$^2$, a tensile modulus of elasticity at 0° of 15.9 t/mm$^2$, a flexural strength at 0° of 221 kg/mm$^2$, a flexural strength at 90° of 13.1 kg/mm$^2$, an interlaminar shear strength of 2.9 kg/mm$^2$ and a flexural shock of 290 kg.cm/cm$^2$.

EXAMPLES 147-149

Hybrid fiber-reinforced epoxy resin composite materials were prepared in the same manner as in Example 145 except that the carbon fiber was replaced by an alumina fiber, a silicon carbide fiber or a glass fiber each having the properties shown in Table 7 given previously (these fibers are referred to as second fiber for reinforcement). These composite materials had a total fiber content of 60% by volume (inorganic fiber = 30% by volume, second fiber for reinforcement = 30% by volume).

The properties of the above hybrid fiber-reinforced epoxy resin composite materials are shown in Table 22.

TABLE 22

| | Example | | |
|---|---|---|---|
| | Example 147 | Example 148 | Example 149 |
| | Second fiber for reinforcement | | |
| Mechanical properties | Alumina fiber | Silicon carbide fiber | E-glass fiber |
| Tensile strength (kg/mm$^2$) | 166 | 198 | 162 |
| Tensile modulus of elasticity (t/mm$^2$) | 16 | 15 | 11 |
| Flexural strength (kg/mm$^2$) | 192 | 218 | 181 |
| Flexural modulus of elasticity (t/mm$^2$) | 14 | 13 | 11 |
| Compression strength (kg/mm$^2$) | 190 | 196 | 169 |

EXAMPLE 150

As an inorganic fiber, there was used the inorganic fiber V obtained in Example 142 (1); there was used, in place of the carbon fiber, a silicon carbide fiber using carbon as a core and having a diameter of 140 μ, a tensile strength of 350 kg/mm$^2$ and a tensile modulus of elasticity of 43 t/mm$^2$; and the procedure of Example 142 was repeated to obtain a hybrid fiber-reinforced epoxy resin composite material. The composite material had a total fiber content of 46% by volume (inorganic fiber = 30% by volume, silicon carbide fiber using carbon as a core=16% by volume). The composite material had a tensile strength at 0° of 171 kg/mm², a tensile modulus of elasticity at 0° of 22 t/mm², a flexural strength at 0° of 218 kg/mm² and a flexural strength at 90° of 6.9 kg/mm².

EXAMPLE 151

There was used, as an inorganic fiber, the inorganic fiber VI obtained in Example 143 (1); there was used, in place of the carbon fiber, a boron fiber having a diameter of 140 μ, a tensile strength of 357 kg/mm² and tensile modulus of elasticity of 41 t/mm²l and the procedure of Example 145 was repeated to prepare a hybrid fiber-reinforced epoxy resin composite material. The composite material had a total fiber content of 50% by volume (inorganic fiber=30% by volume, boron fiber=20% by volume).

The composite material had a tensile strength at 0° of 185 kg/mm², a tensile modulus of elasticity at 0° of 21 t/mm², a flexural strength at 0° of 219 kg/mm² and a flexural strength at 90° of 7.8 kg/mm².

EXAMPLE 152

There was used, as an inorganic fiber, the inorganic fiber VII obtained in Example 144 (1); there was used, in place of the carbon fiber, an aramid fiber having a tensile strength of 270 kg/mm² and a tensile modulus of elasticity of 13 t/mm²; and the same procedure as in Example 145 was repeated to prepare a hybrid fiber-reinforced epoxy resin composite material. The composite material had a total fiber content of 60% by volume (inorganic fiber=30% by volume, aramid fiber=30% by volume).

The composite material had a tensile strength, a tensile modulus of elasticity and a flexural strength all at 0° of 162 kg/mm², 16 t/mm² and 166 kg/mm², respectively, and was significantly superior in strengths and modulus of elasticity as compared with an aramid fiber-reinforced epoxy resin (the aramid fiber-reinforced epoxy resin having a fiber content of 60% by volume had a tensile strength, a tensile modulus of elasticity and a flexural strength all at 0° of 95 kg/mm², 5.3 t/mm² and 93 kg/mm², respectively). The composite material had a flexural shock of 276 kg.cm/cm², which was not significantly lower than the high shock resistance of aramid fibers (the aramid fiber-reinforced epoxy resin having a fiber content of 60% by volume had a flexural shock of 302 kg.cm/cm²).

EXAMPLE 153

To a β-silicon carbide powder having an average particle diameter of 0.2 μm were added 3% of a boron carbide powder and 10% of a polytitanocarbosilane powder, and they were mixed thoroughly. The resulting mixture and a plurality of the inorganic fibers obtained in Example 127 (5), each having a length of 50 mm and arranged in the same direction, were piled up by turns so that the inorganic fiber content became 40% by volume. The laminate was press molded in a mold at 500 kg/cm². The molded material was heated to 1950° C. in an argon atmosphere at a rate of 200° C./h and kept at that temperature for 1 hour to obtain an inorganic fiber-reinforced silicn carbide composite sintered material.

EXAMPLE 154

An inorganic fiber-reinforced silicon carbide composite sintered material was obtained in the same manner as in Example 153 except that there was used, as a reinforcing fiber, the inorganic fiber obtained in Example 132.

The mechanical strengths of the sintered materials obtained in Examples 153 and 154 are shown in Table 23. The flexural strength in Table 23 is a value obtained in a direction normal to fiber. In Table 23, there are also shown the values of Comparative Examples 27, 28 and 28 (see Table 10).

TABLE 23

|  | Flexural strength (kg/mm²) | | | $K_{Ic}$ ratio | Flexural strength reduction (%) (800° C.) | Deterioration rate (kg/mm² · sec⁻¹) (1950° C.) |
| --- | --- | --- | --- | --- | --- | --- |
|  | Room temp. | 800° C. (in air) | 1400° C. (in nitrogen) | | | |
| Example 153 | 57 | 52 | 65 | 5.5 | 5 | 0.08 |
| Comparative Example 27 | 15 | — | — | — | — | — |
| Comparative Example 28 | 42 | 20 | 50 | 2.5 | 25 | — |
| Comparative Example 29 | 50 | 53 | 55 | — | 70 | — |
| Example 154 | 62 | 55 | 70 | 4.2 | 6 | 0.06 |

EXAMPLE 155

To an γ-silicon nitride powder having an average particle diameter of 0.5 m were added 2% of alumina, 3% of yttria and 3% of aluminum nitride, and they were mixed thoroughly. The resulting mixed powder and a plurality of the inorganic fibers obtained in Example 128, having a length of 50 mm and arranged in the same direction were piled up by turns so that the fiber content became about 10% by volume. At this time, the fiber direction of one inorganic fiber layer was different from that of the lower inorganic fiber layer by 90°. The resulting laminate was kept at 300 kg/cm² at 1750° C. for 30 minutes in a hot pressing machine to obtain an inorganic fiber-reinforced silicon nitride composite sintered material.

The properties (flexural strength at room temperature and 1400° C., etc.) of the sintered material are shown in Table 24.

TABLE 24

| | Flexural strength (kg/mm$^2$) | | $K_{Ic}$ ratio | Flexural strength reduction (%) (1200° C.) | Deterioration rate (kg/mm$^2 \cdot$ sec$^{-1}$) (1750° C.) |
|---|---|---|---|---|---|
| | Room temp. | 1400° C. | | | |
| Example 155 | 128 | 80 | 2.2 | 5 | 0.16 |
| Comparative Example 30 | 120 | 45 | — | 55 | — |

EXAMPLE 156

In isopropanol were thoroughly dispersed (a) a borosilicate glass (7740) powder (a product of Corning Glass Works) having an average particle diameter of 44 m and (b) 45% by volume of chopped fibers obtained by cutting the inorganic fiber obtained in Example 129 into a length of 10 mm. The resulting slurry and a plurality of the same inorganic fibers arranged in the same direction were piled up by turns. The laminate was dried and then treated by a hot pressing machine at 750 kg/mm$^2$ at 1300° C. for about 10 minutes in an argon atmosphere to obtain an inorganic fiber-reinforced glass composite material.

TABLE 25

| | Flexural strength (kg/mm$^2$) (room temp.) | $K_{Ic}$ ratio | Flexural strength reduction (%) (900° C.) | Deterioration rate (kg/mm$^2 \cdot$ sec$^{-1}$) (1300° C.) |
|---|---|---|---|---|
| Example 156 | 21.0 | 5.1 | 2 | 0.25 |
| Comparative Example 31 | 14.2 | 4 | 2 | 1.50 |

In Table 25, the values of Comparative Example 31 also shown (see Table 12).

EXAMPLE 157

An alumina powder having an average particle diameter of 0.5 μm was mixed with 2% of titanium oxide. To the resulting mixture was added a spun fiber of a titanium-containing reaction product said spun fiber is a precursor for the inorganic fiber obtained in Example 127 (5)) so that the fiber content in final mixture became 15% by volume. The mixture was stirred thoroughly in an alumina ball mill. The average length of the precursor fiber was about 0.5 mm. The resulting mixture was sintered at 2000° C. in an argon atmosphere by a hot pressing machine. The resulting sintered material was subjected to a spalling test. That is, a plate (40×10 ×3 mm) prepared from the sintered material was rapidly heated for 20 minutes in a nitrogen atmosphere in an oven of 1300° C., taken out, and forcibly air-cooled for 20 minutes; this cycle was repeated; thereby, there was examined a cycle number at which cracks appeared in the plate for the first time.

The cycle number and mechanical strengths of the sintered material are shown in Table 26.

TABLE 26

| | $K_{Ic}$ ratio | Flexural strength reduction (%) (800° C.) | Spalling test |
|---|---|---|---|
| Example 157 | 3.1 | 5 | 9 |
| Comparative Example 32 | — | 90 | 2 |

In Table 26, the values of Comparative Example are also shown (see Table 13).

EXAMPLE 158

A β-silicon carbide powder having an average paricle diameter of 0.2 μm was thoroughly mixed with 3% of a boron carbide powder and 10% of a polytitanocarbosilane powder. The mixture and a plurality of the inorganic fibers (obtained in Example 134) having a length of 50 mm and arranged in the same direction were piled up by turns so that the fiber content became 40% by volume. The laminate was press molded at 500 kg/mm$^2$ in a mold. The resulting molded material was heated to 1950° C. at a rate of 200° C./h in an argon atmosphere and kept at that temperature for 1 hour to obtain an inorganic fiber-reinforced silicon carbide composite sintered material.

EXAMPLE 159

(1) 1.8 g of the reaction product of Example 134 (1) and 90 g of the same mesophase pitch as obtained in Example 10 (2) were melt mixed for 1.5 hours at 400° C. in a nitrogen current to obtain a spinning material having a melting point of 265° C. and a xylene insoluble content of 55%.

The material was melt spun at 350° C. using a a nozzle of 0.15 mm in diameter. The spun fiber was cured at 300° C. and then pyrolyzed at 2500° C. to obtain an inorganic fiber of 7 μ in diameter.

ICP analysis conducted in the same manner as in Example 134, indicated that the inorganic fiber contained silicon and titanium in amounts of 0.3% and 0.015%, respectively. The fiber had a tensile strength of 345 kg/mm$^2$ and a tensile modulus of elasticity of 60 t/mm$^2$.

(2) The same procedure as in Example 158 was repeated except that there was used, as a reinforcing fiber, the inorganic fiber obtained in (1) above, to obtain an inorganic fiber-reinforced silicon carbide composite sintered material.

The mechanical strengths of the sintered materials obtained in Examples 158 and 159 are shown in Table 27. In Table 27, flexural strength is a value obtained in a direction normal to fiber.

TABLE 27

| | Flexural strength (kg/mm²) | | | Flexural strength reduction (%) (800° C.) | Deterioration rate (kg/mm² · sec⁻¹) (1950° C.) |
|---|---|---|---|---|---|
| | Room temp. | 800° C. (in air) | 1400° C. (in nitrogen) | $K_{Ic}$ ratio | |
| Example 158 | 64 | 57 | 72 | 5.5 | 5 | 0.08 |
| Example 159 | 63 | 55 | 71 | 4.2 | 6 | 0.06 |

EXAMPLE 160

An γ-silicon nitride powder having an average particle diameter of 0.5 μm was thoroughly mixed with 2% of alumina, 3% of yttria and 3% of aluminum nitride. The resulting powder and a plurality of the inorganic fibers of Example 135 having a length of 50 mm and arranged in the same direction were piled up by turns so that the fiber content became about 10% by volume. At this time, the fiber direction of one inorganic fiber layer was different from that of the lower inorganic fiber layer by 90°. The laminate was kept at 300 kg/cm² at 1750° C. for 30 minutes in a hot pressing machine to obtain an inorganic fiber-reinforced silicon nitride composite sintered material.

The flexural strength at room temperature and 14000° C., etc. of the sintered material are shown in Table 28.

TABLE 28

| | Flexural strength (kg/mm²) | | $K_{Ic}$ ratio | Flexural strength reduction (%) (1200° C.) | Deterioration rate (kg/mm² · sec⁻¹) (1750° C.) |
|---|---|---|---|---|---|
| | Room temp. | 1400° C. | | | |
| Example 160 | 130 | 82 | 2.2 | 5 | 0.16 |

EXAMPLE 161

In isopropanol were thoroughly dispersed (a) a borosilicate glass (7740) powder (a product of Corning Glass Works) having an average particle diameter of 44 μm and (b) 45% by volume of chopped fibers obtained by cutting the inorganic fiber of Example 136 into a length of 10 mm. The resulting slurry and a plurality of the same inorganic fibers arranged in the same direction were piled up by turns. The laminate was dried and then treated by a hot pressing machine at 750 kg/mm² at 1300° C. for about 10 minutes in an argon atmosphere to obtain an inorganic fiber-reinforced glass composite material. The results are shown in Table 29.

TABLE 29

| | Flexural strength (kg/mm²) (room temp.) | $K_{Ic}$ ratio | Flexural strength reduction (%) (900° C.) | Deterioration rate (kg/mm² · sec⁻¹) (1300° C.) |
|---|---|---|---|---|
| Example 161 | 23.0 | 5.1 | 2 | 0.25 |

EXAMPLE 162

A plain weave fabric of the inorganic fiber obtained in Example 127 (5) was immersed in a methanol solution of a resole type phenolic resin (MRW-3000 manufactured by Meiwa Kasei) and then pulled up. The impregnated fabric, after methanol was removed, was dried to obtain a prepreg sheet. From the prepreg sheet were cut out square sheets of 5 cm×5 cm. The square sheets were piled up in a mold and pressed at 50 kg/cm² at 200° C. to cure the phenolic resin to obtain a molded material. The molded material was buried in a carbon powder and heated to 1000° C. at a rate of 5° C./h in a nitrogen current to obtain an inorganic fiber-reinforced carbon composite material. The composite material was a porous material having a bulk density of 1.26 g/cm³.

The composite material was mixed with a powder of the mesophase pitch (A) this pitch is an intermediate of the inorganic fiber of Example 127 (5)). The mixture was placed in an autoclave and heated to 350° C. in a nitrogen atmosphere to melt the pitch and then the autoclave inside was made vacuum to impregnate the pores of the composite material with the molten mesophase pitch. Thereafter, a pressure of 100 kg/cm² was applied for further impregnation. The impregnated composite material was heated to 300° C. at a rate of 5° C./h in air for curing and then was carbonized at 1300° C. The above impregnation with mesophase pitch and carbonization were repeated three more times to obtain a composite material having a bulk density of 1.86 g/cm³ and a flexural strength of 39 kg/mm².

Using the inorganic fibers obtained in Examples 128 and 129 and in the same manner as above, there were prepared composite materials. The composite material prepared using the inorganic fiber of Example 128 had a bulk density of 1.86 g/cm³ and a flexural strength of g/mm², and the composite material prepared using the inorganic fiber of Example 129 had a bulk density of 1.85 g/cm³ and a flexural strength of 37 kg/mm². These composite materials had a fiber content (Vf) of 60% by volume. (The Vf in the following Example 163 was also 60% by volume.)

EXAMPLE 163

A graphite powder having an average particle diameter of 0.2 m and a powder of the mesophase pitch (A) [the pitch is an intermediate of the inorganic fiber of Example 127 (5)] were ground and mixed at a 1:1 weight ratio. The resulting powder and a fabric of the inorganic fiber of Example 131 were piled up by turns. The laminate was hot pressed at 100 kg/cm² at 350° C. to obtain a molded material. The molded material was subjected to four times of the same impregnation with mesophase pitch and carbonization as in Example 162, to obtian a composite material having a bulk density of 1.92 g/cm³ and a flexural strength of 42 kg/mm². When the composite material was heated to 2500° C. in an argon atmosphere to graphitize the matrix, the flexural strength improved to 50 kg/mm².

EXAMPLE 164

A plain weave fabric of the inorganic fiber obtained in Example 134 was immersed in a methanol solution of a resole type phenolic resin (MRW-3000 manufactured by Meiwa Kasei) and then pulled up. The impregnated fabric, after methanol was removed, was dried to obtain a prepreg sheet. From the prepreg sheet were cut out square sheets of 5 cm×5 cm. The square sheets were piled up in a mold and pressed at 50 kg/cm$^2$ at 200° C. to cure the phenolic resin to obtain a molded material. The molded material was buried in a carbon powder and heated to 1000° C. at a rate of 5° C./h in a nitrogen current to obtain an inorganic fiber-reinforced carbon composite material. The composite material was a porous material having a bulk density of 1.25 g/cm$^3$.

The composite material was mixed with a powder of the mesophase pitch which is an intermediate of the inorganic fiber of Example 134. The mixture was placed in an autoclave and heated to 350° C. in a nitrogen atmosphere to melt the pitch and then the autoclave inside was made vacuum to impregnate the pores the composite material with the molten mesophase pitch. Thereafter, a pressure of 100 kg/cm$^2$ was applied for further impregnation. The impregnated composite material was heated to 300° C. at a rate of 5° C./h in air for curing and then was carbonized at 1300° C. The above impregnation with mesophase pitch and carbonization were repeated three more times to obtain a composite material having a bulk density of 1.87 g/cm$^3$ and a flexural strength of 44 kg/mm$^2$.

Using the inorganic fibers obtained in Examples 135 and 136 and in the same manner as above, there were prepared composite materials. The composite material prepared using the inorganic fiber of Example 135 had a bulk density of 1.86 g/cm$^3$ and a flexural strength of 45 kg/mm$^2$, and the composite material prepared using the inorganic fiber of Example 136 had a bulk density of 1.85 g/cm$^3$ and a flexural strength of 39 kg/mm$^2$. These composite materials had a fiber content (Vf) of 60% by volume. (The Vf in the following Example 165 was also 60% by volume.)

EXAMPLE 165

A graphite powder having an average particle diameter of 0.2 μm and a powder of the mesophase pitch (A) which is an intermediate of the inorganic fiber of Example 134 were ground and mixed at a 1:1 weight ratio. The resulting powder and a fabric of the inorganic fiber of Example 159 (1) were piled up by turns. The laminate was hot pressed at 100 kg/cm$^2$ at 350° C. to obtain a molded material. The molded material was subjected to four times of the same impregnation with mesophase pitch and carbonization as in Example 164, to obtain a composite material having a bulk density of 1.92 g/cm$^3$ and a flexural strength of 47 kg/mm$^2$. When the composite material was heated to 2500° C. in an argon atmosphere to graphitize the matrix, the flexural strength improved to 55 kg/mm$^2$.

EXAMPLE 166

(1) The procedure of Example 134 was repeated except that the reaction product of Example 134 (1) (melting point=258° C., softening point=292° C.) and the mesophase pitch of Example 134 (2) were used as a ratio of 1:1, to obtain a titanium-containing reaction product.

(2) A two-dimensional plain weave fabric of the inorganic fiber obtained in Example 134 was cut into discs of 7 cm in diameter. The discs were impregnated with a xylene slurry containing 30% of the spinning material polymer used in Example 134 and then were dried to obtain prepreg sheets. These prepreg sheets were piled up in a mold in a total sheet number of 30, with a fine powder of the titanium-containing reaction product of (1) above being packed between each two neighbouring prepreg sheets and with the fiber direction of one prepreg sheet being advanced by 45° from that of the lower prepreg sheet. The laminate was hot pressed at 50 kg/cm$^2$ at 350° C. to obtain a disc-like molded material. The molded material was buried in a carbon powder bed for shape retention, was heated to 800° C. at a rate of 5° C./h in a nitrogen current, and was further heated to 1300° C. to carbonize the matrix. The resulting composite material had a bulk density of 1.20 g/cm$^3$.

The composite material was immersed in a xylene slurry containing 50% of the metal-containing reaction product of (1) above. The resulting material was heated to 350° C. under vacuum while distilling off xylene; a pressure of 100 kg/cm$^2$ was applied for impregnation; then, the material was heated to 300° C. at a rate of 5° C./h in air for curing and thereafter carbonized at 1300° C. This impregnation and carbonization treatment was repeated three more times to obtain a composite material having a bulk density of 1.95 g/cm$^3$. The composite material had a flexural strength of 59 kg/mm$^2$.

EXAMPLE 167

There were mixed (a) 50 parts of an inorganic substance obtained by prefiring the spinning polymer used in Example 159 (1), at 1300° C. in nitrogen and (b) 50 parts of a powder of the titanium-containing reaction product of Example 166 (1). The resulting mixture and a two-dimensional plain weave fabric of the inorganic fiber obtained in Example 159 (1) were piled up by turns. The laminate was hot pressed at 100 kg/cm$^2$ at 400° C. to obtain a molded material. The molded material was carbonized in the same manner as in Example 166. The resulting material was subjected to four times of (a) the impregnation with the titanium-containing reaction product of Example 66 (1) and (b) carbonization, in the same manner as in Example 166. The resulting composite material had a bulk density of 2.02 g/cm$^3$ and a flexural strength of 61 kg/mm$^2$. When the composite material was pyrolyzed at 2200° C. in argon, the bulk density and flexural strength improved to 2.05 g/cm$^3$ and 65 kg/mm$^2$, respectively.

EXAMPLE 168

(1) The procedure of Example 135 was repeated except that the reaction product which is an intermediate of the inorganic fiber of Example 135 and the mesophase pitch were used at a 1:1 ratio, to obtain a zirconium-containing reaction product.

(2) The procedure of Example 166 was repeated except that as a reinforcing fiber there was used the inorganic fiber of Example 135, there was used, as a polymer for prepreg sheet preparation, the spinning polymer used in Example 135, and as a packing powder used in molding there was used the zirconium-containing reaction product of (1) above, whereby a composite material having a bulk density of 1.21 g/cm$^3$ was obtained.

The composite material was subjected to the impregnation with the zirconium-containing reaction product of (1) above in the same manner as in Example 166, to obtain a composite material having a bulk density of 1.97 g/cm³ and a flexural strength of 61 kg/mm².

EXAMPLE 169

(1) The procedure of Example 136 was repeated except that the reaction product which is an intermediate of the inorganic fiber of Example 136 and the mesophase pitch were used at a 1:1 ratio, to obtain a hafnium-containing reaction product.

(2) The procedure of Example 166 was repeated except that as a reinforcing fiber there was used the inorganic fiber of Example 136, there was used, as a polymer for prepreg sheet preparation, the spinning polymer used in Example 136, and as a packing powder used in molding there was used the metal-containing reaction product of (1) above, whereby a composite material having a bulk density of 1.25 g/cm³ was obtained.

The composite material was subjected to the impregnation with the hafnium-containing reaction product of (1) above in the same manner as in Example 166, to obtain a composite material having a bulk density of 2.05 g/cm³ and a flexural strength of 56 kg/mm².

EXAMPLE 170

The composite materials of Examples 166, 167, 168 and 169 were heated for 1 hour in an oven containing air of 600° C. and then measured for flexural strength.

There was seen no strength reduction in any composite material (see Comparative Examples 33 and 34).

EXAMPLE 171

(1) 6.4 g of the precursor reaction product used in preparation of the inorganic fiber of Example 134 and 90 g of a mesophase pitch were melt mixed for 1 hour at 380° C. in a nitrogen atmosphere to prepare a reaction product.

(2) 50 g of the organic polymer used in preparation of the inorganic fiber of Example 134 and 50 g of a reforming pitch were treated in the same manner as in Example 134 to obtain a precursor reaction product. This precursor reaction product and the mesophase pitch of Example 134 were melt mixed at a 1:1 ratio for 1 hour at 380° C. in a nitrogen atmosphere to obtain a reaction product.

(3) A two-dimensional plain weave fabric of the inorgnaic fiber obtained in Example 134 was cut into discs of 7 cm in diameter. The discs were immersed in a xylene slurry containing 30% of the reaction product of (1) above and then were dried to obtain prepreg sheets. These prepreg sheets were piled up in a mold in a total sheet number of 30, with a fine powder of the reaction product of (2) above being packed between each two neibouring prepreg sheets and with the fiber direction of one prepreg sheet being advanced by 45° from that of the lower prepreg sheet. The laminate was hot pressed at 50 kg/cm² at 350° C. to obtain a disc-like molded material. The molded material was buried in a carbon powder bed for shape retention, was heated to 800° C. at a rate of 5° C./h in a nitrogen current, and was further heated to 1300° C. to carbonize the matrix. The resulting composite material had a bulk density of 1.21 g/cm³.

The composite material was immersed in a xylene slurry containing 50% of the reaction product of (2) above. The resulting material was heated to 350° C. under vacuum while distilling off xylene; a pressure of 100 kg/cm² was applied for impregnation; then, the material was heated to 300° C. at a rate of 5° C./h in air for curing and thereafter carbonized at 1300° C. This impregnation and carbonization treatment was repeated three more times to obtain a composite material having a bulk density of 1.93 g/cm³. The composite material had a flexural strength of 57 kg/mm².

EXAMPLE 172

There were mixed (a) 50 parts of an inorganic substance obtained by prefiring the reaction product of Example 171 (1) at 1300° C. in nitrogen and (b) 50 parts of a powder of said reaction product. The resulting mixture and a two-dimensional plain weave fabric of the inorganic fiber obtained in Example 159 (1) were piled up by turns. The laminate was hot pressed at 100 kg/cm² at 400° C. to obtain a molded material. The molded material was carbonized in the same manner as in Example 171. The resulting material was subjected to four times of (a) the impregnation with the reaction product of Example 171 (2) and (b) carbonization, in the same manner as in Example 171. The resulting composite material had a bulk density of 2.00 g/cm³ and a flexural strength of 59 kg/mm². When the composite material was pyrolyzed at 2200° C. in argon, the bulk density and flexural strength improved to 2.03 g/cm³ abd 63 kg/mm², respectively.

EXAMPLE 173

A composite material having a bulk density of 1.20 g/cm³ was obtained in the same manner as in Example 171 except that as a reinforcing fiber there was used the inorganic fiber of Example 135.

The material was subjected to the impregnation with the reaction product of Example 171 (2) in the same manner as in Example 171 to obtain a composite material having a bulk density of 1.96 g/cm³ and a flexural strength of 59 kg/mm².

EXAMPLE 174

(1) The procedure of Example 171 was repeated except that as a reinforcing fiber there was used the inorganic fiber of Example 136, to obtain a composite material having a bulk density of 1.24 g/cm³.

The material was subjected to the impregnation with the reaction product of Example 171 (2) in the same manner as in Example 171 to obtain a composite material having a bulk density of 2.03 g/cm³ and a flexural strength of 54 kg/mm².

EXAMPLE 175

The composite materials of Examples 171, 172, 173 and 174 were heated for 1 hour in an oven containing air of 600° C. and then measured for flexural strength.

No strength reduction was seen in any composite material.

EXAMPLE 176

A fiber was prepared using an apparatus of FIG. 1. 250 g of silicon carbide fine particles (average particle diameter=0.28 m) was placed in a treacting tank containing 5,000 cc of ethyl alcohol. Ultrasonic vibration was applied by an ultrasonic applicator 2 to suspend the fine particles in ethyl alcohol and thereby to prepare a treating solution 3.

A continuous fiber bundle 4 of the inorganic fiber obtained in Example 134 was unwound from a bobbin 5 and passed through the treating solution 3 with the passing time controlled at about 15 sec. by movable rollers 6 and 7. (Durng the passing, an ultrasonic wave was applied to the treating solution 3 and the solution 3 was stirred with air being blown.) Then, the continuous fiber bundle was pressed by pressure rollers 8 and 9, wound up by a bobbin 10, and dried at room temperature in air.

Weighing of the fiber after the treatment indicated that 7% by volume of the fine particles attached to the fiber.

EXAMPLE 177

The same treatment as in Example 176 was repeated except that as the treating solution in the treating tank 1 there was used a slurry obtained by suspending 100 g of silicon carbide whiskers (average diameter: about 0.2 $\mu$m, average length: about 100 m) and 250 g of silicon carbide fine particles (average particle diameter: 0.28 $\mu$m) in 5,000 cc of ethyl alcohol.

The fiber obtained had a grayish green color. Observation of the fiber by an electron microsocpe (SEM) indicated that mainly fine particles attached to the surface of each continuous fiber and further mainly whiskers attached thereonto. Weighing of the fiber indicated that 10% by volume of the fine particles and whiskers attached to the fiber.

Separately, a continuous fiber bundle of the inorganic fiber of Example 159 (1) was subjected to the same treatment as above to obtain a fiber to which 8% by volume of fine particles and whiskers attached.

EXAMPLE 178

A continuous fiber bundle 4 of the inorganic fiber obtained in Example 135 was treated in the same manner as in Example 176 except that as a treating solution there was used a suspension obtained by suspending 100 g of silicon nitride whiskers (average diameter: about 0.3 m, average length: about 200 m) and 100 g of the above mentioned silicon carbide fine particles in 5,000 cc of water. As a result, about 5% by volume of the fine particles and whiskers attached to the continuous fine bundle 4.

EXAMPLE 179

A continuous fiber bundle 4 of the inorganic fiber obtained in Example 136 was passed through a suspension obtained by stirring 100 g of silicon carbide fine particles in 500 cc of ethanol, while applying an ultrasonic wave to the suspension. Then, the fiber bundle was passed through a suspension obtained by stirring 150 g of silicon nitride whiskers in 500 cc of ethanol, in the same manner and then dried. As a result, about 14% by volume of the fine particles and whiskers attached to the fiber bundle.

EXAMPLE 180

The titanium-containing reaction product which is a spinning material for preparation of the inorganic fiber of Example 134 was finely ground and then pyrolyzed at 1300° C. in an argon current to obtain a fine powder having an average particle diameter of 0.5 $\mu$m and consisting of crystalline carbon, amorphous carbon and an amorphous material composed mainly of Si—C—O. 100 g of this fine powder was suspended in 500 cc of ethanol by stirring. A continuous fiber bundle 4 of the inorganic fiber obtained in Example 134 was passed through the above suspension while applying an ultrasonic wave to the suspension. The fiber bundle was then passed through a suspension obtained by suspending 150 g of silicon nitride whiskers in 500 cc of ethanol by stirring, in the same manner and then dried. As a result, about 12% of the fine particles and whiskers attached to the fiber bundle.

EXAMPLE 181

Using the fiber obtained in Example 176 and an aluminum matrix, there was prepared a unidirectionally reinforced FRM. The FRM had a fiber volume fraction (vf) of 50% and a flexural strength of 179 kg/mm$^2$ (the ROM value was 190 kg/mm$^2$).

EXAMPLE 182

Using the fiber obtained in Example 177 from the inorganic fiber of Example 134 and, as a matrix, aluminum containing 5% in total of copper and magnesium, there was prepared a unidirectionally reinforced FRM. The FRM had a fiber volume fraction of 50%. Its flexural strength was 185 kg/mm$^2$ and was scarcely different from the ROM value (190 kg/mm$^2$).

Using the fiber obtained in Example 177 from the inorganic fiber of Example 159 (1) and in the same manner, there was prepared a FRM. The FRM had a flexural strength of 175 kg/mm$^2$, which was scarcely different from the ROM value (178 kg/mm$^2$).

EXAMPLE 183

The inorganic fiber of Example 134 was unidirectionally arranged on a pure aluminum foil (specified by JIS 1070) of 0.5 mm in thickness. Thereon was placed another aluminum foil of same quality and size. The laminate was subjected to hot rolling at 670° C. to prepare a composite foil of fiber and aluminum. The composite foil was piled up in a total sheet number of 27, was allowed to stand for 10 minutes at 670° C. under vacuum, and then subjected to hot pressing at 600° C. to obtain an inorganic fiber-reinforced aluminum composite material. The inorganic fiber was measured for initial deterioration rate (kg/mm$^2$.sec$^{-1}$) and fiber strength reduction (%). The composite material was measured for tensile strength in fiber direction (kg/mm$^2$), tensile modulus of elasticity in fiber direction (t/mm$^2$), interlaminar shear strength (kg/mm$^2$), tensile strength in direction perpendicular to fiber (kg/mm$^2$) and fatigue limit/tensile strength. The results are shown in Table 30. The Vf of the composite material was 30% by volume.

For reference, the results of Comparative Example 42 are also shown in Table 30.

TABLE 30

| | Example 183 | Comparative Example 42 |
|---|---|---|
| Initial deterioration rate (kg/mm$^2$ · sec$^{-1}$) | 0.7 | 3.2 |
| Fiber strength reduction (%) | 51 | 90 |
| Tensile strength in fiber direction (kg/mm$^2$) | 55 | 25 |
| Tensile modulus of elasticity in fiber direction (t/mm$^2$) | 12.1 | 6.5 |
| Interlaminar shear strength (kg/mm$^2$) | 5.4 | 2.2 |
| Tensile strength in direction perpendicular to fiber (kg/mm$^2$) | 4.3 | 1.8 |
| Fatigue limit/tensile strength | 0.39 | 0.25 |

EXAMPLE 184

A fiber-reinforced metal was prepared in the same manner as in Example 183 except that there was used an aluminum alloy foil (specified by JIS 6061). The inorganic fiber and the fiber-reinforced metal were measured for the above mentioned properties. The results are shown in Table 31. The results of Comparative Example 43 are also shown in Table 31.

TABLE 31

|  | Example 184 | Comparative Example 43 |
|---|---|---|
| Initial deterioration rate (kg/mm$^2$ · sec$^{-1}$) | 1.0 | 3.9 |
| Fiber strength reduction (%) | 55 | 95 |
| Interlaminar shear strength (kg/mm$^2$) | 11.2 | 4.0 |
| Tensile strength in direction perpendicular to fiber (kg/mm$^2$) | 9.1 | 3.2 |
| Fatigue limit/ tensile strength | 0.42 | 0.25 |

EXAMPLE 185

A plurality of the inorganic fibers of Example 135 were arranged unidirectionally and coated with metallic titanium in a thickness of 0.1-10 μ by the use of a thermal spraying apparatus. This coated inorganic fiber layer was piled up in a plurality of layers with a titanium powder being packed between each two neighboring layers. The laminate was press molded. The molded material was prefired for 3 hours at 520° C. in a hydrogen atmosphere and then hot pressed at 200 kg/cm$^2$ at 1150° C. for 3 hours in an argon atmosphere to obtain an inorganic fiber-reinforced titanium composite material.

The inorganic fiber was measured for initial deterioration rate (kg/mm$^2$.sec$^{-1}$) and fiber strength reduction (%), and the composite material was measured for tensile strength in fiber direction (kg/mm$^2$), interlaminar shear strength (kg/mm$^2$), tensile strength in direction perpendicular to fiber (kg/mm$^2$) and fatigue limit/tensile strength. The results are shown in Table 32.

The tensile strength in fiber direction, of the composite material was 137 kg/mm$^2$, which was about two times the tensile strength of metallic titanium alone. The Vf of the composite material was 45% by volume.

The results of Comparative Example 44 are also shown in Table 32.

TABLE 32

|  | Example 185 | Comparative Example 44 |
|---|---|---|
| Initial deterioration rate (kg/mm$^2$ · sec$^{-1}$) | 0.8 | 3.7 |
| Fiber strength reduction (%) | 49 | 95 |
| Tensile strength in fiber direction (kg/mm$^2$) | 137 | 52 |
| Interlaminar shear strength (kg/mm$^2$) | 14.4 | 4.7 |
| Tensile strength in direction perpendicular to fiber (kg/mm$^2$) | 10.1 | 3.8 |
| Fatigue limit/ tensile strength | 0.39 | 0.20 |

EXAMPLE 186

A plurality of the inorganic fibers of Example 135 were arranged unidirectionally and coated with a titanium alloy (Ti-6Al-4V) in a thickness of 0.1-10 μ by the use of a thermal spraying apparatus. This coated inorganic fiber layer was piled up in a plurality of layers with a titanium powder being packed between each two neighboring layers. The laminate was press molded. The molded material was prefired for 3 hours at 520° C. in a hydrogen gas atmosphere and then hot pressed at 200 kg/cm$^2$ at 1150° C. for 3 hours in an argon atmosphere to obtain an inorganic fiber-reinforced titanium composite material.

The inorganic fiber was measured for initial deterioration rate (kg/mm$^2$.sec$^{-1}$) and fiber strength reduction (%), and the composite material was measured for interlaminar shear strength (kg/mm$^2$), tensile strength in direction perpendicular to fiber (kg/mm$^2$) and fatigue limit/tensile strength. The Vf of the composite material was 45% by volume. The results are shown in Table 33.

The results of Comparative Example 45 are also shown in Table 33.

TABLE 33

|  | Example 186 | Comparative Example 45 |
|---|---|---|
| Initial deterioration rate (kg/mm$^2$ · sec$^{-1}$) | 0.8 | 4.0 |
| Fiber strength reduction (%) | 50 | 96 |
| Interlaminar shear strength (kg/mm$^2$) | 20.1 | 7.4 |
| Tensile strength in direction perpendicular to fiber (kg/mm$^2$) | 16.5 | 6.0 |
| Fatigue limit/ tensile strength | 0.39 | 0.19 |

EXAMPLE 187

On a pure magnesium foil of 0.5 mm in thickness were unidirectionally arranged a plurality of the inorganic fibers of Example 136. Thereon was placed another magnesium foil of same quality and size. The laminate was hot rolled at 670° C. to obtain a composite foil of fiber and magnesium. This composite foil was piled up in a total number of 27, was allowed to stand for 10 minutes at 670° C. under vacuum, and then was hot pressed at 600° C. to obtain an inorganic fiber-reinforced magnesium composite material.

The inorganic fiber was measured for initial deterioration rate (kg/mm$^2$ sec$^{-1}$) and fiber strength reduction (%), and the composite material was measured for interlaminar shear strength (kg/mm$^2$), tensile direction perpendicular to fiber (kg/mm$^2$) and fatigue limit/tensile strength. The Vf of the composite material was 30% by volume. The results are shown in Table 34.

The results of Comparative Example 46 are also shown in Table 34.

TABLE 34

|  | Example 187 | Comparative Example 46 |
|---|---|---|
| Initial deterioration rate (kg/mm$^2$ · sec$^{-1}$) | 0.9 | 4.1 |
| Fiber strength reduction (%) | 60 | 96 |
| Interlaminar shear strength (kg/mm$^2$) | 4.6 | 1.5 |
| Tensile strength in direction perpendicular to fiber (kg/mm$^2$) | 3.7 | 1.3 |
| Fatigue limit/ | 0.37 | 0.21 |

TABLE 34-continued

| | Example 187 | Comparative Example 46 |
|---|---|---|
| tensile strength | | 5 |

EXAMPLE 188

A plurality of the inorganic fibers of Example 136 were undirectionally arranged on a magnesium alloy foil (specified by JIS A 891) of 0.5 mm in thickness. Thereon was placed another magnesium alloy foil of same quality and size. The laminate was hot rolled at 670° C. to prepare a composite foil of fiber and magnesium alloy. This composite foil was piled up in a total number of 27, was allowed to stand for 10 minutes at 670° C. under vacuum, and was hot pressed at 600° C. to obtain an inorganic fiber-reinforced magnesium composite material.

The inorganic fiber was measured for initial deterioration rate (kg/mm$^2$ sec$^{-1}$) and fiber strength reduction (%), and the composite material was measured for interlaminar shear strength (kg/mm$^2$), tensile strength in direction perpendicular to fiber (kg/mm$^2$) and fatigue limit/tensile strength. The Vf of the composite material was 30% by volume. The results are shown in Table 35.

The results of Comparative Example 47 are also shown in Table 35.

TABLE 35

| | Example 188 | Comparative Example 47 |
|---|---|---|
| Initial deterioration rate (kg/mm$^2$ · sec$^{-1}$) | 0.9 | 4.0 |
| Fiber strength reduction (%) | 60 | 96 |
| Interlaminar shear strength (kg/mm$^2$) | 7.5 | 2.8 |
| Tensile strength in direction perpendicular to fiber (kg/mm$^2$) | 6.1 | 2.2 |
| Fatigue limit/tensile strength | 0.40 | 0.27 |

EXAMPLE 189

An inorganic fiber-reinforced aluminum composite material was prepared in the same manner as in Example 183 except that there was used the inorganic fiber of Example 159 (1). The tensile strength of the composite material was about the same as that of the composite material obtained in Example 183, but the tensile modulus of elasticity was greatly improved to 24.5 t/mm$^2$. The Vf of the composite material was 30% by volume.

We claim:

1. A polymer composition comprising
(A) an organic silicon polymer resulting from random bonding of a plurality of at least one type of bond selected from the group consisting of units represented by the following formula (a)

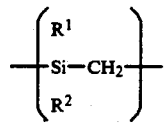

or both the recurring units of the randomly arranged formula

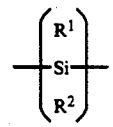

and the recurring units of the formula $-(-CH_2-)$-wherein R$^1$ and R$^2$, independently from each other, represent a hydrogen atom, a lower alkyl group, a phenyl group or a silyl group ($-SiH_3$), (B) a polycyclic aromatic compound in the state of a mesophase, a premesophase or a latently anisotropic phase, and (C) a polycyclic aromatic compound which is optically isotropic but is not in the state of a premeso phase or a latently anisotropic phase, at least a part of component (A) being chemically bound to at least one component selected from component (B) and component (C).

2. A polymer composition comprising
(A') an organic silicon polymer resulting from random bonding of a plurality of units of (a) at least one kind selected from the group consisting of units of the following formula (a)

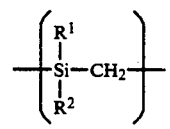

or both the recurring units of the randomly arranged formula

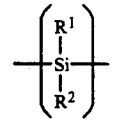

and the recurring units of the formula $-(-CH_2-)$-wherein R$^1$ and R$^2$, independently from each other, represent a hydrogen atom, a lower alkyl group, a phenyl group or a silyl group ($-SiH_3$), and
(b) at least one unit of formula (b)

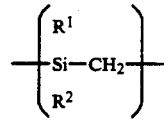

or at least one unit of the formula ... (b)

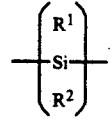

and a unit of the formula $-(-CH_2-)$-wherein R$^1$ is as defined above, and R$^3$ represents $-M$ or $-OM$, and M represents one equivalent of a metal selected from the group consisting of titanium, zirconium and hafnium, (B) a polycyclic aromatic compound in the mesophase, premesophase or the latently anisotropic phase, and (C) an optically isotropic polycyclic aromatic compound which is not in the premesophase or the latently anisotropic phase, part of component (A) being chemically bonded to at least one component selected from component (B) and component (C).

3. Fibers having high strength and high modulus of elasticity comprising
 (i) crystalline carbon oriented substantially in the direction of the fiber axis,
 (ii) at least one of the amorphous carbon and/or crystalline carbon oriented in a direction different from the fiber axis direction, and
 (iii) a silicon-containing component consisting essentially of 30 to 70% by weight of Si, 20 to 60% by weight of C and 0.5 to 10% by weight of O, the proportions being based on the total weight of silicon, carbon and oxygen.

4. The fibers of claim 3 in which the crystalline carbon (i) is derived from an optically anisotropic polycyclic aromatic compound which is in the mesophase state.

5. The fibers of claim 3 in which owing to the presence of the crystalline carbon (i) a radial structure, an onion structure, a random structure, a core-radial structure, a skin onion structure or a mosaic structure is imparted to the cross-section of the fibers.

6. The fibers of claim 3 in which at least one of the amorphous carbon or the crystalline carbon (ii) is derived from an optically isotropic polycyclic aromatic compound.

7. The fibers of claim 3 in which the silicon-containing component (iii) is an amorphous phase, or an aggregate consisting essentially of a crystalline fine particulate phase composed of crystalline SiC and amorphous $SiO_x$ wherein $0 < x \leq 2$.

8. The fibers of claim 7 in which the crystalline particulate phase consisting essentially of crystalline SiC has a particle diameter of not more than 500 angstrom.

9. Fibers having high strength and high modulus comprising
 (i) crystalline carbon oriented substantially in the direction of the fiber axis,
 (ii) at least one of an amorphous carbon or crystalline carbon oriented in a direction different from the direction of the fiber axis, and
 (iii') a silicon-containing component substantially composed of 0.5 to 45% by weight of a metal selected from the group consisting of titanium, zirconium and hafnium, 5 to 70% by weight of Si, 20 to 40% by weight of C and 0.01 to 30% by weight of O, the proportions being based on the total weight of said metal, silicon, carbon and oxygen.

10. The fibers of claim 9 in which the crystalline carbon (i) is derived from an optically anisotropic polycyclic aromatic compound which is in the mesophase state.

11. The fibers of claim 9 in which owing to the presence of the crystalline carbon (i), a radial structure, an onion structure, a random structure, a core-radial structure, a skin onion structure or a mosaic structure is imparted to the cross-section of the fibers.

12. The fibers of claim 9 in which at least one of the amorphous carbon or the crystalline carbon (ii) is derived from an optically isotropic polycyclic aromatic compound.

13. The fibers of claim 9 in which the silicon-containing component (iii)' is an amorphous phase, or an aggregate consisting essentially of a crystalline particulate phase composed of silicon, carbon and a metal selected from the group consisting of titanium, zirconium and hafnium and an amorphous phase of $SiO_y$ $0 < y \leq 2$ and $MO_z$ wherein (M=Ti, Zr or Hf and $0 < z \leq 2$).

14. The fibers of claim 13 in which the crystalline particulate phase has crystalline SiC, MC wherein M is defined as above, a solid solution of crystalline SiC and MC, and $MC_{1-x}$ $0 < x \leq 1$ and has a particle diameter of not more than 500 angstroms.

* * * * *